(12) United States Patent
Maturana et al.

(10) Patent No.: US 10,482,063 B2
(45) Date of Patent: Nov. 19, 2019

(54) MODULAR CONTROL MANIFEST GENERATOR FOR CLOUD AUTOMATION

(71) Applicant: Rockwell Automation Technologies, Inc., Mayfield Heights, OH (US)

(72) Inventors: Francisco P. Maturana, Lyndhurst, OH (US); Alexander B. Cherpakov, Mayfield Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 105 days.

(21) Appl. No.: 15/676,337

(22) Filed: Aug. 14, 2017

(65) Prior Publication Data

US 2019/0050414 A1   Feb. 14, 2019

(51) Int. Cl.
*G06F 16/16* (2019.01)
*H04L 29/08* (2006.01)
(Continued)

(52) U.S. Cl.
CPC ......... *G06F 16/168* (2019.01); *G05B 19/418* (2013.01); *G05B 19/4185* (2013.01);
(Continued)

(58) Field of Classification Search
CPC ...... G05B 19/4183; G05B 2219/31282; G05B 2219/31318; Y02P 90/86; Y02P 90/26;
(Continued)

(56) References Cited

U.S. PATENT DOCUMENTS

| 5,159,685 A | 10/1992 | Kung |
| 5,519,605 A | 5/1996 | Cawlfield |

(Continued)

FOREIGN PATENT DOCUMENTS

| CN | 1755564 | 4/2006 |
| CN | 1937559 | 3/2007 |

(Continued)

OTHER PUBLICATIONS

Office Action for U.S. Appl. No. 14/639,279 dated Nov. 15, 2017, 75 pages.
(Continued)

*Primary Examiner* — Justin S Lee
(74) *Attorney, Agent, or Firm* — Amin, Turocy & Watson, LLP

(57) ABSTRACT

A manifest generation system generates a system model for a cloud computing architecture. The system generates the system model in the form of system, data, and metrics manifests that act as an information concentrator for configuring various aspects of data ingestion and data management. The manifest generation system leverages both information extracted from industrial devices, applications, and programs that make up physical industrial automation systems, as well as user selections identifying which data tags are to be collected, specifying data collection preferences, etc. In this way, manifest data for configuring cloud-level data monitoring and collection is mapped to the automation and control system configurations via information extracted from the system-level topology. This approach can automate and simplify aspects of the cloud-based data collection configuration process.

20 Claims, 35 Drawing Sheets

(51) Int. Cl.
  *H04L 12/26* (2006.01)
  *G05B 19/418* (2006.01)
  *G06F 8/30* (2018.01)
  *G06F 8/38* (2018.01)
  *G06F 3/0484* (2013.01)
  *G06F 3/0482* (2013.01)
  *H04L 12/24* (2006.01)

(52) U.S. Cl.
  CPC .............. *G06F 8/30* (2013.01); *G06F 8/38* (2013.01); *G06F 16/164* (2019.01); *H04L 43/08* (2013.01); *H04L 67/141* (2013.01); *G05B 2219/31457* (2013.01); *G06F 3/0482* (2013.01); *G06F 3/04847* (2013.01); *H04L 41/0803* (2013.01)

(58) Field of Classification Search
  CPC .... Y02P 90/18; G06F 9/5072; G06F 17/5009; G06F 11/0751
  See application file for complete search history.

(56) References Cited

U.S. PATENT DOCUMENTS

| | | | |
|---|---|---|---|
| 6,230,010 B1 | 5/2001 | Morris | |
| 6,609,034 B1 | 8/2003 | Behrens et al. | |
| 6,640,241 B1 | 10/2003 | Ozzie et al. | |
| 6,675,226 B1 | 1/2004 | Nair et al. | |
| 7,133,908 B1 | 11/2006 | Pajak et al. | |
| 7,159,209 B1* | 1/2007 | Srinivasan | G06F 11/0751 707/999.1 |
| RE39,989 E | 1/2008 | Morris | |
| 7,676,287 B2 | 3/2010 | Eryurek et al. | |
| 8,219,216 B2 | 7/2012 | Klug et al. | |
| 8,275,847 B2 | 9/2012 | Lewis | |
| 8,618,941 B2 | 12/2013 | Javey et al. | |
| 8,649,500 B1 | 2/2014 | Cohen et al. | |
| 8,667,589 B1 | 3/2014 | Saprygin et al. | |
| 8,694,770 B1 | 4/2014 | Osburn, III | |
| 9,438,648 B2 | 9/2016 | Asenjo et al. | |
| 9,489,832 B2 | 11/2016 | Nair et al. | |
| 9,552,143 B2 | 1/2017 | Javey et al. | |
| 9,928,724 B2 | 3/2018 | Alcorn et al. | |
| 9,954,972 B2 | 4/2018 | Asenjo et al. | |
| 10,229,579 B2 | 3/2019 | Alcorn et al. | |
| 2001/0053992 A1 | 12/2001 | Eto et al. | |
| 2002/0133270 A1 | 9/2002 | Hung et al. | |
| 2002/0178159 A1 | 11/2002 | O'Brien | |
| 2003/0014387 A1 | 1/2003 | Kreidler et al. | |
| 2003/0033237 A1 | 2/2003 | Bawri | |
| 2003/0083754 A1 | 5/2003 | Tripathi et al. | |
| 2003/0212818 A1* | 11/2003 | Klein | H04L 51/12 709/238 |
| 2004/0141517 A1 | 7/2004 | Balasubramanian et al. | |
| 2004/0230859 A1 | 11/2004 | Cochran et al. | |
| 2005/0010333 A1 | 1/2005 | Lorton et al. | |
| 2005/0154477 A1 | 7/2005 | Martin et al. | |
| 2005/0193285 A1 | 9/2005 | Jeon | |
| 2005/0281263 A1 | 12/2005 | Miyamoto et al. | |
| 2006/0068762 A1 | 3/2006 | Baldwin et al. | |
| 2006/0174707 A1 | 8/2006 | Zhang | |
| 2006/0294047 A1 | 12/2006 | Johnston et al. | |
| 2007/0019641 A1 | 1/2007 | Pai et al. | |
| 2008/0027704 A1 | 1/2008 | Kephart et al. | |
| 2008/0168092 A1 | 7/2008 | Boggs et al. | |
| 2008/0317058 A1 | 12/2008 | Williams | |
| 2009/0052409 A1 | 2/2009 | Chen et al. | |
| 2009/0089227 A1 | 4/2009 | Sturrock et al. | |
| 2009/0172637 A1* | 7/2009 | Parikh | G06F 8/427 717/114 |
| 2009/0183201 A1* | 7/2009 | Dasgupta | G09B 7/00 725/40 |
| 2009/0198350 A1 | 8/2009 | Thiele | |
| 2009/0265036 A1 | 10/2009 | Jamieson et al. | |
| 2009/0326892 A1 | 12/2009 | Lin | |
| 2010/0070852 A1 | 3/2010 | Li | |
| 2010/0256794 A1 | 10/2010 | McLaughlin et al. | |
| 2010/0256795 A1* | 10/2010 | McLaughlin | G05B 19/4183 700/110 |
| 2010/0257228 A1 | 10/2010 | Staggs et al. | |
| 2010/0289652 A1 | 11/2010 | Javey et al. | |
| 2010/0318392 A1 | 12/2010 | Cassels et al. | |
| 2011/0060907 A1 | 3/2011 | Hartmann et al. | |
| 2011/0066298 A1 | 3/2011 | Francino et al. | |
| 2011/0103393 A1 | 5/2011 | Meier et al. | |
| 2011/0134930 A1 | 6/2011 | McLaren et al. | |
| 2011/0145836 A1 | 6/2011 | Wheeler et al. | |
| 2011/0264622 A1 | 10/2011 | Vargas et al. | |
| 2012/0143378 A1 | 6/2012 | Spears et al. | |
| 2012/0144202 A1 | 6/2012 | Counterman | |
| 2012/0166963 A1 | 6/2012 | Kohli et al. | |
| 2012/0232869 A1 | 9/2012 | Maturana et al. | |
| 2012/0237016 A1 | 9/2012 | Hegde et al. | |
| 2012/0304247 A1* | 11/2012 | Badger | G06F 21/6218 726/1 |
| 2012/0331104 A1 | 12/2012 | Akiyama et al. | |
| 2013/0067090 A1 | 3/2013 | Batrouni et al. | |
| 2013/0081146 A1 | 3/2013 | Hakozaki | |
| 2013/0110298 A1 | 5/2013 | Beveridge | |
| 2013/0123965 A1 | 5/2013 | Cooper et al. | |
| 2013/0124253 A1 | 5/2013 | Cooper et al. | |
| 2013/0150986 A1 | 6/2013 | Timsjo et al. | |
| 2013/0191106 A1 | 7/2013 | Kephart et al. | |
| 2013/0211559 A1 | 8/2013 | Lawson et al. | |
| 2013/0211870 A1 | 8/2013 | Lawson et al. | |
| 2013/0212420 A1 | 8/2013 | Lawson et al. | |
| 2013/0225151 A1 | 8/2013 | King et al. | |
| 2013/0227446 A1 | 8/2013 | Zala et al. | |
| 2013/0262678 A1 | 10/2013 | Tung et al. | |
| 2013/0266193 A1* | 10/2013 | Tiwari | G06K 9/00771 382/115 |
| 2013/0269020 A1 | 10/2013 | Griffin et al. | |
| 2013/0283151 A1* | 10/2013 | Deguzman | G06F 17/211 715/239 |
| 2013/0290952 A1* | 10/2013 | Childers, Jr. | G06F 9/5077 718/1 |
| 2014/0047107 A1 | 2/2014 | Maturana et al. | |
| 2014/0147064 A1 | 2/2014 | Maturana et al. | |
| 2014/0115592 A1 | 4/2014 | Frean et al. | |
| 2014/0156234 A1 | 6/2014 | Maturana et al. | |
| 2014/0157368 A1 | 6/2014 | Shah et al. | |
| 2014/0164124 A1 | 6/2014 | Rhoads | |
| 2014/0207868 A1 | 7/2014 | Gordon et al. | |
| 2014/0245208 A1 | 8/2014 | Javey et al. | |
| 2014/0257528 A1 | 9/2014 | Perez et al. | |
| 2014/0269531 A1 | 9/2014 | Luna et al. | |
| 2014/0274005 A1 | 9/2014 | Luna et al. | |
| 2014/0280796 A1 | 9/2014 | Pijewski | |
| 2014/0282015 A1 | 9/2014 | Nixon et al. | |
| 2014/0336785 A1* | 11/2014 | Asenjo | G05B 19/4185 700/17 |
| 2014/0336791 A1 | 11/2014 | Asenjo et al. | |
| 2014/0336795 A1 | 11/2014 | Asenjo et al. | |
| 2014/0337429 A1 | 11/2014 | Asenjo et al. | |
| 2014/0337473 A1 | 11/2014 | Frusina et al. | |
| 2015/0113627 A1 | 4/2015 | Curtis et al. | |
| 2015/0120821 A1* | 4/2015 | Bendell | G06F 16/957 709/203 |
| 2015/0220080 A1 | 8/2015 | Nixon et al. | |
| 2015/0277406 A1* | 10/2015 | Maturana | G05B 19/0423 700/83 |
| 2015/0281319 A1* | 10/2015 | Maturana | G06F 9/5072 709/202 |
| 2015/0281355 A1* | 10/2015 | Maturana | H04L 67/1097 709/202 |
| 2015/0281453 A1* | 10/2015 | Maturana | H04M 3/5233 379/265.12 |
| 2015/0287318 A1 | 10/2015 | Nair et al. | |
| 2015/0316904 A1 | 11/2015 | Govindaraj et al. | |
| 2015/0324502 A1* | 11/2015 | Eberhardt | G06F 17/5004 703/6 |
| 2015/0363902 A1 | 12/2015 | Wada et al. | |

(56) References Cited

U.S. PATENT DOCUMENTS

| | | | |
|---|---|---|---|
| 2015/0381744 A1* | 12/2015 | Na | G06F 9/5072 709/203 |
| 2016/0023351 A1 | 1/2016 | Kuffner et al. | |
| 2016/0041565 A1 | 2/2016 | Edwards | |
| 2016/0112283 A1 | 4/2016 | Maturana et al. | |
| 2016/0125487 A1 | 5/2016 | Hamby | |
| 2016/0142396 A1 | 5/2016 | McRoberts et al. | |
| 2016/0163179 A1* | 6/2016 | Matsumoto | G08B 21/182 340/540 |
| 2016/0179993 A1 | 6/2016 | Maturana et al. | |
| 2016/0182309 A1 | 6/2016 | Maturana et al. | |
| 2016/0256775 A1 | 9/2016 | Gustafson et al. | |
| 2016/0335875 A1 | 11/2016 | Alcorn et al. | |
| 2016/0349140 A1 | 12/2016 | Teymouri | |
| 2016/0350093 A1* | 12/2016 | Walker | H04L 9/3247 |
| 2017/0102693 A1* | 4/2017 | Kidd | G05B 19/41865 |
| 2017/0102694 A1* | 4/2017 | Enver | G05B 19/41875 |
| 2017/0212562 A1 | 7/2017 | Wang et al. | |
| 2017/0238072 A1 | 8/2017 | Mackie et al. | |
| 2018/0033087 A1 | 2/2018 | Delinselle et al. | |
| 2018/0182228 A1 | 6/2018 | Alcorn et al. | |
| 2018/0300639 A1 | 10/2018 | Abbas | |
| 2018/0356780 A1* | 12/2018 | Halabieh | G05B 19/042 |
| 2018/0367560 A1 | 12/2018 | Mahaffey et al. | |
| 2019/0049332 A1 | 2/2019 | Shamir et al. | |

FOREIGN PATENT DOCUMENTS

| | | |
|---|---|---|
| CN | 103293953 | 9/2013 |
| CN | 203466840 | 3/2014 |
| CN | 103701953 A | 4/2014 |
| EP | 1422619 | 5/2004 |
| EP | 2228965 | 9/2010 |
| EP | 2541354 | 1/2013 |
| EP | 2592812 | 5/2013 |
| EP | 2660667 | 11/2013 |
| EP | 2704401 | 3/2014 |
| EP | 2 924 571 A2 | 9/2015 |
| WO | 01/15001 A2 | 3/2001 |

OTHER PUBLICATIONS

Office Action for U.S. Appl. No. 14/562,233 dated Dec. 29, 2017, 36 pages.
Office Action for Chinese Application Serial No. 201510138371.0 dated Nov. 14, 2017, 5 pages.
Office Action for U.S. Appl. No. 15/431,128 dated Oct. 18, 2017, 37 pages.
Non-Final Office Action received for U.S. Appl. No. 15/271,752 dated Apr. 13, 2018, 56 pages.
Final Office Action received for U.S. Appl. No. 14/562,233 dated Jun. 15, 2018, 35 pages.
Office Action for U.S. Appl. No. 14/634,174, dated Aug. 4, 2016, 11 pages.
Office Action for U.S. Appl. No. 14/525,131, dated Jun. 28, 2016, 36 pages.
Office Action for U.S. Appl. No. 14/665,128, dated Jul. 20, 2016, 9 pages.
Office Action from U.S. Appl. No. 14/525,144, dated Sep. 9, 2016, 28 pages.
Extended European Search Report for EP Application Serial No. 15160984.9, dated Jul. 4, 2016, 10 pages.
European Office Action for EP Application Serial No. 15160984.9, dated Aug. 8, 2016, 2 pages.
Extended European Search Report for EP Application Serial No. 15160944.3, dated Jul. 8, 2016, 9 pages.
European Office Action for EP Application Serial No. 15160944.3, dated Aug. 16, 2016, 2 pages.
Extended European Search Report for EP Application Serial No. 15160868.4, dated Jun. 29, 2016, 11 pages.
European Office Action for EP Application Serial No. 15160868.4, dated Aug. 1, 2016, 2 pages.
Extended European Search Report for EP Application Serial No. 15160980.7, dated Jul. 28, 2016, 10 pages.
Extended European Search Report for EP Application Serial No. 15160924.5, dated Jul. 14, 2016, 10 pages.
European Office Action for EP Application Serial No. 15160924.5, dated Aug. 22, 2016, 2016, 2 pages.
Extended European Search Report for EP Application Serial No. 15160941.9, dated Jul. 27, 2016, 12 pages.
Extended European Search Report for EP Application Serial No. 15160987.2, dated Jul. 11, 2016, 9 pages.
European Office Action for EP Application Serial No. 15160987.2, dated Aug. 16, 2016, 2 pages.
"Steiner, J. G., et al., "Kerberos: An Authentication Service for Open Network Systems," Proceedings of the Winter UsenixConference, Feb. 9, 1988, pp. 191-202".
Extended European Search Report for EP Application Serial No. 15160989.8, dated Sep. 22, 2016, 5 pages.
Extended European Search Report for EP Application Serial No. 15160988.0, dated Sep. 16, 2016, 9 pages.
European Office Action for EP Application Serial No. 15160941.9, dated Aug. 29, 2016, 2 pages.
European Office Action for EP Application Serial No. 15160980.7, dated Sep. 5, 2016, 2 pages.
Office Action for U.S. Appl. No. 14/525,131, dated Oct. 4, 2016, 56 pages.
Office Action for U.S. Appl. No. 14/634,174, dated Nov. 4, 2016, 25 pages.
European Office Action for EP Application Serial No. 15160988.0, dated Oct. 24, 2016, 2 pages.
Office Action for U.S. Appl. No. 14/562,233, dated Jan. 25, 2017, 25 pages.
Office Action for U.S. Appl. No. 14/639,279, dated Feb. 10, 2017, 110 pages.
Office Action for U.S. Appl. No. 14/525,131, dated Feb. 3, 2017, 21 pages.
Office Action for U.S. Appl. No. 14/525,144, dated Feb. 3, 2017, 42 pages.
Office Action for U.S. Appl. No. 14/525,149, dated Feb. 27, 2017, 76 pages.
Office Action for U.S. Appl. No. 14/634,174, dated Feb. 3, 2017, 12 pages.
Office Action for Chinese Application No. 201510136419.4, dated Apr. 21, 2017, 10 pages.
Office Action for Chinese Application No. 201510135130.0, dated May 3, 2017, 15 pages.
Office Action for U.S. Appl. No. 14/478,974, dated Jun. 15, 2017, 11 pages.
Office Action for U.S. Appl. No. 14/619,933 dated May 15, 2017, 11 pages.
Office Action for Chinese Application No. 201510138371.0 dated May 4, 2017, 15 pages.
Final Office Action for U.S. Appl. No. 14/525,149, dated Jul. 7, 2017, 77 pages.
Final Office Action received for U.S. Appl. No. 15/271,752 dated Oct. 5, 2018, 35 pages.
Chinese Office Action and English Translation thereof dated Jul. 12, 2017, for Chinese Application Serial No. 201510138210.1, 17 pages.
Final Office Action for U.S. Appl. No. 14/562,233, dated Jul. 28, 2017, 33 pages.
Final Office Action for U.S. Appl. No. 14/639,279, dated Aug. 9, 2017, 66 pages.
Office Action for U.S. Appl. No. 14/525,149 dated Oct. 5, 2017, 88 pages.
European Office Action for European Application Serial No. 15160984.9 dated Feb. 15, 2018, 7 pages.
European Office Action for European Application Serial No. 15160941.9, dated Jan. 15, 2018, 5 pages.
European Office Action for European Application Serial No. 15160868.4, dated Jan. 10, 2018, 8 pages.

(56) References Cited

OTHER PUBLICATIONS

European Office Action for European Application Serial No. 15160924.5, dated Feb. 8, 2018, 5 pages.
European Office Action for European Application Serial No. 15160944.3, dated Feb. 15, 2018, 7 pages.
European Office Action for European Application Serial No. 15160980.7, dated Feb. 15, 2018, 8 pages.
European Office Action for European Application Serial No. 15160987.2, dated Feb. 12, 2018, 7 pages.
European Office Action for European Application Serial No. 15160988.0, dated Feb. 9, 2018, 5 pages.
Extended European Search Report received for EP Patent Application Serial No. 18182852.6 dated Nov. 22, 2018, 7 pages.
Communication Pursuant to Rule 69 EPC received for EP Patent Application Serial No. 18182852.6 dated Jan. 21, 2019, 2 pages.
Notice of Allowance received for U.S. Appl. No. 15/795,512 dated Feb. 6, 2019, 105 pages.
Non-Final Office Action received for U.S. Appl. No. 15/271,752 dated Mar. 15, 2019, 32 pages.
Non-Final Office Action received for U.S. Appl. No. 15/692,213 dated Apr. 5, 2019, 64 pages.
Extended European Search Report received for EP Patent Application Serial No. 18191111.6 dated Feb. 12, 2019, 12 pages.
Communication Pursuant to Rule 69 EPC received for EP Patent Application Serial No. 18191111.6 dated Mar. 18, 2019, 2 pages.
Extended European Search Report received for EP Patent Application Serial No. 18187973.5 dated Dec. 14, 2018, 6 pages.
Communication Pursuant to Rule 69 EPC received for EP Patent Application Serial No. 18187973.5 dated Feb. 25, 2019, 2 pages.
Non-Final Office Action received for U.S. Appl. No. 15/966,546 dated May 10, 2019, 177 pages.
Final Office Action received for U.S. Appl. No. 15/271,752 dated Aug. 1, 2019, 44 pages.

\* cited by examiner

```xml
<?xml version="1.0" encoding="utf-8"?>
<Cloud_FTLiveData_TagsList Created="12/1/2014 10:04:37 AM" version="Version 5.4.8.11">
    <Tag Name="EAL_P50.Sts_PV" IsDiscrete="True" IsAnalog="False">
        <Descriptor>Pump P-50 Motor Powered</Descriptor>
        <ExtendedDesc>P-50 Motor Power</ExtendedDesc>
        <EngUnit>0-Pwr Loss</EngUnit>
        <DigitalStateSet>BatchAct</DigitalStateSet>
        <Parent>Pump_P50</Parent>
        <ParentFullPath>Line1.Pump_P50</ParentFullPath>
        <ControllerDeviceShortcutName>Mos</ControllerDeviceShortcutName>
        <TagAddress>/NorthPlant/DataServer1::[Mos]EAL_P50</TagAddress>
        <Max>1</Max>
        <Min>0</Min>
        <DataType>BOOL</DataType>
        <ScanPeriodInSeconds>1</ScanPeriodInSeconds>
    </Tag>
```

FIG. 18

MODULAR CONTROL MANIFEST GENERATOR FOR CLOUD AUTOMATION

TECHNICAL FIELD

The subject matter disclosed herein relates generally to industrial data collection, and, more particularly, to configuration of cloud-based industrial data collection.

BACKGROUND

The large quantity of data generated by modern industrial automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application are often required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

Cloud-based data storage and processing can allow industrial data storage and analytics to be moved from the plant facility to a remote cloud platform. Such cloud-based architectures open the possibility of collective analysis of data from multiple facilities, global access to industrial system performance data, and rapid notification of system issues. Given the large number of data points generated by the many automation systems that make up an industrial enterprise, configuration of cloud-based data collection of these numerous data points can be a time-consuming and labor intensive task.

The above-described deficiencies of current horizontal cabling techniques are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a system for generating manifest files is provided, comprising a device interface component configured to import an industrial controller program file and to extract data tag information from the industrial controller program file, wherein the data tag information identifies data tags defined in the industrial controller program file; a user interface component configured to generate interface displays that render the data tags based on the data tag information and are configured to receive, via interaction with the interface displays, tag selection input data that selects a subset of the data tags to be collected by a cloud-based industrial data collection system; and a manifest generation component configured to generate a system manifest file and a data manifest file based on the tag selection input data, wherein the system manifest file and the data manifest file configure the cloud-based industrial data collection system to collect and process data from the subset of the data tags. The system manifest depicts the industrial application functional topology by functions and relationships. The data manifest depicts subsets of tags (input and output parameters to and from the executing device point of view) organized as data processing clusters to be given to the device-data collection functions during runtime initialization.

Also, one or more embodiments provide a method for configuring a cloud-based industrial data collection system, comprising importing, by a system comprising a processor, an industrial controller program file; extracting, by the system, data tag information from the industrial controller program file, wherein the data tag information identifies data tags defined in the industrial controller program file; generating, by the system, interface displays that render the data tags based on the data tag information; receiving, by the system via interaction with the interface displays, tag selection input data that selects a subset of the data tags to be collected by a cloud-based industrial data collection system; and generating, by the system, a system manifest file and a data manifest file based on the tag selection input data, wherein the system manifest file and the data manifest file configure the cloud-based industrial data collection system to collect and process data from the subset of the data tags.

Also, according to one or more embodiments, a non-transitory computer-readable medium is provided having stored thereon instructions that, in response to execution, cause a system to perform operations, the operations, comprising importing an industrial controller program file; generating data tag information based on analysis of the industrial controller program file, wherein the data tag information identifies data tags defined in the industrial controller program file; generating interface displays that render the data tags based on the data tag information; receiving, via interaction with the interface displays, tag selection input data that selects a subset of the data tags to be collected by a cloud-based industrial data collection system; and generating a system manifest file and a data manifest file based on the tag selection input data, wherein the system manifest file and the data manifest file configure the cloud-based industrial data collection system to collect and process data from the subset of the data tags. Both manifests act at multiple tiers of the industrial enterprise from level 0 thru level 5 of the enterprise reference model.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 18 is an example interface display that renders data manifest data.

DETAILED DESCRIPTION

Figure 1:
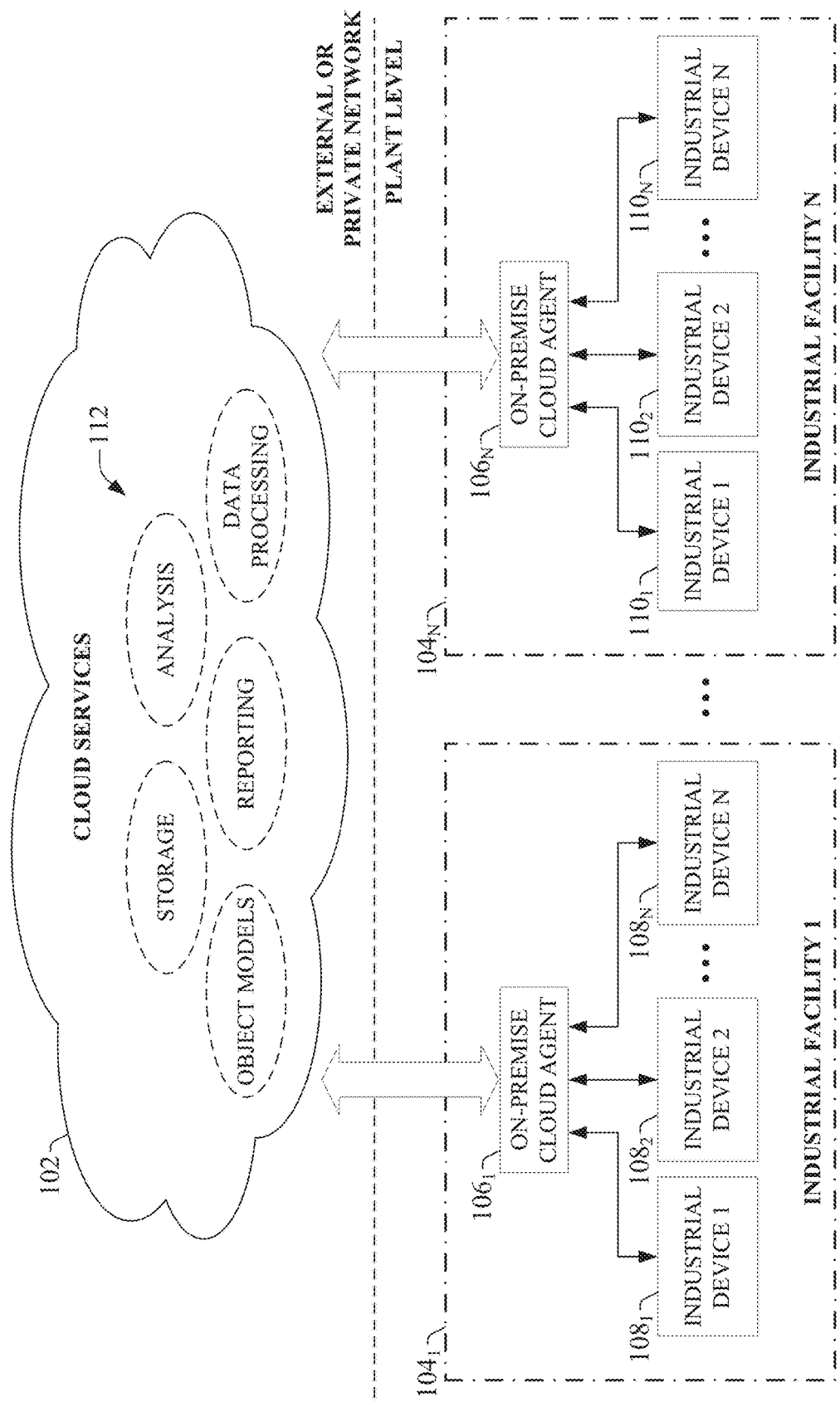
FIG. 1 is a high-level overview of an industrial enterprise that leverages cloud-based services.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that make up a typical automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. The amount of generated automation data further increases as additional plant facilities are added to an industrial enterprise.

The large quantity of data generated by modern automation systems makes it possible to apply a broad range of plant analytics to the automation systems and processes that make up an industrial enterprise or business. However, access to the industrial data is typically limited to applications and devices that share a common network with the industrial controllers that collect and generate the data. As such, plant personnel wishing to leverage the industrial data generated by their systems in another application (e.g., a reporting or analysis tool, notification system, visualization application, backup data storage, etc.) are often required to maintain such applications on-site using local resources. Moreover, although a given industrial enterprise may comprise multiple plant facilities at geographically diverse locations (or multiple mobile systems having variable locations), the scope of such applications is limited only to data available on controllers residing on the same local network as the application.

To transcend these limitations, a cloud computing architecture can be used to remotely collect, store, and process industrial data. An example of such a cloud-level industrial data processing and analysis system can utilize a system model that represents the physical and/or logical layout of the on-premise automation systems (that is, the industrial automations systems residing on the plant floor of one or more industrial facilities). Ideally, this system model would be capable of dynamic reconfiguration to reflect changes to the physical automation systems on the plant floor, rather than requiring complete redeployment of the cloud-side application when the physical automation system is reconfigured.

To address these and other issues, one or more embodiments of the present disclosure provide a manifest generation system that generates a system model for a cloud computing platform architecture. The system model is generated in the form of system and data manifests that act as an information concentrator for configuring various aspects of data ingestion and data management. The manifest generation system leverages both information extracted from industrial devices, applications, and programs that make up physical industrial automation systems, as well as user selections identifying which data tags are to be collected, specifying data collection preferences, etc. In this way, manifest data for configuring cloud-level data monitoring and collection is mapped to the automation and control system configurations via information extracted from the system-level topology. This approach can automate and simplify aspects of the cloud-based data collection configuration process.

FIG. 1 illustrates an example high-level overview of an industrial enterprise that leverages cloud-based services. Although examples of the manifest generation system are described herein in connection with the agent-based data collection and analysis system depicted in FIG. 1, it is to be appreciated that the manifest generation system is not limited to use with these illustrated systems. Rather, embodiments of the manifest generation system are capable of generating manifest data for configuring other types of cloud-based industrial data collection systems that utilized models of physical industrial automation systems.

The enterprise depicted in FIG. 1 comprises one or more industrial facilities 104, each having a number of industrial devices 108 and 110 in use. The industrial devices 108 and 110 can make up one or more automation systems operating within the respective facilities 104. Example automation systems can include, but are not limited to, batch control systems (e.g., mixing systems), continuous control systems (e.g., PID control systems), or discrete control systems. Industrial devices 108 and 110 can include such devices as industrial controllers (e.g., programmable logic controllers or other types of programmable automation controllers); field devices such as sensors and meters; motor drives; operator interfaces (e.g., human-machine interfaces, industrial monitors, graphic terminals, message displays, etc.); industrial robots, barcode markers and readers; vision system devices (e.g., vision cameras); smart welders; or other such industrial devices.

Example automation systems can include one or more industrial controllers that facilitate monitoring and control of their respective processes. The controllers exchange data with the field devices using native hardwired I/O or via a plant network such as Ethernet/IP, Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motion control signals, and the like. The control program can comprise any suitable type of code used to process input signals read into the controller and to control output signals generated by the controller, including but not limited to ladder logic, sequential function charts, function block diagrams, structured text, or other such platforms.

Although the example overview illustrated in FIG. 1 depicts the industrial devices 108 and 110 as residing in fixed-location industrial facilities 104, the industrial devices 108 and 110 may also be part of a mobile control application, such as a system contained in a truck or other service vehicle.

In the illustrated example, on-premise cloud agent devices 106 can collect data from industrial devices 108 and 110—or from other data sources, including but not limited to data historians, business-level systems, etc.—and send this data to cloud platform 102 for processing and storage. Cloud platform 102 can be any infrastructure that allows cloud services 112 to be accessed and utilized by cloud-capable devices. Cloud platform 102 can be a public cloud accessible via the Internet by devices having Internet connectivity and appropriate authorizations to utilize the services 112. In some scenarios, cloud platform 102 can be provided by a cloud provider as a platform-as-a-service (PaaS), and the services 112 (such as the manifest system described herein) can reside and execute on the cloud platform 102 as a cloud-based service. In some such configurations, access to the cloud platform 102 and the services 112 can be provided to customers as a subscription service by an owner of the services 112. Alternatively, cloud platform 102 can be a private or semi-private cloud operated internally by the enterprise, or a shared or corporate cloud environment. An exemplary private cloud can comprise a set of servers hosting the cloud services 112 and residing on a corporate network protected by a firewall.

Cloud services 112 can include, but are not limited to, data storage, data analysis, control applications (e.g., applications that can generate and deliver control instructions to industrial devices 108 and 110 based on analysis of real-time system data or other factors), visualization applications such as the cloud-based operator interface system described herein, reporting applications, Enterprise Resource Planning (ERP) applications, notification services, or other such applications. Cloud platform 102 may also include one or more object models to facilitate data ingestion and processing in the cloud. If cloud platform 102 is a web-based cloud, cloud agent devices 106 at the respective industrial facilities 104 may interact with cloud services 112 directly or via the Internet. In an exemplary configuration, the industrial devices 108 and 110 connect to the on-premise cloud agent devices 106 through a physical or wireless local area network or radio link. In another exemplary configuration, the industrial devices 108 and 110 may access the cloud platform 102 directly using integrated cloud agent devices. Example cloud agent devices and their associated data collection and processing services are discussed in more detail below.

Ingestion of industrial device data in the cloud platform 102 through the use of cloud agent devices 106 can offer a number of advantages particular to industrial automation. For one, cloud-based storage offered by the cloud platform 102 can be easily scaled to accommodate the large quantities of data generated daily by an industrial enterprise. Moreover, multiple industrial facilities at different geographical locations can migrate their respective automation data to the cloud for aggregation, collation, collective analysis, visualization, and enterprise-level reporting without the need to establish a private network between the facilities. Cloud agent devices 106 can be configured to automatically detect and communicate with the cloud platform 102 upon installation at any facility, simplifying integration with existing cloud-based data storage, analysis, or reporting applications used by the enterprise. In another example application, cloud-based diagnostic applications can monitor the health of respective automation systems or their associated industrial devices across an entire plant, or across multiple industrial facilities that make up an enterprise. Cloud-based lot control applications can be used to track a unit of product through its stages of production and collect production data for each unit as it passes through each stage (e.g., barcode identifier, production statistics for each stage of production, quality test data, abnormal flags, etc.). Moreover, cloud based control applications can perform remote decision-making for a controlled industrial system based on data collected in the cloud from the industrial system, and issue control commands to the system via the cloud agent device. These industrial cloud-computing applications are only intended to be exemplary, and the systems and methods described herein are not limited to these particular applications. The cloud platform 102 can allow software vendors to provide software as a service, removing the burden of software maintenance, upgrading, and backup from their customers.

Figure 2:
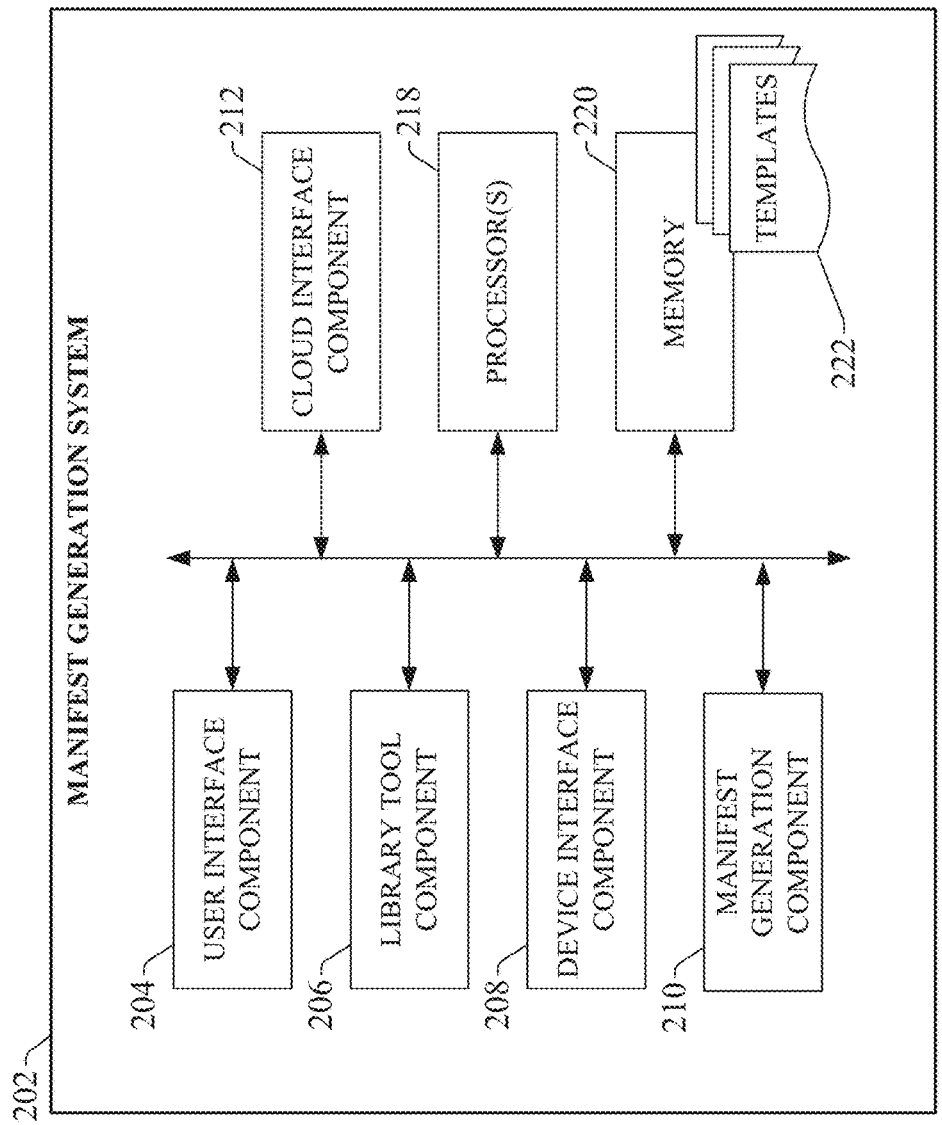
FIG. 2 is a block diagram of an example manifest generation system.

FIG. 2 is a block diagram of an example manifest generation system 202 according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Manifest generation system 202 can include a user interface component 204, a library tool component 206, a device interface component 208, a manifest generation component 210, a cloud interface component 212, one or more processors 218, and memory 220. In various embodiments, one or more of the user interface component 204, library tool component 206, device interface component 208, manifest generation component 210, cloud interface component 212, the one or more processors 218, and memory 220 can be electrically and/or communicatively coupled to one another to perform one or more of the functions of the manifest generation system 202. In some embodiments, components 204, 206, 208, 210, and 212 can comprise software instructions stored on memory 220 and executed by processor(s) 218. Manifest generation system 202 may also interact with other hardware and/or software components not depicted in FIG. 2. For example, processor(s) 218 may interact with one or more external user interface devices, such as a keyboard, a mouse, a display monitor, a touchscreen, or other such interface devices.

User interface component 204 can be configured to receive user input and to render output to the user in any suitable format (e.g., visual, audio, tactile, etc.). In some embodiments, user interface component 204 can be configured to generate graphical display interfaces that guide the user through the process of entering selection and configuration input used to generate system and tag manifests. Library tool component 206 can be configured to generate application instances based on template data 222 stored in a template library, and compile the application instances to yield executable files that can be executed on industrial devices.

The device interface component 208 can be configured to establish a communicative link between the manifest generation system and an endpoint device, such as an industrial controller or other type of industrial device. Device interface component 208 can detect an industrial controller program (e.g., an off-line copy of the controller program) stored on a controller or other computing device to which the manifest generation system 202 is interfaced, and automatically import information about the control program—e.g., a name of the corresponding controller, data tags defined in the program, tasks or routines defined in the program, etc.—into the manifest generation system 202. Manifest generation component 210 can be configured to generate system and data manifest files based on a defined logical composition of templates.

The one or more processors 218 can perform one or more of the functions described herein with reference to the systems and/or methods disclosed. Memory 220 can be a computer-readable storage medium storing computer-executable instructions and/or information for performing the functions described herein with reference to the systems and/or methods disclosed.

Figure 3:
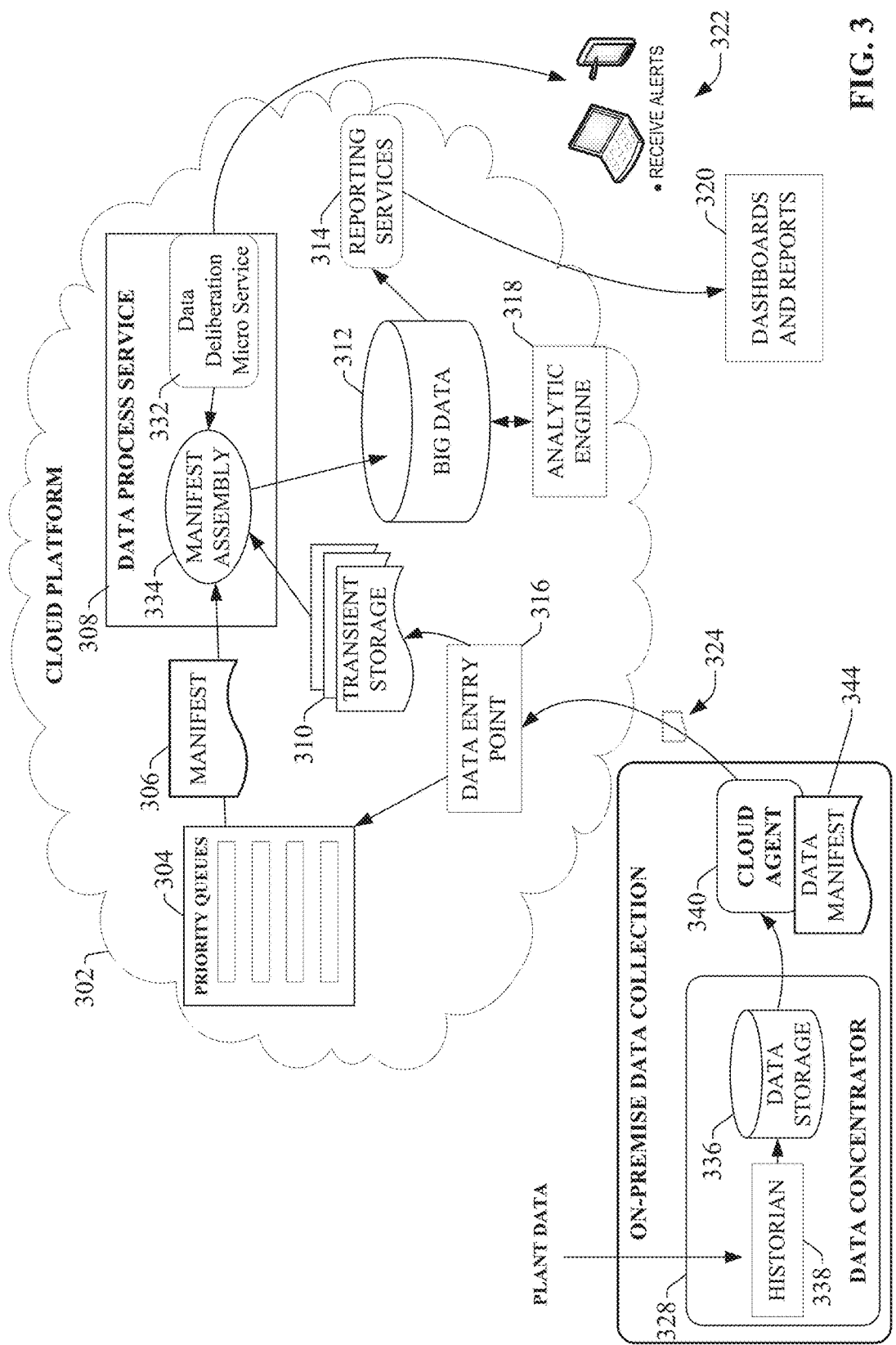
FIG. 3 is an overview of a system that leverages an agent-based cloud infrastructure to provide data collection and processing services to customer manufacturing sites.

FIG. 3 is an overview of an example industrial data collection and processing architecture that leverages an agent-based cloud infrastructure to provide data collection and processing services to customer manufacturing sites. While the manifest generation system 202 is described herein as being used to generate manifest data of the architecture depicted in FIG. 3, it is to be appreciated that embodiments of the manifest generation system 202 are not limited to use with this illustrated architecture, but rather can be configured to generate manifest data (or other system model representations) for other types of cloud-based data collection architectures.

The example system depicted in FIG. 3 can provide remote collection and monitoring services in connection with alarm and event notification for critical industrial assets, historical data collection, remote system access, system optimization, remote closed-loop control, and other such applications. The cloud-based infrastructure can enable remote monitoring and reporting of on-premise assets by implementing six general areas of functionality—data ingestion into the cloud, data priority, object modeling, data processing, data analytics, and reporting.

In the example illustrated in FIG. 3, a data concentrator 328 collects plant data from one or more industrial assets (e.g., data generated by one or more industrial controllers, such as industrial devices 108 or 110) at a plant facility. These industrial assets can include industrial controllers that monitor and control industrial I/O devices, data servers and historians, motor drives, remote I/O interfaces that remotely interface groups of I/O devices to one or more of the industrial controllers, boilers or other industrial machines, or other such assets. For example, data concentrator 328 can monitor one or more controller tags defined in a tag archive and store data in local data storage 336 (e.g., a local structured query language, or SQL, server) associated with a historian 338. The collected data can include historical data (e.g., alarm history, status history, trend data, etc.), live data values read from the industrial assets, alarm data generated by the industrial assets, or other types of data.

An on-premise cloud agent device 340 is configured to collect the live or historical data from the industrial assets, either directly or by accessing data storage 336 associated with data concentrator 228. Cloud agent device 340 can execute on any suitable hardware platform (e.g., a server, a LINUX box, etc.), and acts as a generic gateway that collects data items from the various industrial assets on the plant network and packages the collected data according to a generic, uniform data packaging schema used to move the on-premise data to a cloud platform 302. Cloud agent device 340 provides a software mechanism to dynamically link on-premise-to-cloud gateways. A data manifest file 344 defining the data points to be collected can be deployed to the cloud agent device 340 to facilitate local configuration of the agent-based data collection and migration. Cloud agent device 340 provides an expandable data type schema that allows new data types to be added without the need to redeploy the monitoring system to the cloud.

During data collection, the cloud agent device 340 can intelligently sort and organize the data based on defined criteria, including but not limited to time of occurrence and/or user-defined priorities. Cloud agent device 340 can be, for example, a service (e.g., a Windows service) that periodically collects and transmits serialized and compressed data into the cloud domain using standard web services over HTTPS/SSL.

FIG. 3 depicts data concentrator 328 as the data source for cloud agent device 340. This configuration can be useful if there are a large number of data points to monitor, since the data concentrator can 328 can link multiple industrial devices or other data sources to a single cloud agent device 340. However, some embodiments of cloud agent device 340 can collect data directly from the industrial assets themselves; e.g., through a common industrial protocol link, or through middleware applications such as OPC clients.

Figure 4:
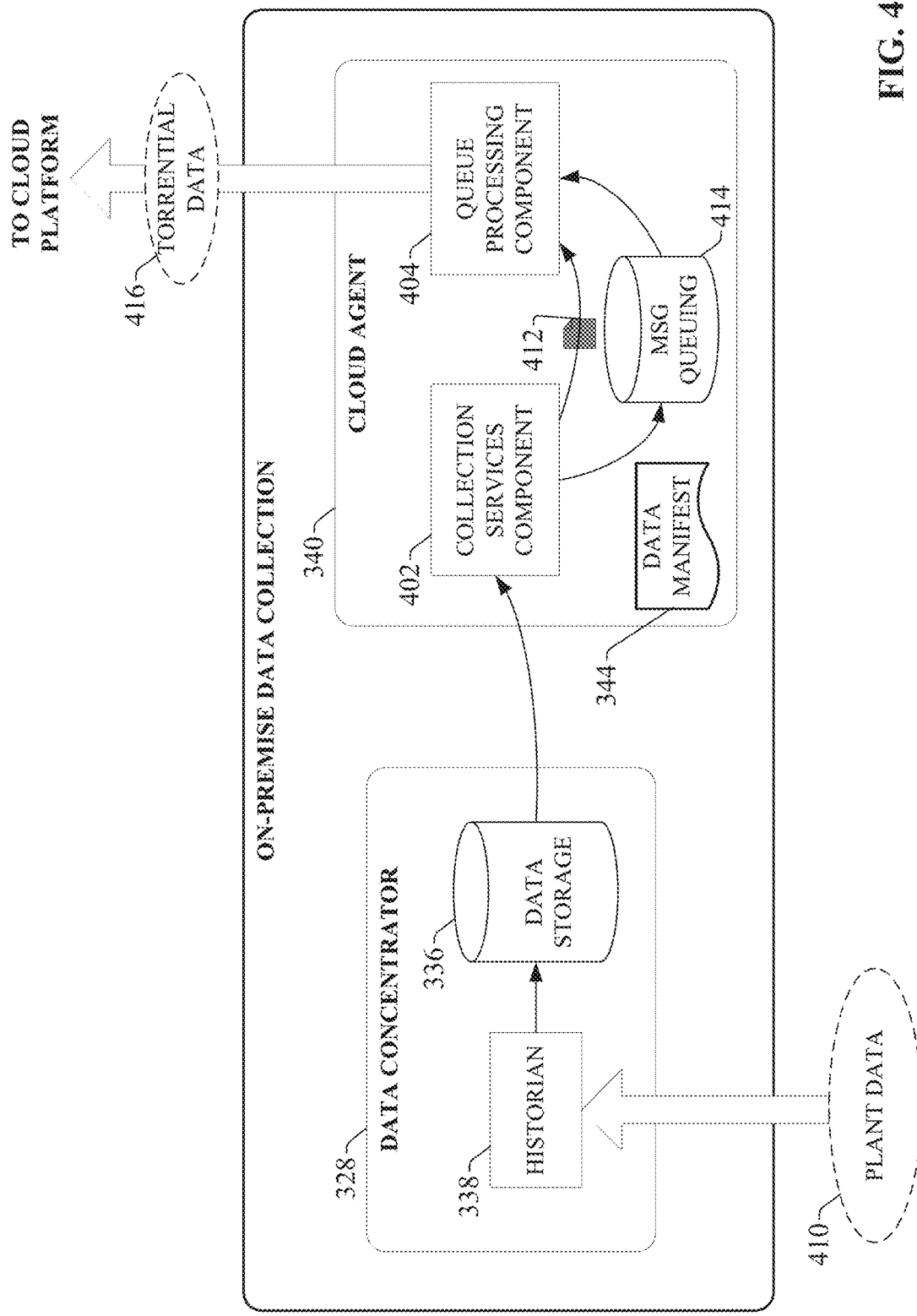
FIG. 4 is a block diagram illustrating on-premise data collection.

Cloud agent device functionality is illustrated in more detail with reference to FIG. 4. On-premise data collection is enabled by a collection of services that function as a virtual support engineer for processing data. Data concentrator 328 and cloud agent device 340 respectively implement two main functions associated with data collection—data concentration using a historian 338 and associated data storage 336 (e.g., an SQL server), and cloud data enablement using cloud agent services executed by cloud agent device 340. As noted above, plant data 410 is collected by data concentrator 328 at the plant facility. In an example scenario, plant data 410 may comprise stamping press time series sensor data, made up of thousands of data points updated at a rate of less than a second.

Collection services component 402 of cloud agent device 340 implements collection services that collect device data, either from data concentrator's associated data storage (e.g., via an SQL query) or directly from the devices themselves via a common industrial protocol (CIP) link or other suitable communication protocol. Collection services component 402 collects the device data in accordance with the data collection point definitions set forth in data manifest file 344. For example, to obtain data from data concentrator 328, collection services component 402 may periodically run a data extraction query (e.g., an SQL query) to extract data from data storage 336 associated with data concentrator 328. Collection services component 402 can then compress the data and store the data in a compressed data file 412. Queue processing services executed by queue processing component 404 can then read the compressed data file 412 and reference a message queuing database 414, which maintains and manage customer-specific data collection configuration information, as well as information relating to the customer's subscription to the cloud platform and associated cloud services. Based on configuration information in the message queuing database 414, queue processing component 404 packages the compressed data file 412 into a data packet and pushes the data packet to the cloud platform. In some embodiments, the cloud agent device 340 can support injecting data packets as torrential data 416.

Message queuing database 414 can include site-specific information identifying the data items to be collected (e.g., data tag identifiers), user-defined processing priorities for the data tags, firewall settings that allow cloud agent device 340 to communicate with the cloud platform through a plant firewall, and other such configuration information. Configuration information in message queuing database 414 instructs cloud agent device 340 how to communicate with the identified data tags and with the remote data collection services on the cloud platform.

In addition to collection and migration of data, one or more embodiments of cloud agent device 340 can also perform local analytics on the data prior to moving the data to the cloud platform. This can comprise substantially any type of pre-processing or data refinement that may facilitate efficient transfer of the data to the cloud, prepare the data for enhanced analysis in the cloud, reduce the amount of cloud storage required to store the data, or other such benefits. For example, cloud agent device 340 may be configured to compress the collected data using any suitable data compression algorithm prior to migrating the data to the cloud platform. This can include detection and deletion of redundant data bits, truncation of precision bits, or other suitable compression operations. In another example, cloud agent device 340 may be configured to aggregate data by combining related data from multiple sources. For example, data from multiple sensors measuring related aspects of an automation system can be identified and aggregated into a single cloud upload packet by cloud agent device 340. Cloud agent device 340 may also encrypt sensitive data prior to upload to the cloud. In yet another example, cloud agent device 340 may filter the data according to any specified filtering criterion (e.g., filtering criteria defined in a filtering profile stored on the cloud agent device). For example, defined filtering criteria may specify that pressure values exceeding a defined setpoint are to be filtered out prior to uploading the pressure values to the cloud.

In some embodiments, cloud agent device 340 may also transform a specified subset of the industrial data from a first format to a second format in accordance with a requirement of a cloud-based analysis application. For example, a cloud-based reporting application may require measured values in ASCII format. Accordingly, cloud agent device 340 can convert a selected subset of the gathered data from floating point format to ASCII prior to pushing the data to the cloud platform for storage and processing. Converting the raw data at the industrial device before uploading to the cloud, rather than requiring this transformation to be performed on the cloud, can reduce the amount of processing load on the cloud side.

Cloud agent device 340 may also associate metadata with selected subsets of the data prior to migration to the cloud, thereby contextualizing the data within the industrial environment. For example, cloud agent device 340 can tag selected subsets of the data with a time indicator specifying a time at which the data was generated, a quality indicator, a production area indicator specifying a production area within the industrial enterprise from which the data was collected, a machine or process state indicator specifying a state of a machine or process at the time the data was generated, a personnel identifier specifying an employee on duty at the time the data was generated, or other such contextual metadata. In this way, cloud agent device 340 can perform layered processing of the collected data to generate meta-level knowledge that can subsequently be leveraged by cloud-based analysis tools to facilitate enhanced analysis of the data in view of a larger plant context.

To ensure secure outbound traffic to the cloud, one or more embodiments of cloud agent device 340 can support HTTPS/SSL, certificate authority enabled transmission, and/or unique identity using MAC addresses. Cloud agent device 340 can also support store-and-forward capability to ensure data is not lost if the cloud agent device becomes disconnected from the cloud.

Returning now to FIG. 3, cloud agent device 340 sends compressed data packet 324 to the cloud-based data collection and monitoring system on cloud platform 302 via a cloud data entry point 316. The data packet 324 conveys parameters and data (compressed and serialized) used by the cloud-side services to reconstruct the domain data structure in the cloud using auxiliary tenant-level manifests. The cloud services direct the received data into transient storage 310. The cloud platform 302 can use agent reasoning and collective bargain features to determine a data storage locale.

Through the configuration interface provided by cloud agent device 340, users at the plant facility can dynamically configure one or more priority queues 304 that respectively define how the data packets are processed in the cloud platform 302. For example, separate queues may be defined for alarms, live data, and historical data, allowing data to be organized according to these data types. The historical data queue can relate to time-series records, which can be accessed through an application programming interface (API) (e.g., an SQL API or other suitable API). The alarms queue can relate to abnormal situations, where the alarm data can also be accessed through the API. This alarms queue can comprise multiple queues associated with different alarm priorities, to allow for individual processing for different alarms having different levels of criticality. In some embodiments, servers, controllers, switches, etc., can be monitored using a number of protocols, and at a certain point (e.g., at the end of a monitoring cycle) alarms can be queued and cloud agent device 340 can send the alarms to the cloud. Alarms can be reactive (e.g., alarms that trigger when a motor fails, when a CPU crashes, when an interlock is tripped, etc.) or proactive (e.g., a monitoring system may track consumables on a machine and generate an alarm when time to reorder, monitor cycle counts on a machine and generate an alarm when to schedule preventative maintenance, generate an alarm when temperatures fall outside defined bandwidths, send a notification when a computer's memory is 80% full, etc.).

The live data queue can relate to substantially real-time monitored data, such as current temperatures, current pressures, etc. The live data values can also be accessed through the API (e.g., a SQL API). The queues described above are not intended to be limiting, and it is to be appreciated that other types of priority queues can be defined according to the needs of the end user. For example, queues may be defined for specific devices or device types (e.g., motor drives) for uploading of device parameter and/or performance data.

In some embodiments, cloud agent device 340 can allow the user to define these priority queues 304 from the on-site location and to define how data in each queue is handled. For example, the user can define, for each queue, an upload frequency, a priority level (e.g., which data queues should take processing priority over other data queues), identities of cloud partitions or databases in which data from the respective queues should be stored, and other such information. In an example scenario, the live data queue may be defined to process live data values that are to be used by a remote operator interface application to view substantially real-time data from the plant facility, while historical data queue may be used to process historian data for archival storage in a historical database on cloud storage. Accordingly, the live data queue may be assigned a higher priority relative to the historical data queue, since data in the live data queue is more time-critical than data in the historical queue.

Through cloud agent device 340, users can assign priorities to respective data tags or tag groups at the customer site. These priority assignments can be stored in the message queuing database 414 of the cloud agent device 340. Accordingly, when queue processing component 404 packages the collected data to be moved to the cloud platform, the collected data items can be packaged into data packets according to priority (as defined in message queuing database 414), and the respective data packet headers populated with the appropriate priority level. If access to the cloud is unavailable, data will continue to be collected by collection services component 402 and stored locally on the cloud agent device in local storage associated with collections services. When communication to the cloud is restored, the stored data will be forwarded to cloud storage. Queue processing services can also encrypt and send storage account keys to the cloud platform for user verification.

Figure 5:
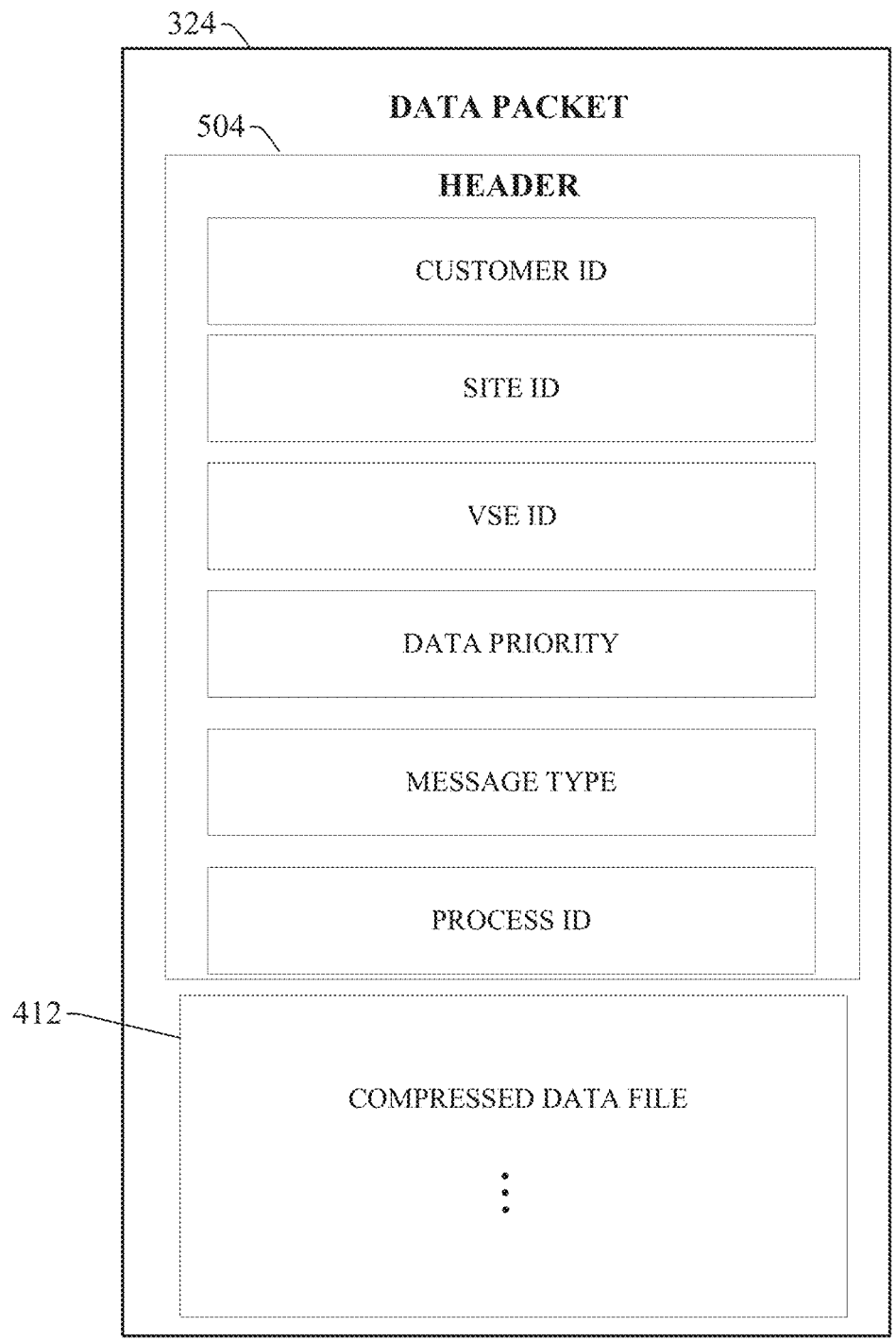
FIG. 5 is a diagram of an example compressed data packet.

Message queuing services implemented by queue processing component 404 of cloud agent device 340 encapsulates or packages the compressed data file by adding customer-specific header information to yield a compressed data packed (e.g., compressed data packet 324 of FIG. 3). For example, the queue processing component 404 can access a message queuing database (e.g., message queuing database 414 of FIG. 4), which stores customer site configuration information and manages the customer's subscription to the cloud platform services. The message queuing database may include such information as a customer identifier associated with the customer entity associated with the industrial enterprise, a site identifier associated with a particular plant facility from which the data was collected, a priority to be assigned to the data (which may be dependent on the type of information being sent; e.g., alarm data, historical data, live operational data, etc.), information required to facilitate connection to the customer's particular cloud fabric, or other such information. The information included in the header is based on this customer-specific information maintained in the message queuing database. An example compressed data packet is illustrated in FIG. 5. As shown, the cloud agent device's message queuing services add a header 504 to compressed data file 412 to yield the compressed data packet 324. The header 504 contains customer-specific data read from message queuing database 414. For example, header 504 can include a unique customer identifier, a site identifier representing a particular plant facility, a virtual support engineer identifier, a data priority for the data in the compressed data file 412, a message type, and a process identifier that specifies a particular manifest application on the cloud platform that is to be used to process the data on the cloud side. Packaging the data in this way can allow data from diverse data sources to be packaged together using a uniform, generic data packaging schema so that the data can be moved to the cloud infrastructure When cloud agent device 340 sends a data packet to the cloud-based remote processing service, the service reads the packet's header information to determine a priority assigned to the data (e.g., as defined in a data priority field of the data packet) and sends the data packet (or the compressed data therein) to a selected one of the user defined priority queues 304 based on the priority. On the other side of the priority queues 304, a data process service 308 processes data in the respective priority queues 304 according to the predefined processing definitions. The data processing service includes a data deliberation micro service 332 that determines how the queued data is to be processed based on manifest data, also referred to as manifests (e.g., system manifests, data manifests, and metric manifests) stored in a customer-specific manifest assembly 334. Manifest data defines and implements customer-specific capabilities, applications, and preferences for processing collected data in the cloud. As will be described in more detail herein, manifest data can be generated by manifest generation system 202 and dynamically uploaded to the cloud platform 302 through cloud agent device 340, which facilitates dynamic extension of cloud computing capability.

For example, if new data points are to be added to the data collection system that require creation of a new data queue, the user can interact with manifest generation system 202 to configure new manifest data for the new queue. In some embodiments, the manifest data can define such aspects as processing priority for the data, upload frequency for the data, where the data is to be routed or stored within cloud storage, and other such information. Manifest generation system 202 (or cloud agent device 340) can then upload the new manifest data 306 together with the data (or independently of the data). The new manifest data 306 is then added to the customer's manifest assembly 334 with the other manifests defined for the customer, so that the data deliberation micro service 332 can leverage the new manifest data 306 to determine how data in the new queue is to be processed. This new manifest data 306 need only be uploaded to the cloud-based remote monitoring service once. Thereafter, data placed in the new priority queue will be processed by data deliberation micro service 332 according to the new manifest data 306 stored in the customer's manifest assembly 334. For example, manifest data 306 may define where the data is to be stored within cloud storage (e.g., in a historical database, and Alarms and Live Data database, big data storage 312, etc.), and whether processing of the new data queue is to take priority over other data queues. In some embodiments, the manifest assembly 334 may only accept new manifest data 306 if the manifest data is accompanied by a unique key associated with the client.

Once the cloud-based infrastructure has processed and stored the data provided by cloud agent device 340 according to the techniques described above, the data can be made accessible to client devices 322 for viewing. Data analysis on the cloud platform 302 can provide a set of web-based and browser enabled technologies for retrieving, directing, and uncompressing the data from the cloud platform 302 to the client devices 322. To this end, reporting services 314 can deliver data in cloud storage (e.g., from the big data storage 312) to the client devices 322 in a defined format. For example, reporting services 314 can leverage collected data stored in the cloud repository to provide remote operator interfaces to client devices 322 over the Internet. An analytic engine 318 executing on the cloud platform 302 can also perform various types of analysis on the data stored in big data storage 312 and provide results to client devices 322.

Figure 6:
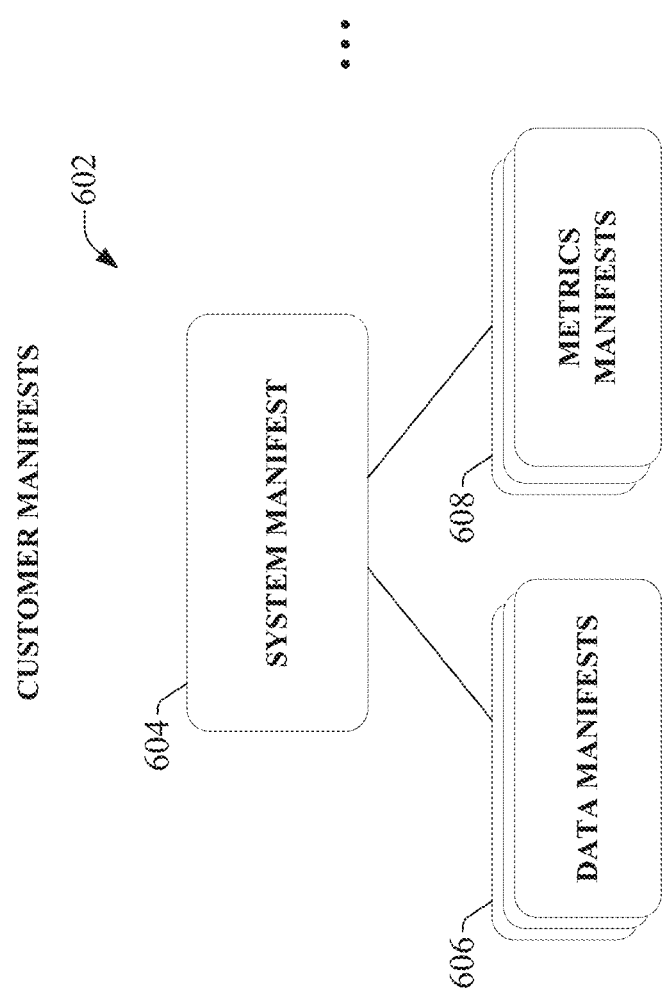
FIG. 6 is a conceptual diagram of an example manifest assembly.

Since the cloud agent device 340 encapsulates the on-premise data collected from data collection applications into envelopes containing customer-specific and application-specific information, the compressed data packets convey the parameters and data required by the cloud to identify the appropriate manifest—that is, the appropriate subset of manifest data stored in the customer's manifest assembly (e.g., manifest assembly 334)—for handling, processing, and/or routing of the data contained in the compressed data file. FIG. 6 is a conceptual diagram of an example manifest assembly 602. In this example, system manifest data 604 resides in the manifest assembly 334. System manifest data 604 can correspond to a particular data collection device (e.g., an on-premise data collector including a cloud agent device 340), and can include links to customer-specific and application-specific data manifest data 606 and metrics manifest data 608 that define actions that can be performed on the data received from that data source. When a compressed data packet (e.g., compressed data packet 324 of FIG. 5) is received at the cloud platform from a cloud agent device, data process service 308 uses information packaged in the header 504 of the packet to identify the appropriate manifest assembly (system manifest data 604, data manifest data 606, and metrics manifest data 608) for processing the data contained in the compressed data file 412. A worker role (e.g., data deliberation micro service 332 of FIG. 3) retrieves and loads the identified manifest assembly, which is then executed on the received data. In general, the metrics manifest data 608 identifies one or more generic procedures that can be retrieved and executed on the data, as well as application-specific ranges, coefficients, and thresholds that may be passed to the retrieved procedures as parameters. The data manifest data 606 identifies tag names used to map the data items in the compressed data file to variables or tags defined in the retrieved generic procedures.

Figure 7:
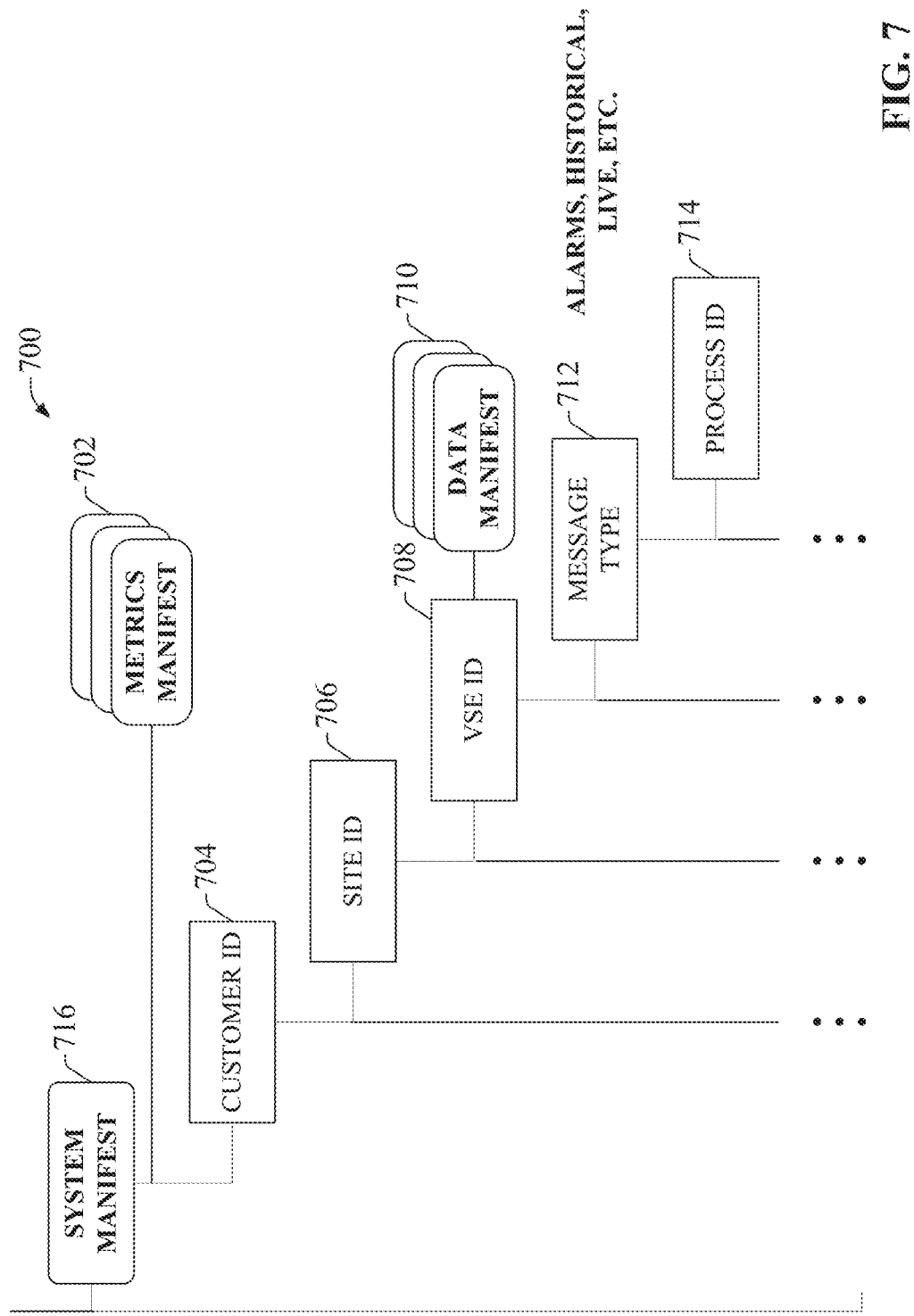
FIG. 7 is a diagram of an example hierarchical architecture for a manifest assembly.

FIG. 7 illustrates an example hierarchical architecture 700 for the manifest assembly according to one or more embodiments. An example system manifest 716 maintained on the cloud platform in a manifest repository can be organized into multiple hierarchical levels. Each individual customer entity that will access the manifest repository for processing of on-premise data can be defined under a customer identifier level 704. Since each customer entity may operate multiple plant facilities or sites, one or more site identifier nodes are defined for each customer identifier node on a site identifier level 706. For each defined site, one or more virtual support engineer (VSE) nodes are defined on a VSE identifier level 708. The VSE node represents a specific cloud agent device or common gateway platform from which data is collected. A message type level 712 and a process identifier level 714 are defined under the VSE identifier level 708.

The hierarchical levels of the example manifest depicted in FIG. 7 correspond to data fields included in header 504 of compressed data packet 324 (see FIG. 5). Thus, when an on-premise cloud agent device sends a compressed data packet to the cloud platform, data process service 308 on the cloud platform leverages the information contained in the header to navigate the manifest's hierarchical architecture 700 to identify the manifest assembly (system manifest, metrics manifest, and data manifest) to be executed on the data contained in compressed data file 412.

Figure 8:
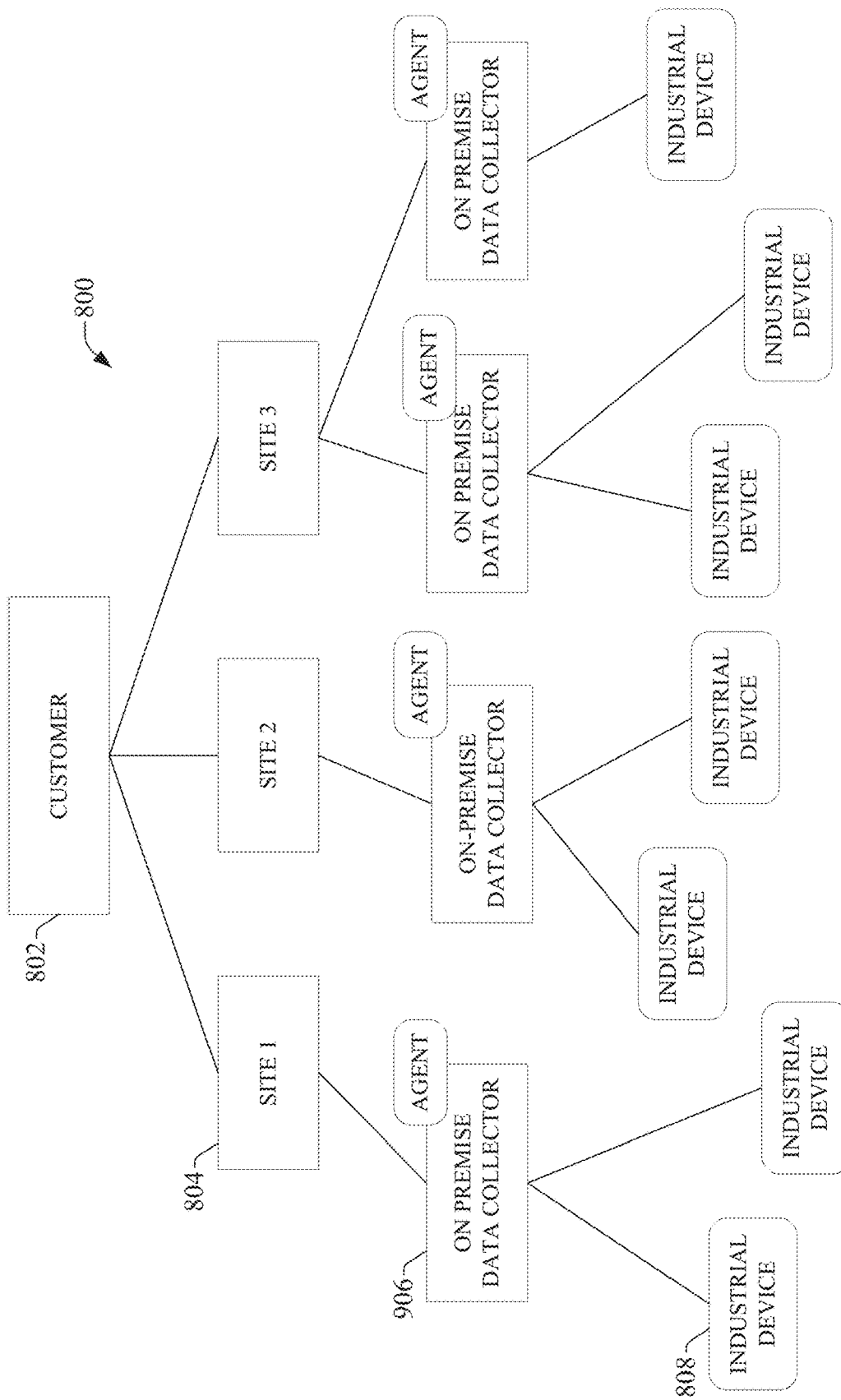
FIG. 8 is a block diagram of an example customer hierarchy.

The hierarchical levels that make up the logical architecture of the manifest assembly describe a hierarchical relationship between sets of on-premise industrial data collected from various data sources across an industrial enterprise. Turning briefly to FIG. 8, a block diagram of an example customer hierarchy 800 is illustrated. In this example, a customer 802 operates three geographically diverse facilities or sites 804. A number of on-premise data collectors 806 (e.g., cloud agent devices that collect data from one or more data sources, as illustrated in FIGS. 3 and 4) are deployed at the various customer sites 804 and collect data from one or more industrial devices 808 or other data sources at the plant facility.

Customer hierarchy 800 is used by the cloud architecture to model and organize customer site information. As described above, cloud agent devices associated with the on-premise data collectors 806 compress data collected from the industrial devices 808 to yield a compressed data file, and package the compressed data file with header information, as illustrated in FIG. 5. The customer ID, site ID, and VSE ID fields of header 504 correspond to the customer, site, and on-premise data collection device (e.g., cloud agent device 340), respectively, of customer hierarchy 800. When the cloud agent device sends the resulting compressed data packet to the cloud platform, the data deliberation micro service 332 executing on the cloud platform identifies and invokes a particular system manifest within a manifest repository based on the customer ID, site ID, and VSE ID values in the header. Data deliberation micro service 332 then determines the particular sets of metrics manifest data and data manifest data associated with the system-level manifest data to be used to process the data received in the packet.

Returning to FIG. 7, the metrics manifest data 702 defines one or more metrics or actions (identified by the process identifier field of the compressed data packet header 504) that can be carried out on the data. The metrics manifest data 702 also defines the coefficients, thresholds, and ranges to be used for each identified metric. Each metric (process) corresponds to a generic procedure stored on the cloud platform in association with the manifest assembly 334. Metrics manifest data 702 defines which of the available generic procedures are to be used to process the data received in the packet.

Data deliberation micro service 332 uses the customer identifier, site identifier, and VSE identifier fields of header 504 to navigate the corresponding levels of the system manifest data and select a particular set of data manifest data 710 for processing of the data. The data manifest data 710 defines tag names used to map data items in the compressed data file 412 (or in customer data storage) to the one or more metrics (processes) that will operate on the data, as defined by the metrics manifest data. The data manifest data 710 also identifies which process identifiers have ownership over each tag name. The particular process that will be executed on the data is identified by the message type and process identifier fields of the header 504. In this regard, the system manifest data may define multiple message types (e.g., alarms, historical data, live data, etc.), and, for each defined message type, define one or more namespaces corresponding to a given process identifier. The namespaces identify corresponding applications stored in association with the manifest assembly that can be loaded by data deliberation micro service 332 and executed on the data contained in the encapsulated data file. These applications may specify a final destination for the data (e.g., big data storage on the cloud, one or more specified client devices, a visualization application, etc.), or may comprise algorithms or computational procedures to be carried out on the data to yield a desired result (e.g., a net power calculation, an efficiency calculation, a power guarantee calculation, etc.).

By this architecture, the micro service in the cloud platform will load the appropriate manifest assembly for processing a received data packet based on the customer from which the data was received, as well as other data attributes—such as the customer facility or site, a device from which the data was received, the type of data (e.g., alarm data, historian data, live data from industrial devices, etc.), a specified process or metric, etc.—identified by the header of the compressed data packet. By encapsulating collected data on the plant floor to include these attributes prior to sending the data to the cloud, the cloud agent device effectively applies a customer-specific model to the data that describes the data's context within the plant hierarchy, as well as the data's relationship to other data items across the enterprise. This information can then be leveraged on the cloud side to appropriately handle and process the data based on the data's role in the larger enterprise as well as user-defined processing and storage preferences.

To simplify creation of manifests for a given industrial data collection application, manifest generation system 202 can be configured to generate system and data manifest data for one or more industrial automation systems based on data extracted from industrial devices making up the automation systems and user input. In one or more embodiments, manifest generation system 202 can include a modular programming template library and a logical view tool that provides a rich environment for generating manifest data for cloud-based industrial data collection and analysis systems in a general and systematic way.

Figure 9:
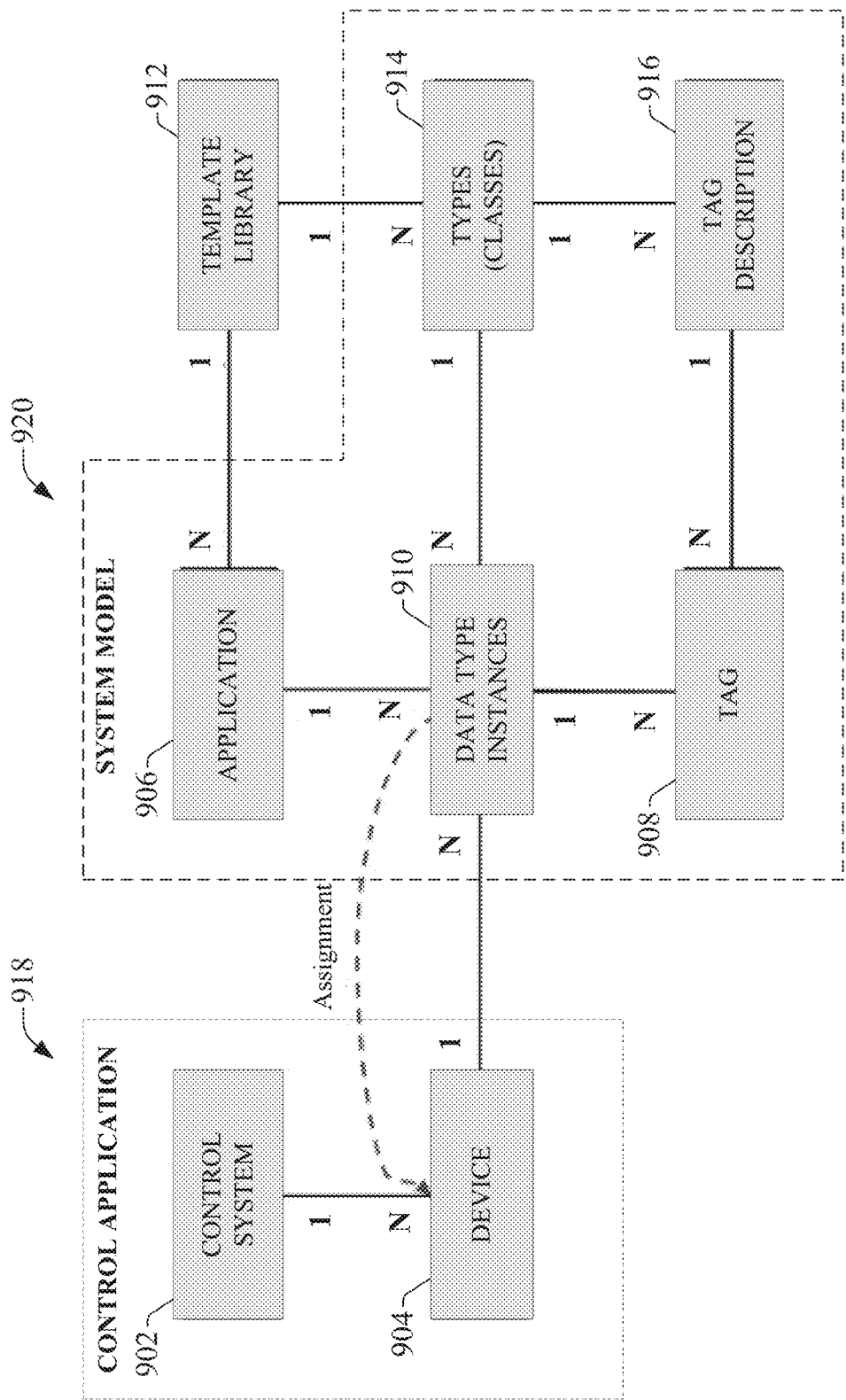
FIG. 9 is a conceptual diagram illustrating elements of a system model created by a template library for an industrial control application.

FIG. 9 is a conceptual diagram illustrating elements of a system model 920 created by the template library 912 for an industrial control application 918. In the illustrated example, industrial control application 918 comprises a control system 902 made up of multiple industrial devices 904 (e.g., industrial controllers such as PLCs, HMI terminals, motor drives, telemetry devices, valves, actuators, etc.) at a plant facility. The template library 912 can facilitate a top-down approach for establishing a logical organization of the control application design that can be used as the basis for creating system and data manifests. The template library 912 allows parameter and type composition rules to be propagated globally in connection with generating a system model 920 of the control system 902 that can be used as the basis for a cloud-system manifest.

For each control application 918 to be modeled, the template library 912 can be used to create an application instance 906 corresponding to the control application 918. The system-level template library 912 can then automate creation of data types 914 (e.g., classes of types) from which multiple instances 910 of each data type 914 can be created for each control application instance 906 (a 1-to-N relationship between data types 914 and instances 910 of the data types). As illustrated in FIG. 9, a given device 904 of the control application 918 may have multiple instances of a data type 910 associated therewith, each data type instance 910 associated with one of data types 914. Multiple tags 908 representing elements or aspects of control application 918 can be created based on each data type instance 910, where the tag 908 comprises attributes and behaviors defined by its parent data type instance 910.

In some embodiments, template library 912 can be one of several template libraries that are respectively associated with a type of industry or industrial application (e.g., power distribution, fracking, automotive, etc.), where the industry or application type determines the set of available data types 914 and at least some architectural features of the system model 920. The template library 912 can also allow propagation of data qualifiers throughout the system model 920. For example, a template library 912 specific to power distribution systems can be used to create a number of different or similar DC microgrid applications.

The template library 912 defines the collection of data types 914 to represent different aspects of the control application 918. In an example power generation application, the control application 918 may comprise multiple power generators of both solar and fuel types. Each template-based data type 914 created for the control application 918 can define one or more tag descriptions 916. Thus, the attributes and behaviors of each tag 908 are determined by properties of the tag's parent data type instance 910 and the tag description 916 corresponding to the tag 908, where the data type instance 910 and tag description 916 are defined by the data type 914 (which may be an industry- or application-specific data type defined by the template library 912).

The size and characteristics of the control application 918 (represented by application instance 906) defines the number of data type instances 910 to be created for representing the physical control system 902. For example, a control system 902 with 100 solar-based power generators and three fuel-based power generators may be represented by an application instance 906 having a number of tags 908 of various data types (represented by data type instances 910) to represent internal and I/O tags 908 that achieve the desired control-level behavior.

Once the hierarchical composition of instances making up the system model 920 is complete, the user can initiate an assignment phase, whereby the instances defined by the system model 920 are distributed among one or more computing devices or industrial devices 904 (e.g., industrial controllers). During this assignment phase, target endpoint devices, which may be a group of interconnected industrial controllers that perform monitoring and control for the control application 918, are selected to host the instances of the application 906. In an example scenario, the instances defined by the system model 920 can be sent to the endpoint devices by the device interface component 208, which can establish a communicative link between manifest generation system 202 and each endpoint device.

Figure 10:
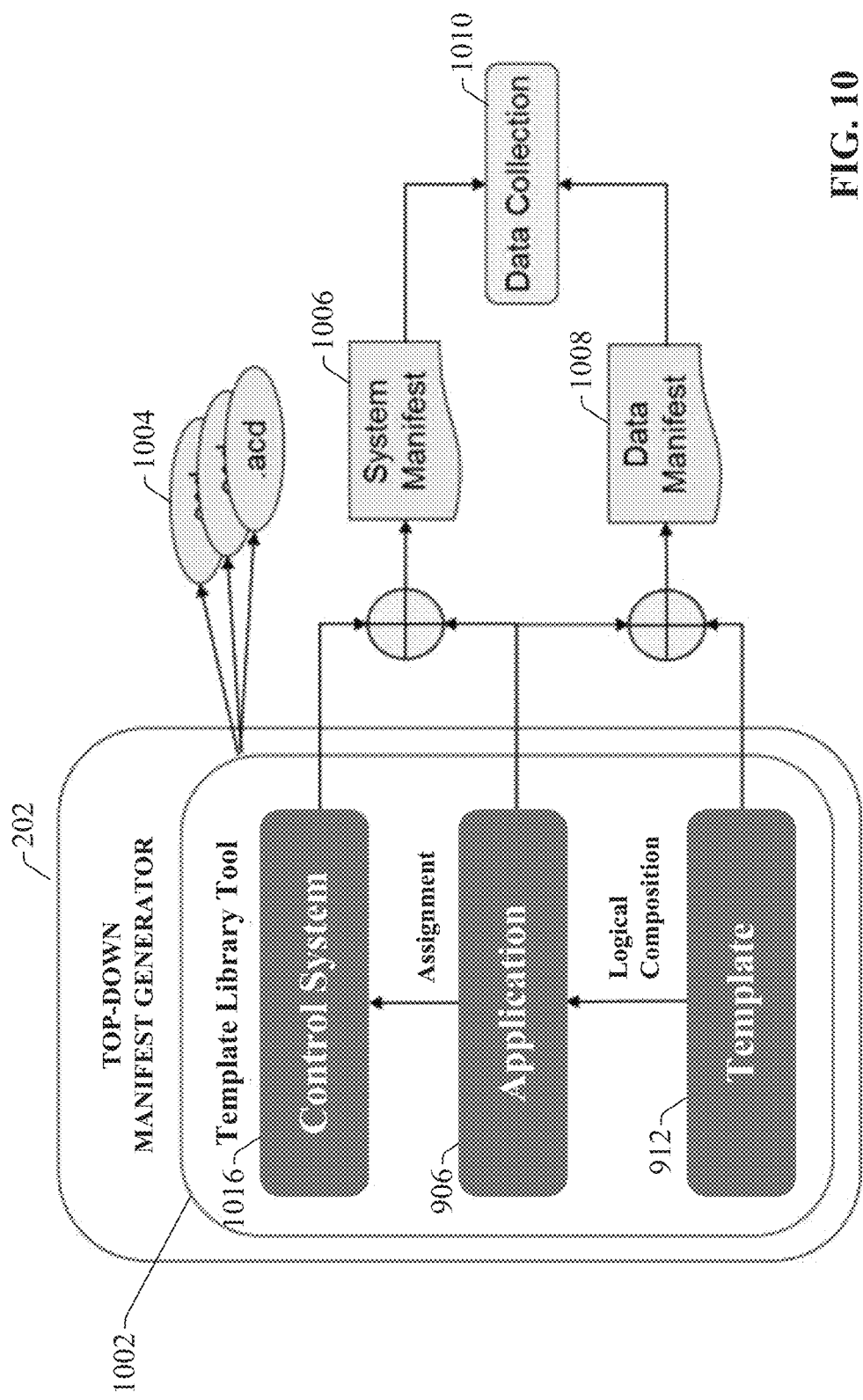
FIG. 10 is a diagram illustrating generation of executable files and manifest data by a manifest generation system based on the logical composition defined by system model.

FIG. 10 is a diagram illustrating generation of executable files and manifest data by the manifest generation system 202 based on the logical composition defined by system model 920. As illustrated by the generalized project flow implemented by template library tool 1002, the user can leverage template library 912 to create an application instance 906 comprising a logical composition of templates (e.g., tags 908 of various data types 914). The application instance 906 can then be assigned to the control system (represented by block 1016 in FIG. 10). The modular template library tool 1002 implemented by library tool component 206 can compile the assigned application instance 906 to yield executable files 1004, which can be executed on the industrial controllers or other target endpoint computing units, as well as a system manifest file 1006 and a data manifest file 1008. This top-down approach yields all the attributes and information necessary to automatically generate system manifest file 1006 and a data manifest file 1008, which are used to configure a cloud-based data collection system for data collection 1010 of the control system's data points. As such, manifest generation component 210 of manifest generation system 202 can leverage the defined logical composition to generate the system manifest file 1006 and data manifest file 1008.

The process described above represents a top-down approach for establishing a logical organization based on the control system application design, whereby a logical organization of template-based instances are created to mirror the control application, and are deployed to endpoint execution devices. Some embodiments of manifest generation system 202 can also support a bottom-up approach for establishing the logical organization. According to this approach, manifest generation system 202 extracts tag information from off-line or on-line industrial controller files in order to build the manifest files, which can be used to configure cloud-based data collection for the control system.

Figure 11:
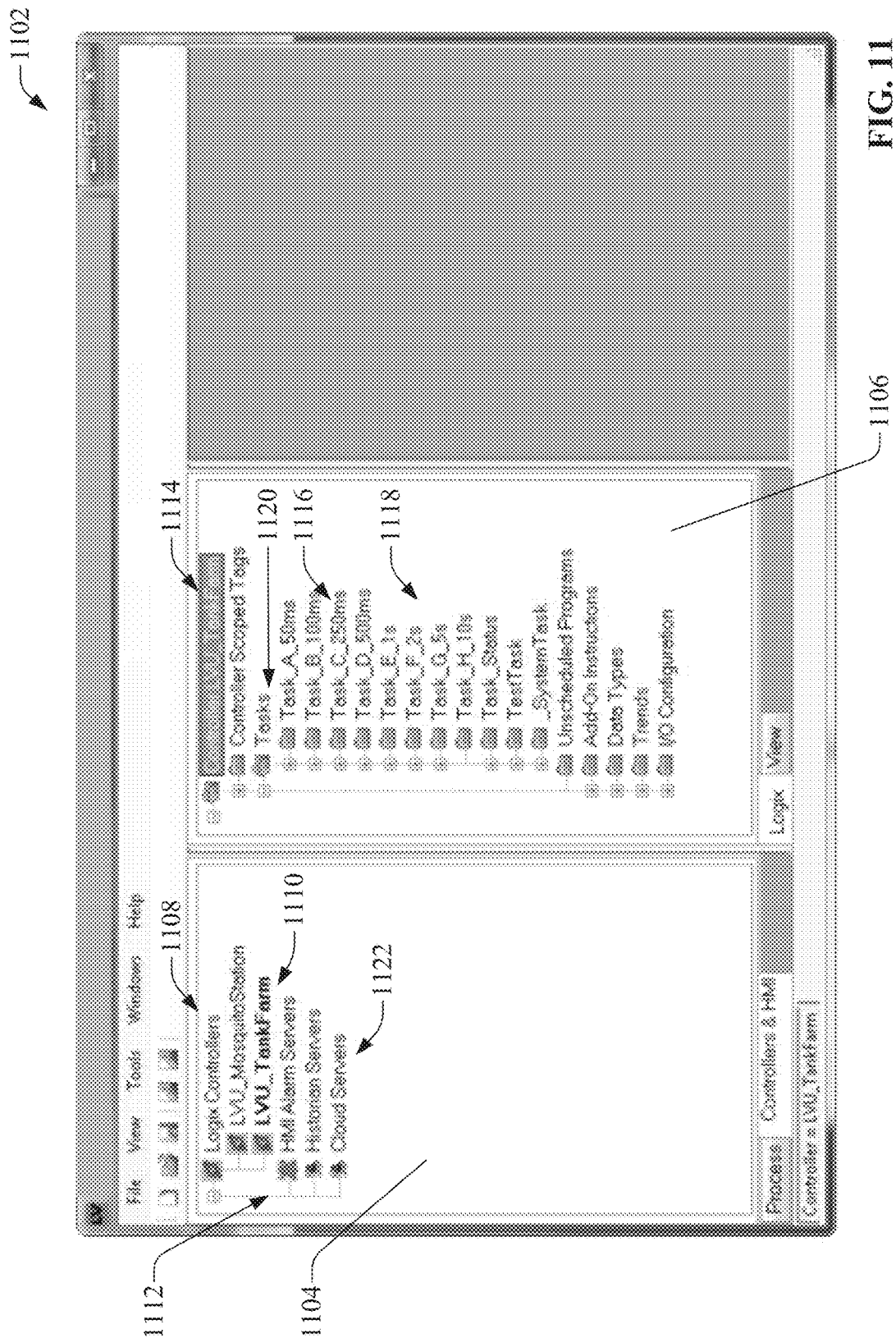
FIG. 11 is an example project builder interface display that allows a user to add controllers to a project.

The bottom-up approach is described with reference to the example interface displays illustrated in FIGS. 11-29, which can be generated by user interface component 204 to guide the user through the process of generating manifest data for a given industrial control system. FIG. 11 is an example project builder interface display 1102 that allows a user to add controllers to a project. Interface display 1102 includes a Controllers and HMI window 1104 on the left-hand side, and a Logic window 1106 on the right-hand side. A project tree 1112 is displayed in the Controllers and HMI window 1104, and includes a parent Controllers node 1108 below which are child Controller nodes 1110 representing the one or more controllers that make up the control system for which manifest data is being generated. Users can add a child Controller node 1110 to the project via interaction with interface display 1102 (e.g., by right-clicking on the parent Controller node 1108, selecting a controller type from a resulting pop-up list, and entering a name for the controller). In some embodiments, device interface component 208 of manifest generation system 202 can detect an industrial controller program (e.g., an off-line copy of the controller program) stored on a controller or other computing device to which the manifest generation system 202 is interfaced, and automatically import information about the control program—e.g., a name of the corresponding controller, data tags defined in the program, tasks or routines defined in the program, etc.—into the manifest generation system 202. Based on this imported controller information, user interface component 204 can add a child Controller node 1110 to the project tree 1112 corresponding to the detected controller program.

When one of the child Controller nodes 1110 is selected in the Controllers and HMI window 1104 (e.g., the TankFarm node in the illustrated example), information relating to the selected controller is rendered in the Logic window 1106. In the illustrated example, the controller information is presented in the form of a hierarchical controller tree 1118 having nodes that are categorized according to Tags, Tasks, Add-On Instructions, Data Types, Trends, and I/O Configuration (other categories of control information are also within the scope of one or more embodiments of this disclosure). Selection of one of these classification nodes reveals corresponding child nodes. For example, in FIG. 11 the Tasks node 1120 has been selected, revealing a list of the programmed tasks 1116 that have been discovered in the TankFarm controller program. Selection of other classification nodes in the hierarchical controller tree 1118 likewise reveals corresponding controller information corresponding to the selected category. For example, selection of the Controller Scoped Tags node will cause a list of data tags defined in the control program to be rendered in the Logic window 1106.

Figure 12:
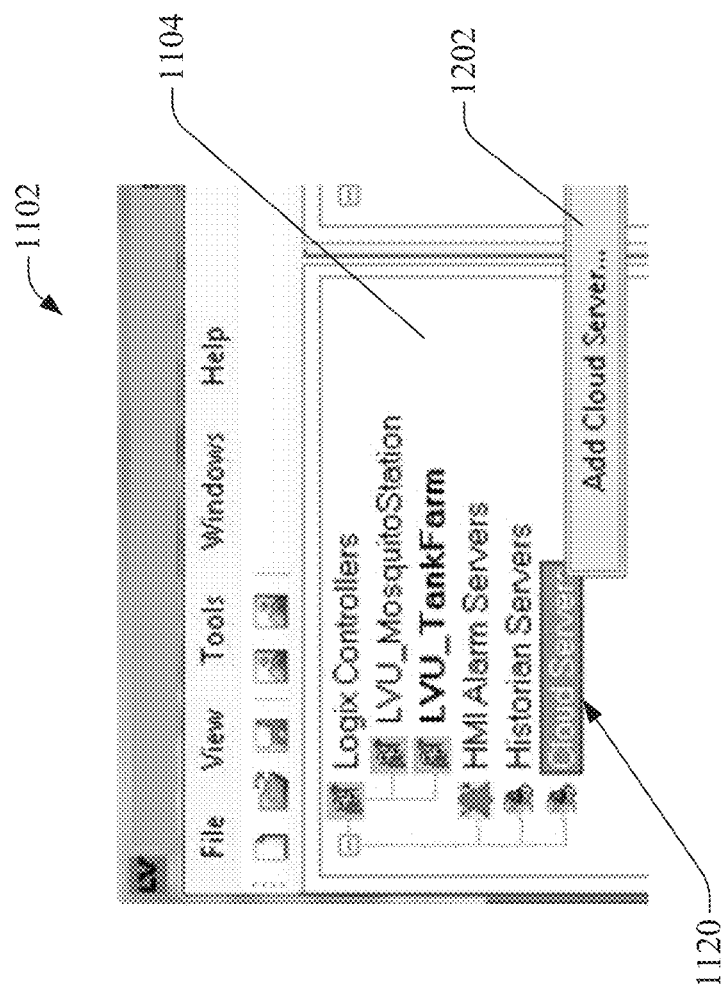
FIG. 12 is a view of project builder interface display demonstrating addition of a cloud server.

After the controllers have been added to the project, the user can add configuration information for the cloud server that will be managing data collection for the industrial control system(s). FIG. 12 is a view of project builder interface display 1102 demonstrating addition of a cloud server. In an example interaction, a user can invoke an Add Cloud Server control 1202 by selecting a Cloud Server node 1122 in the Controllers and HMI window 1104. Selection of the Add Cloud Server control 1202 can invoke a configuration window that allows the user to enter a name for the cloud server (e.g., Cloud1 in the present example) as well as data server information for each selected controller. In some embodiments, the manifest generation component 210 can automatically assign all defined controllers to the newly created cloud server. Alternatively, in some embodiments the user can define multiple cloud servers (if there will be more than one) and individually assign controllers to each cloud server.

Figure 13:
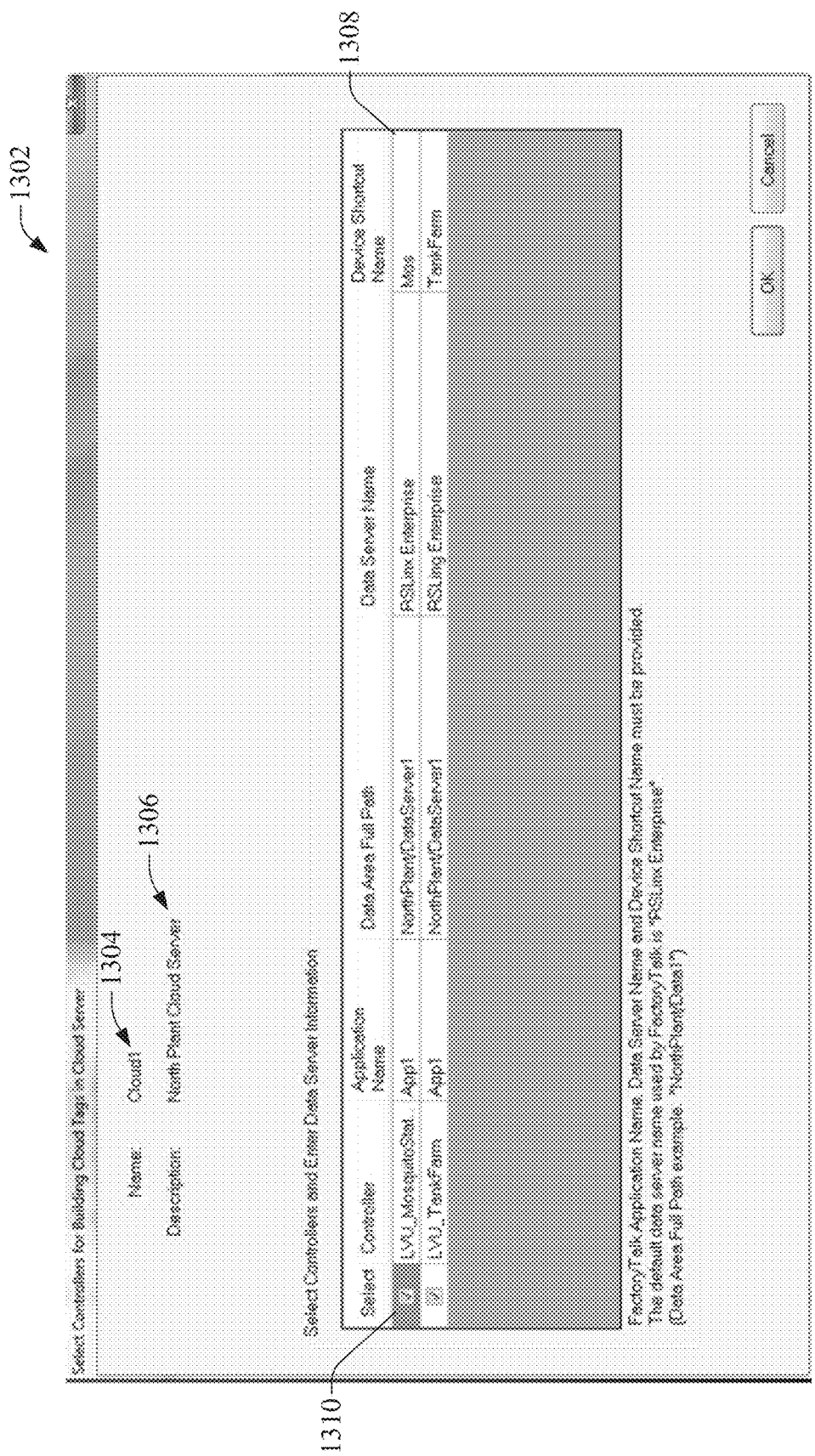
FIG. 13 is an example display interface for entry of data server information.

FIG. 13 is an example Interface display 1302 that can be invoked in response to selection of the Add Cloud Server control 1202 for entry of data server information for each controller assigned to the newly created cloud server (e.g., Cloud1). Interface display 1302 displays the name 1304 and description 1306 of the cloud server currently being configured. The user can enter data server information for each defined controller in a data entry grid 1308 rendered on interface display 1302. The data server can be, for example, the data collection services executing on cloud agent device 340 that collect the data from the controllers for packaging and delivery to the cloud platform. In the illustrated example, each row of data entry grid 1308 corresponds to one of the defined controllers (e.g., the controllers represented by controller nodes 1110). Within each row, a user can enter an application name (a name associated with the current data collection project), a path to the data server associated with the controller (e.g., NorthPlant/DataServer1), a data server name, and a device shortcut name. Select boxes 1310 associated with each defined controller can also be used to selectively enable or disable data collection for the respective controllers.

Figure 14:
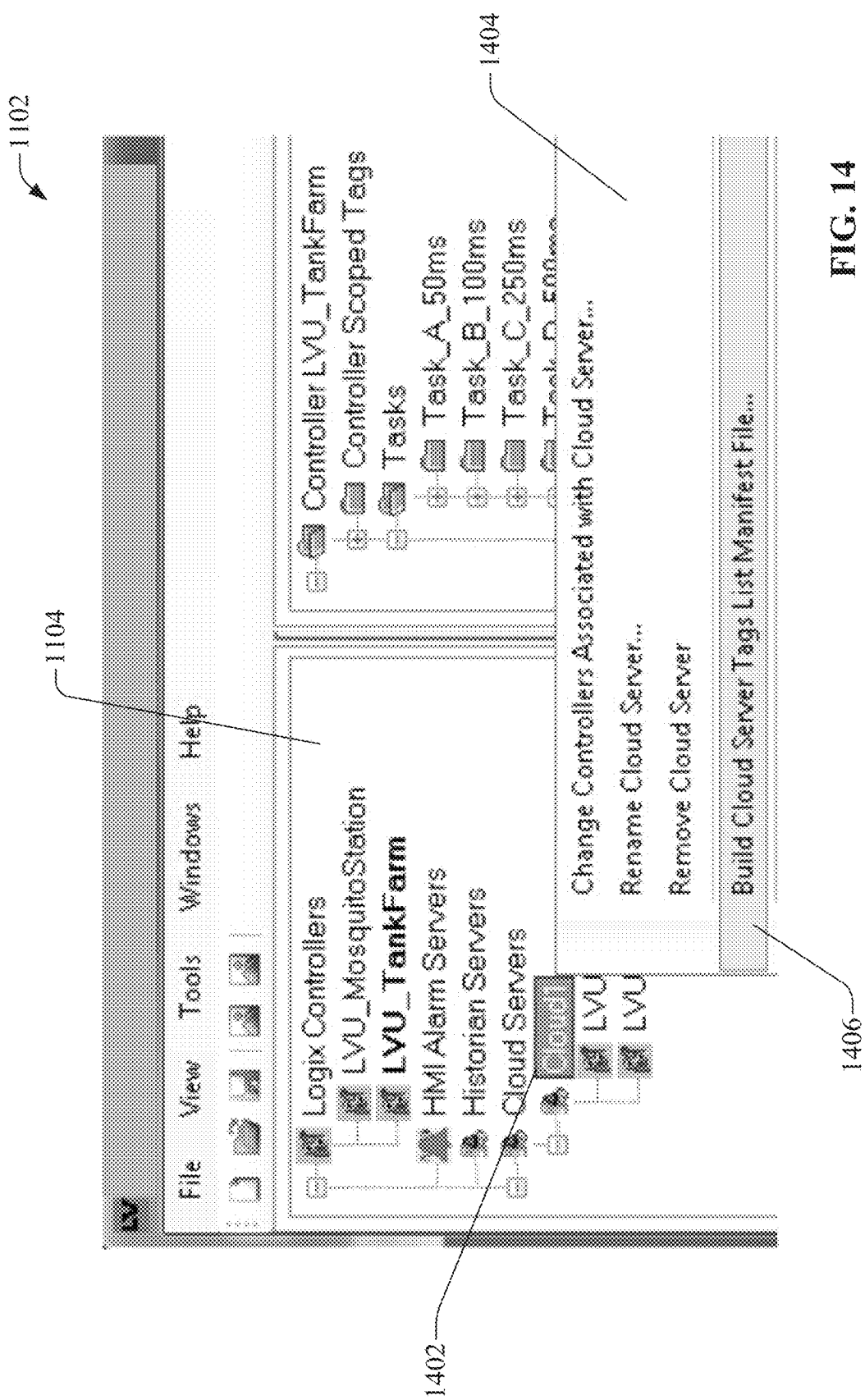
FIG. 14 is a view of a project builder interface display illustrating an example interaction for initiating a manifest file building phase.

Once the cloud server has been added to the project, the user can begin the process of building the cloud server manifest files. FIG. 14 is a view of project builder interface display illustrating an example interaction for initiating the manifest file building phase. Following from FIGS. 12 and 13, the user has added a cloud server named Cloud1 to the project, represented by cloud server node 1402. Selecting the cloud server node 1402 invokes a dialog window 1404 that includes an option 1406 for building a cloud server manifest file.

Figure 15:
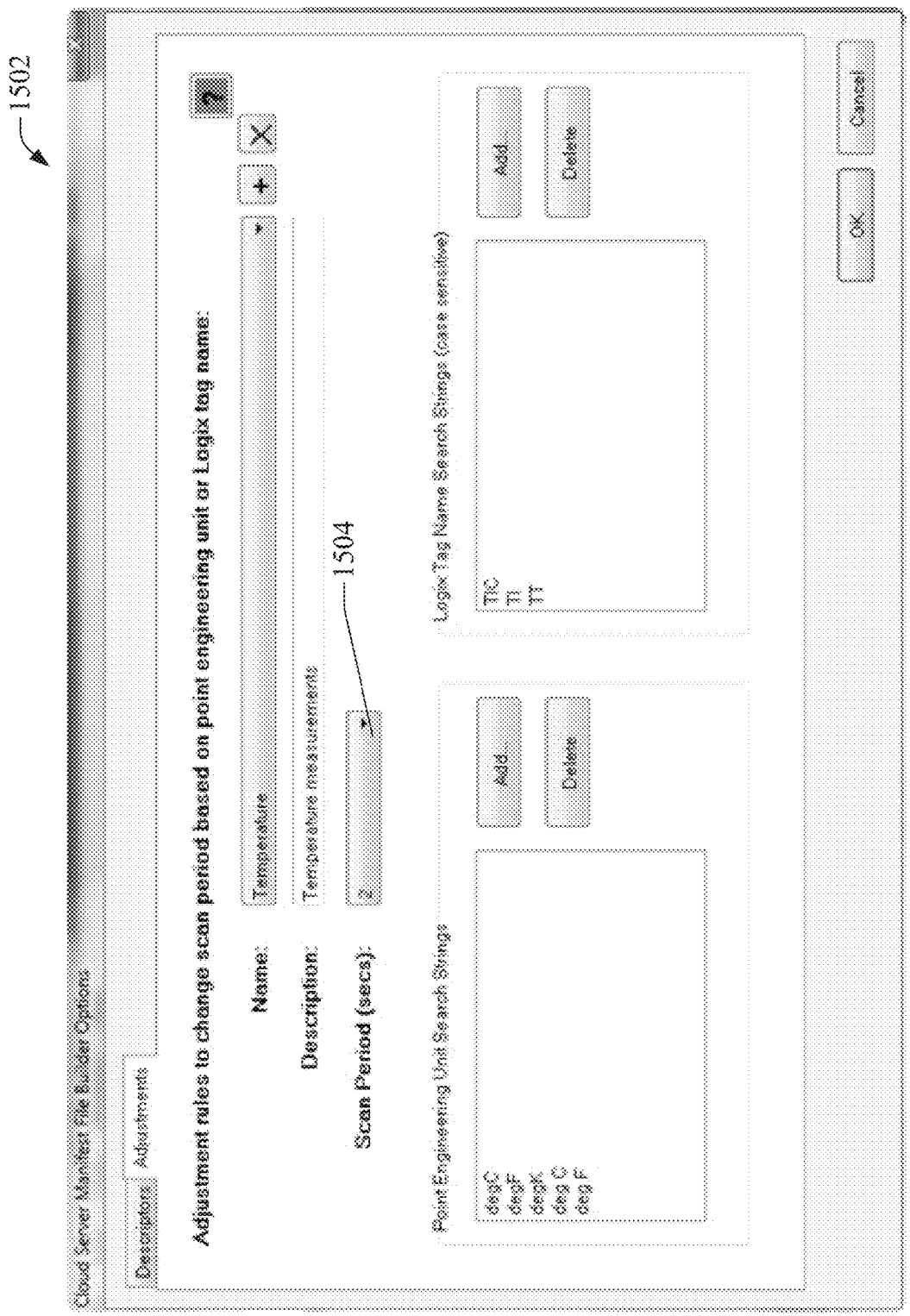
FIG. 15 is an example interface display for entering manifest file option information.

FIG. 15 is an example interface display 1502 that can be generated by user interface component 204 for entering manifest file option information. In response to selecting option 1406 in FIG. 14, user interface component 204 can render interface display 1502, which allows the user to set configuration options or adjustment rules for the metrics files. For example, for embodiments that support generation of metrics manifest data (in addition to system and data manifests), interface display 1102 can be used to enter information regarding units and coefficients. Interface display 1502 can also allow the user to configure data collection scan periods (e.g., using scan period entry box 1504) to be applied as a function of tag name or engineering unit.

Figure 16:
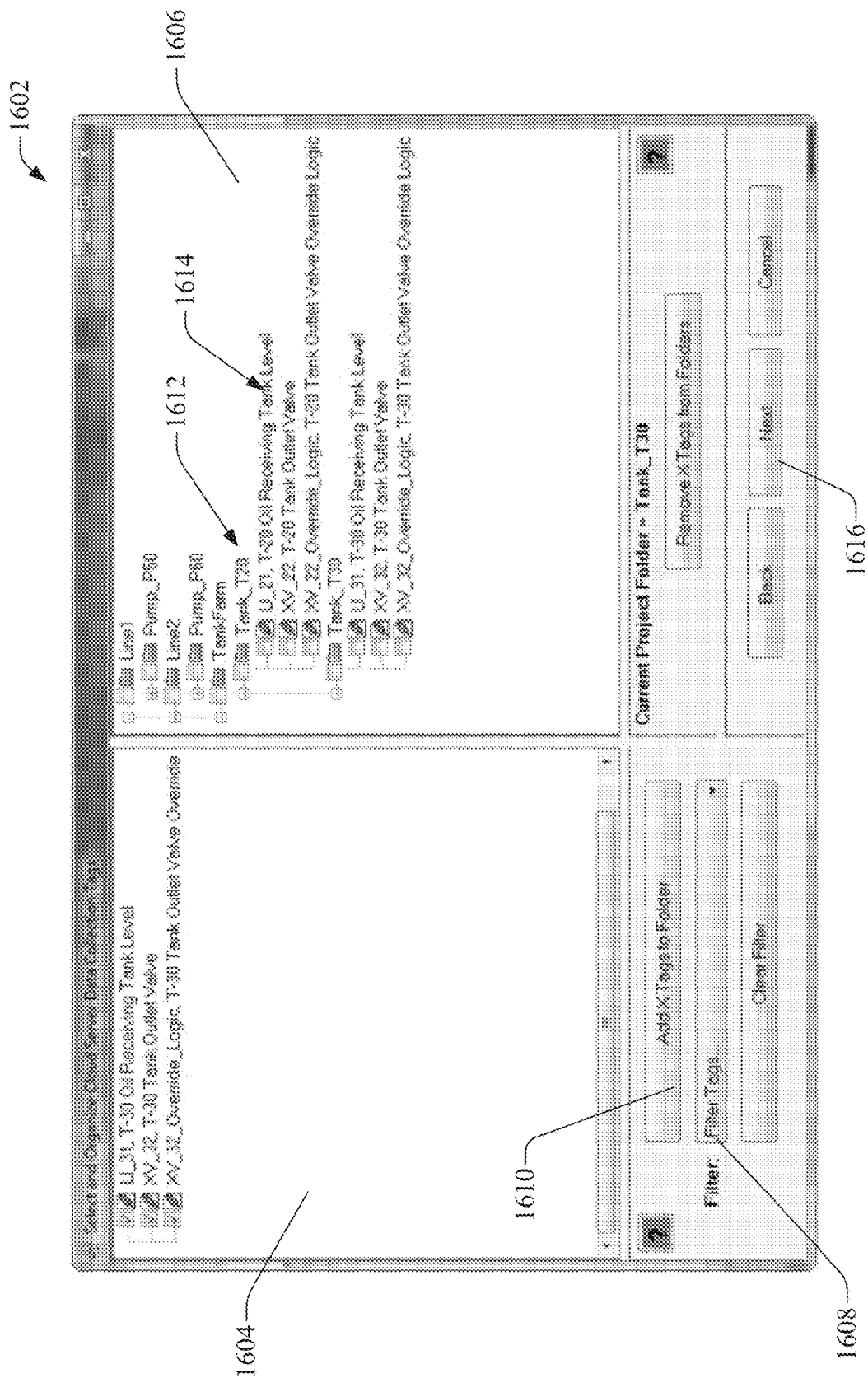
FIG. 16 is an example interface display for selecting and organizing cloud server data collection tags.

Once the cloud server has been defined in the project, manifest generation system 202 can allow the user to select controller data tags to be included in the manifest. FIG. 16 is an example interface display 1602 that can be generated by user interface component 204 for selecting and organizing cloud server data collection tags. In some embodiments, manifest generation system 202 can offer two options for selecting tags to be included in the manifest. According to a first option, the user can instruct manifest generation system to add all controller tags with cloud data type definitions to the manifest file. Alternatively, interface display 1602 can be used to select and organized tags to be included in the manifest file.

The example interface display 1602 includes a window 1604 on the left-hand side that renders available data tags defined in the one or more controller programs that were imported into the project. In some embodiments, device interface component 208 can be configured to identify controller tags defined in the control program file whose configuration data indicates that the tags are to be collected in the cloud server. A filter input field 1608 also allows the user to enter filtering criteria, and user interface component 204 filters the rendered set of available tags according to the entered filtering criteria. Users can add a selected tag to the manifest file by selecting the tag (or multiple tags) in window 1604 and selecting an Add Tags button 1510.

Window 1606 on the right-hand side of interface display 1602 displays the controller tags 1614 that have been selected for inclusion in the manifest file. Interface display 1602 can allow the user to organize the selected controller tags 1614 into folders 1612. Users can create and name new folders 1612 and assign selected controller tags 1614 to each folder 1612 via interaction with interface display 1502 (e.g., by dragging and dropping tags from window 1604 to a selected user-defined folder in window 1606). Interface display 1602 allows the user to create nested folders—i.e., child folders that are hierarchically associated with a parent folder—and assign controller tags 1614 to folders within the resulting hierarchical path. When the manifest data is generated, the full folder path associated with each assigned controller tag 1614 will be added to the manifest data to facilitate tag filtering, as well as to yield a hierarchical model of the automation system(s) that can be used by cloud-based analytic and reporting services to generate presentations that organized the collected data according to the defined hierarchies.

Figure 17:
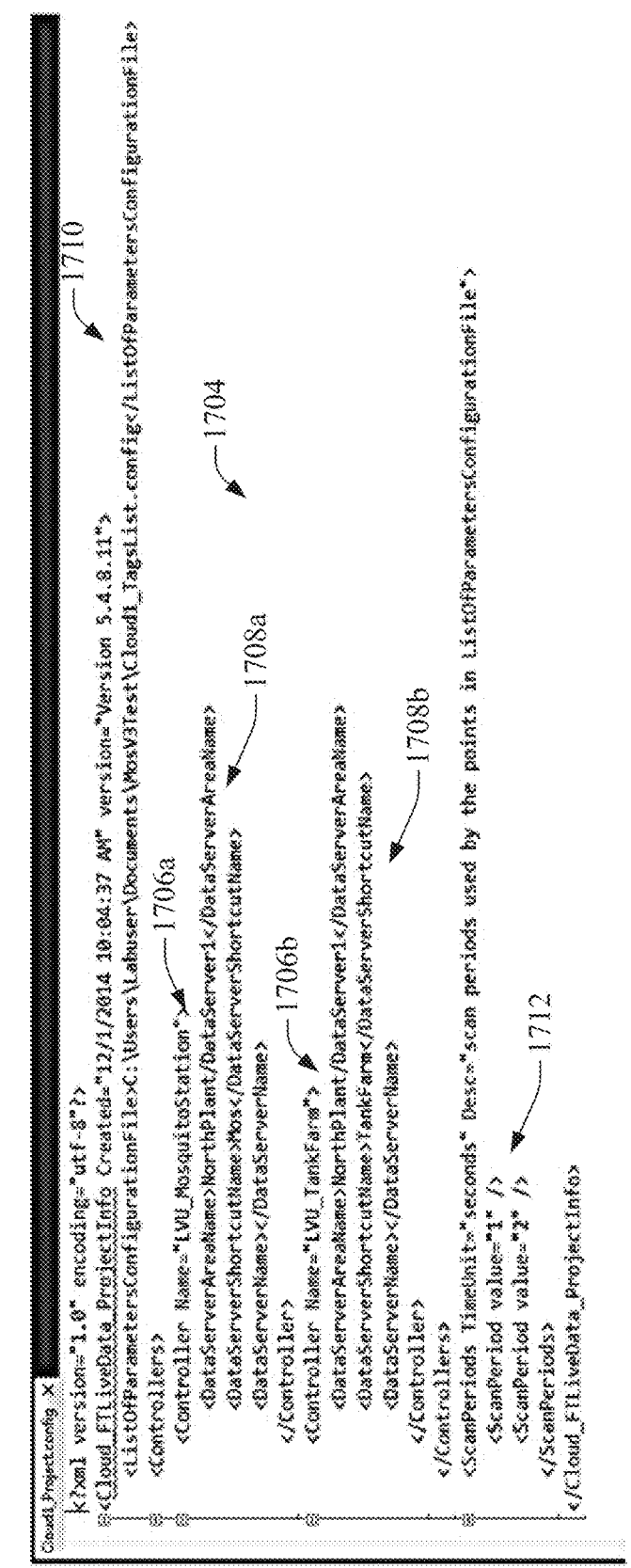
FIG. 17 is an example interface display that renders system manifest data.

Once the desired controller tags 1614 have been selected for inclusion in the cloud manifest, the user can initiate creation of the manifest data via interaction with a suitable control rendered by user interface component 204. In the illustrated example, the manifest data is generated based on the user's selected controller tags 1614 and folder structure in response to selection of the Next button 1616. In some embodiments, manifest generation system 202 can render the resulting cloud-level manifest files for user review. FIG. 17 is an example interface display 1702 that renders system manifest data 1704 created by manifest generation component 210 based on the controller tags 1614 selected and organized using interface display 1602. System manifest data 1704 will be stored in system manifest file 1006 (see FIG. 10), and includes data entries (1706a and 1706b in the illustrated example) representing the controllers that were included in the project. In the illustrated example, controller entry 1706a corresponds to the MosquitoStation controller and controller entry 1706b corresponds to the TankFarm controller, both of which were added to the project using interface display 1102 (see controller nodes 1110 in FIG. 11). System manifest data 1704 also lists data server information for each of the controllers, shown as entries 1708a and 1708b in example system manifest data 1704. This data server information is derived from the data provide by the user via interface display 1302. Scan period information 1712 is also defined in the system manifest data 1704.

System manifest data 1704 also contains a data manifest reference 1710 identifying the data manifest file containing the data point information. This data manifest file is created by manifest generation component 210 in parallel with the system manifest file containing system manifest data 1704. User interface component 204 can render this data manifest file for review by the user. FIG. 18 is an example interface display 1802 that renders data manifest data 1804 included in the tag manifest file (corresponding to data manifest 1008). The data manifest (also referred to as a tag manifest) contains a list of data collection points corresponding to the controller tags 1614 selected for inclusion via interface display 1602. In the truncated data manifest data 1804 depicted in FIG. 18, only a single data collection point is shown for clarity. For each data collection point, data manifest data 1804 includes a data tag name entry 1806 that specifies the name of the controller tag corresponding to the data collection point ("EAL_P50.Sts_PV" in the illustrated example), and which also indicates whether the data collection point is a discrete or an analog value. Additional data collection point data 1808 is included below the tag name entry 1806. In the illustrated example, additional data collection point data 1808 includes a data point descriptor ("Pump P-50 Motor Powered"); an extended descriptor ("P-50 Motor Power"); an engineering unit associated with the data collection point; a parent folder to which the corresponding controller tag was assigned using interface display 1602 ("Pump_P50"); a full path to the parent folder as defined by the user via interface display 1602 ("Line1.Pump_P50"); the shortcut name for the controller device defined by the user via interface display 1302 ("Mos"); a tag address for the controller tag corresponding to the data collection point ("/NorthPlant/DataServer1:: [Mos]EAL_P50"), which is defined as a path through the data server device as configured using interface display 1302; maximum and minimum values for the data collection point; a data type for the data collection point ("Boolean"); and a scan period at which the data collection point is to be collected.

If the imported controller program file defines one or more controller-dependent devices—such as motor drives or motion axes—that are configured to exchange data with the industrial controller, manifest generation component 210 can generate the system and/or data manifests to include subset device manifests, with each subset device manifest corresponding to one of the dependent devices. These subset device manifests configure the data acquisition transaction process for the respective dependent devices.

Figure 19:
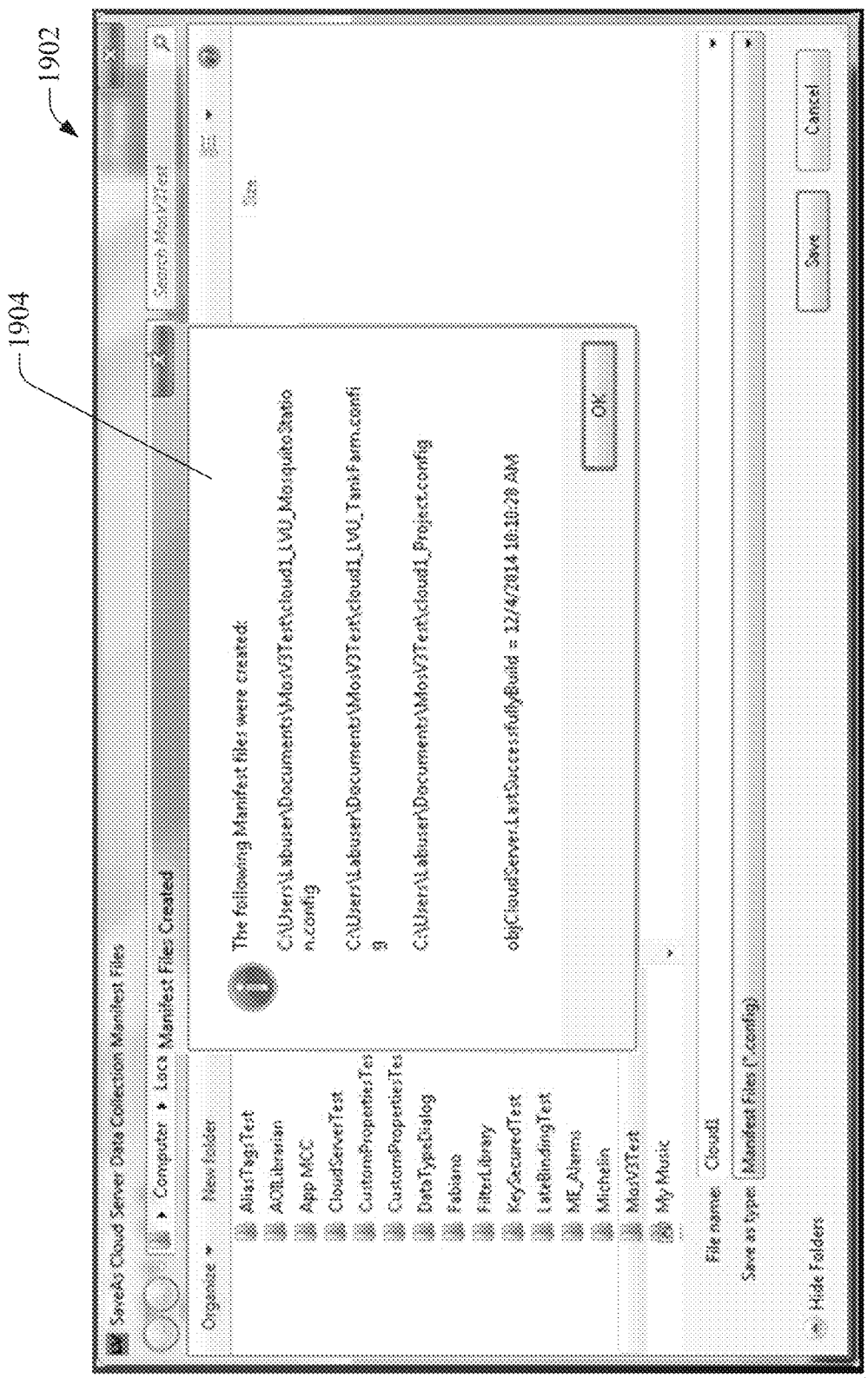
FIG. 19 is an example interface display that can be used to save system and data manifest files.

Once created, the system and data manifest files can be saved for deployment to the cloud-based data collection system. FIG. 19 is an example interface display 1902 that can be used to save the resulting system and data manifest files. In the illustrated example, a pop-up window 1904 identifies the file locations of the three manifests that were created in the present example—two data manifest files respectively corresponding to the two industrial controllers (MosquitoStation and TankFarm) and a system manifest.

Figure 20:
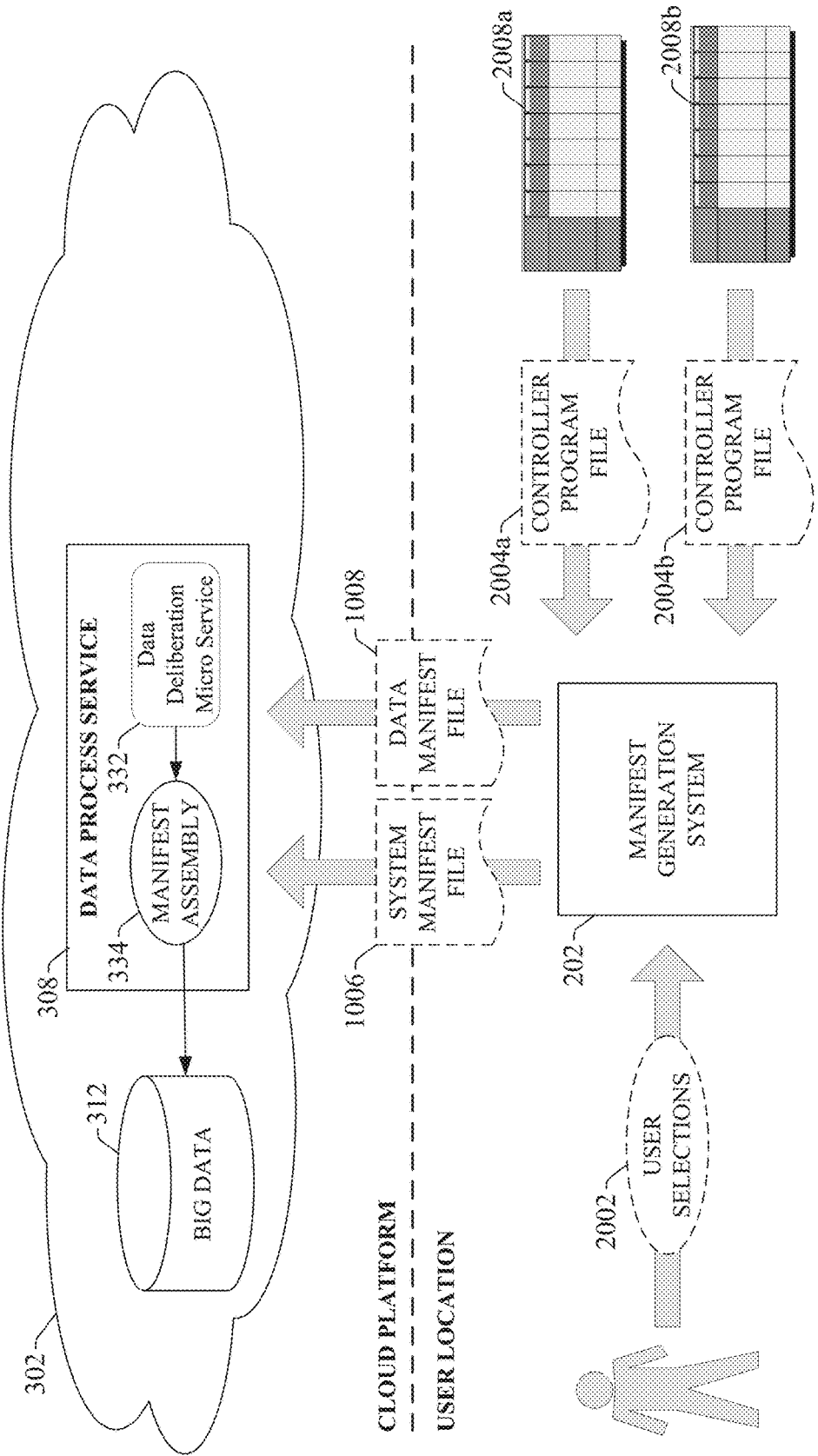
FIG. 20 is a high-level diagram illustrating generation and deployment of a system manifest file and a data manifest file.

After the system manifest file 1006 and data manifest file 1008 (containing system manifest data 1704 and data manifest data 1804, respectively) have been generated, the manifest files 1006 and 1008 can be deployed to the cloud-based data collection system to facilitate configuration of data collection for the control system. FIG. 20 is a high-level diagram illustrating generation and deployment of system manifest file 1006 and data manifest file 1008 by manifest generation system 202. As described in the example workflow described above, manifest generation system 202 extracts controller configuration and data tag definition information from controller program files (e.g., controller program files 2004a and 2004b) to be loaded and executed on respective industrial controllers (e.g., industrial controllers 2008a and 2008b) used to control one or more industrial control systems. Devices 2008a and 2008b can also be another type of industrial device on the plant floor. The relevant controller configuration and data tag definition information can be extracted by the device interface component 208, which scans the controller program files 2004a and 2004b in order to identify defined data tags and their configuration (e.g., data types, tag names, tag descriptors, etc.), program routines or tasks, or other such information. User interface component 204 can render this extracted information, which includes a list of data tags available for inclusion in the data collection routine. In some embodiments, user interface component 204 may only render those tags whose data type (as defined in the controller program file 2004a or 2004b) indicates that the tags are eligible for cloud-based data collection. A user can then enter user selection data 2002 identifying which of the eligible data tags are to be included in the data collection routine. The user can also organize the selected tags into user-defined folders and subfolders, and define data collection scan rates for the data tags individually or as a group.

After defining the data server information for each of the controllers 2008a and 2008b for which data collection is being configured, manifest generation component 210 creates system manifest file 1006 and data manifest file 1008, and cloud interface component 212 can establish a communication channel to the cloud platform and send the files 1006 and 1008 to the cloud-based data collection system (e.g., a system similar to that described above in connection with FIGS. 3-4, or another type of cloud-based data collection system) for integration into the user's manifest assembly 334. For cloud-based systems that provide data collection services to multiple customers, cloud interface component 212 can send the manifest files 1006 and 1008 together with a customer identifier so that the cloud-based system will integrate the files 1006 and 1008 into the correct manifest assembly associated with the customer identifier. Integration of manifest files 1006 and 1008 into the manifest assembly 334 configures the data collection system to collect the selected data tags as data collection points. For example, data server information for each of the controllers defined in the system manifest file 1006 (e.g., entries 1708a and 1708b in example system manifest data 1704) informs the data collection system of the data server (e.g., cloud agent device 340 or other data server) from which the controller tag data will be received, scan period information, and an identity of the data manifest file 1008 containing information regarding the data tags that will be monitored for each controller. Data manifest file 1008 identifies the user-defined hierarchical folder path name defined by the user using interface display 1602. For embodiments that support generation of metrics manifest data, data manifest file 1008 can also include information regarding units and coefficients associated with each data tag. In some data collection systems, data manifest file 1008 may also be deployed to an on-premise cloud agent device (e.g., cloud agent device 340 of FIG. 3) or a data concentrator device that collects the defined data tags from their respective data sources and migrates the data to the cloud platform.

For embodiments that support generation of metrics manifest data, the system 202 can allow a designer to create metrics manifests for processing and transforming specified data sets, and to assign the metrics manifest to a specified data pipeline device of the cloud-based data collection system. These metric manifests define parametric procedures to be applied to collected datasets received from the cloud agent device. In some scenarios, the metrics manifest can be configured to apply the parametric procedures to diverse data sets having respective different data formats (e.g. due to the different types of devices or systems from which the data is collected), allowing a common data processing action to be applied collectively to data sets having different data formats.

Since the data manifest file 1008 may describe hierarchical relationships between the data tags based on the user-defined hierarchical organization of the data tags (e.g., the folder assignments configured as shown in FIG. 16), the data manifest file 1008 can facilitate generation of a customer-specific object model in the cloud platform, which can be used to simplify data processing at the cloud level, and to facilitate suitable processing and meaningful reporting of the data. The data manifest file 1008 may define a hierarchical structure of the customer's enterprise from the plant level down to the tag level. For example, the data manifest file 1008 may include information defining control system identifiers, controller identifiers, network identifiers, application identifiers, functional descriptions of the customer's various industrial assets, tag names, and hierarchical relationships between these various entities. In an example application, an analytics manager executing on the cloud-platform can leverage the manifest assembly 334 to generate trend displays for the collected data, or to render time-stamped data organized according to the hierarchy defined by the data manifest file 1008.

As noted above, some embodiments of manifest generation system 202 can retrieve, for inclusion in the data collection configuration, controller tags having a data type that has been configured in the industrial controller program (e.g., program files 2004a and 2004b) for cloud-based data collection. In some embodiments, data collection parameters for data tags defined in a controller program can be configured using manifest generation system 202. For example, in some embodiments manifest generation system 202 may be a sub-system of a control program development application, such that an industrial control program can be developed and associated manifest files can be created using the same development environment. Also, some control program development applications allow local historian configuration parameters to be set as part of the data tag definitions, where the historian parameters define settings for on-premise collection of data on a local data historian. Some embodiments of manifest generation system 202 can leverage some or all of these tag-level historian configuration parameters in connection with generating the manifest data for cloud-level data collection. The following example configuration sequence describes configuration of tag-level historian parameters in the industrial control program. These tag-level historian parameters can be leveraged by manifest generation system 202 in connection with generating manifest files for cloud-level data collection.

Some control program development applications support tag data types having multiple tag elements. For example, a PID_ENHANCED data type used for control loop configuration may be a multi-element data tag having three associated tag elements—a process variable (PV) value, a setpoint (SP) value, and a control variable (CV) value. Thus, a data tag named "TIC123" having a PID_ENHANCED data type will have three associated data tag elements—TIC123.PV, TIC123.SP, and TIC123.CV. According to one or more embodiments, each tag element of a given data type can have its own set of default cloud data collection parameters. In some embodiments, these cloud data collection parameters can be configured within the controller program using manifest generation system 202.

Figure 21:
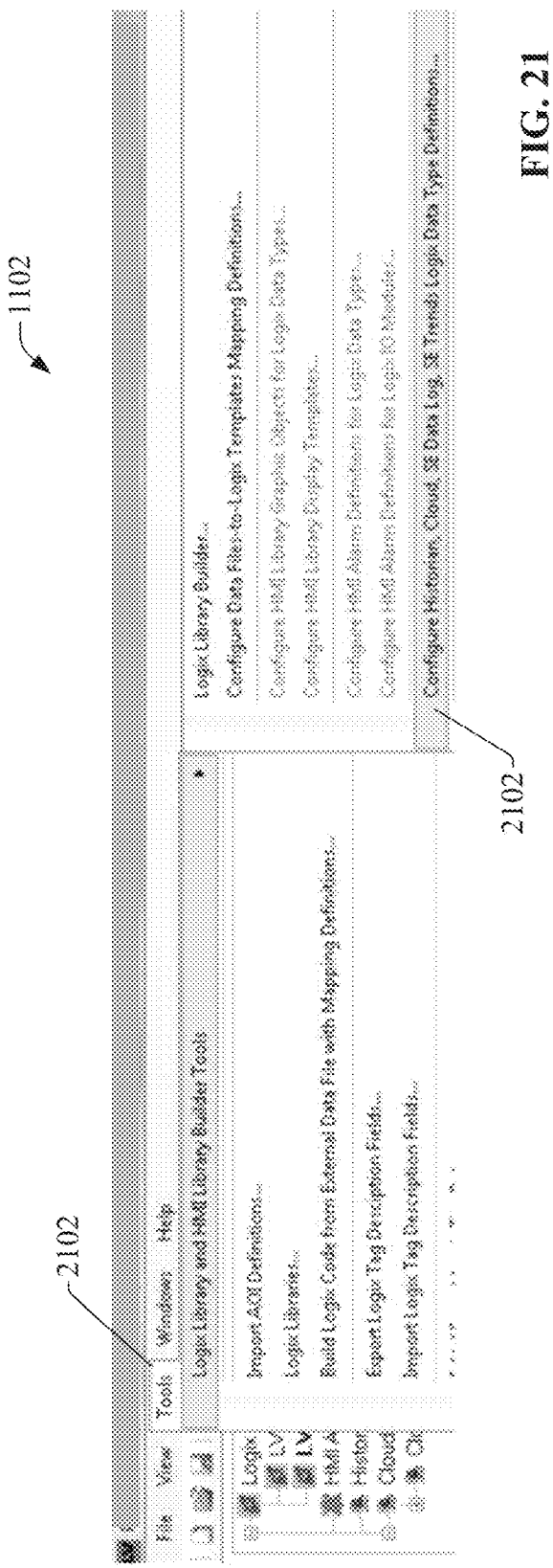
FIG. 21 is a view of example interface display showing selection of a menu option for launching a configuration tool for configuring data type definitions.
Figure 22:
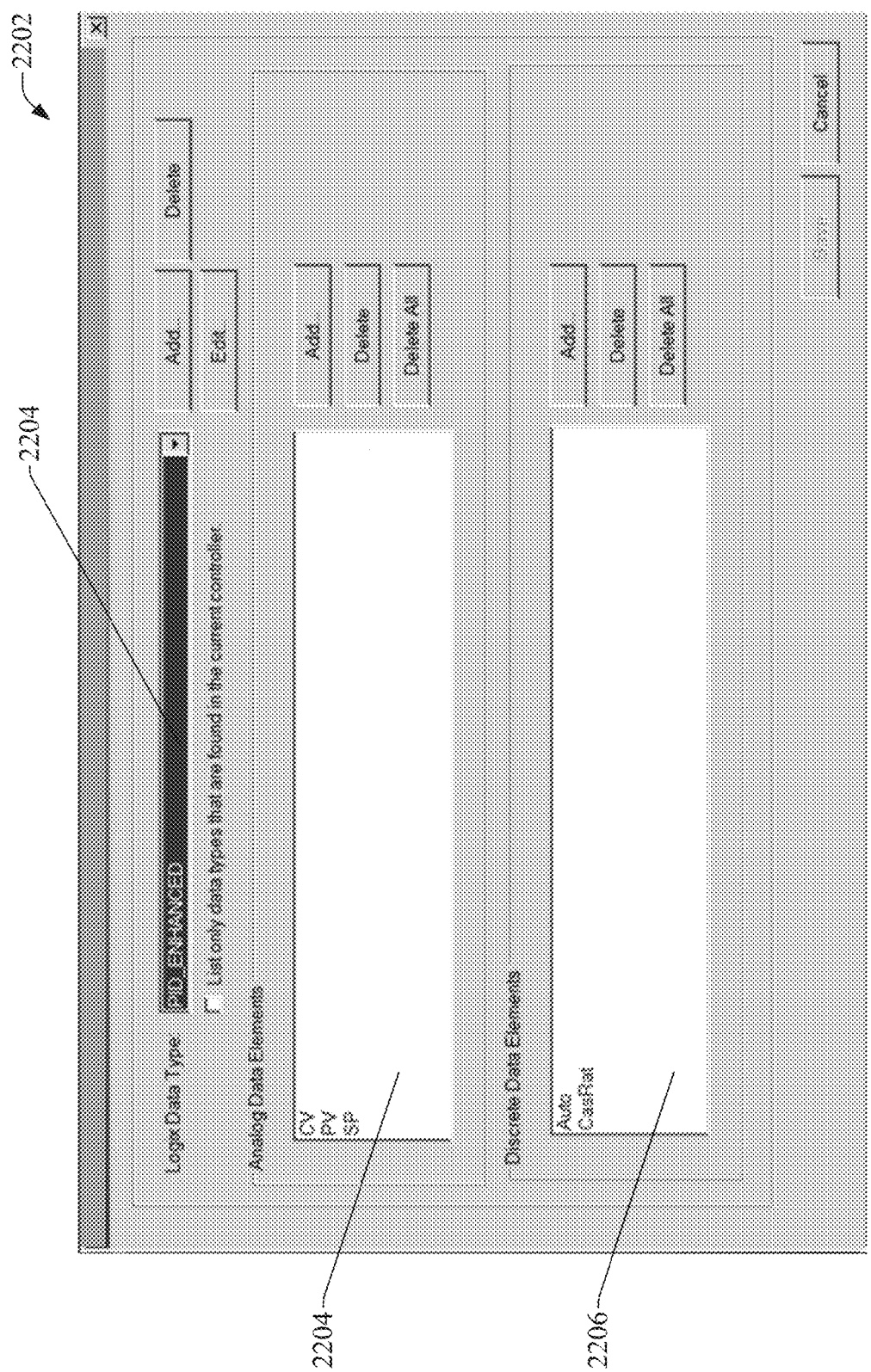
FIG. 22 is an example interface display for rendering analog and discrete data tag elements.

FIG. 21 is a view of example interface display 1102 showing selection of a menu option 2102 (invoked via a drop-down menu rendered in response to selection of a Tools menu item 2102) for launching a configuration tool for configuring data type definitions. FIG. 22 is an example interface display 2202 that can be rendered by user interface component 204 in response to selection of menu option 2102. Interface display 2202 includes an entry window 2204 that allows the user to select a data type to be configured. When a data type is selected in window 2204 (PID_ENHANCED in the illustrated example), any analog data elements associated with the selected data type are rendered in window 2204, while any discrete data elements associated with the selected data type are rendered in window 2206.

Figure 23:
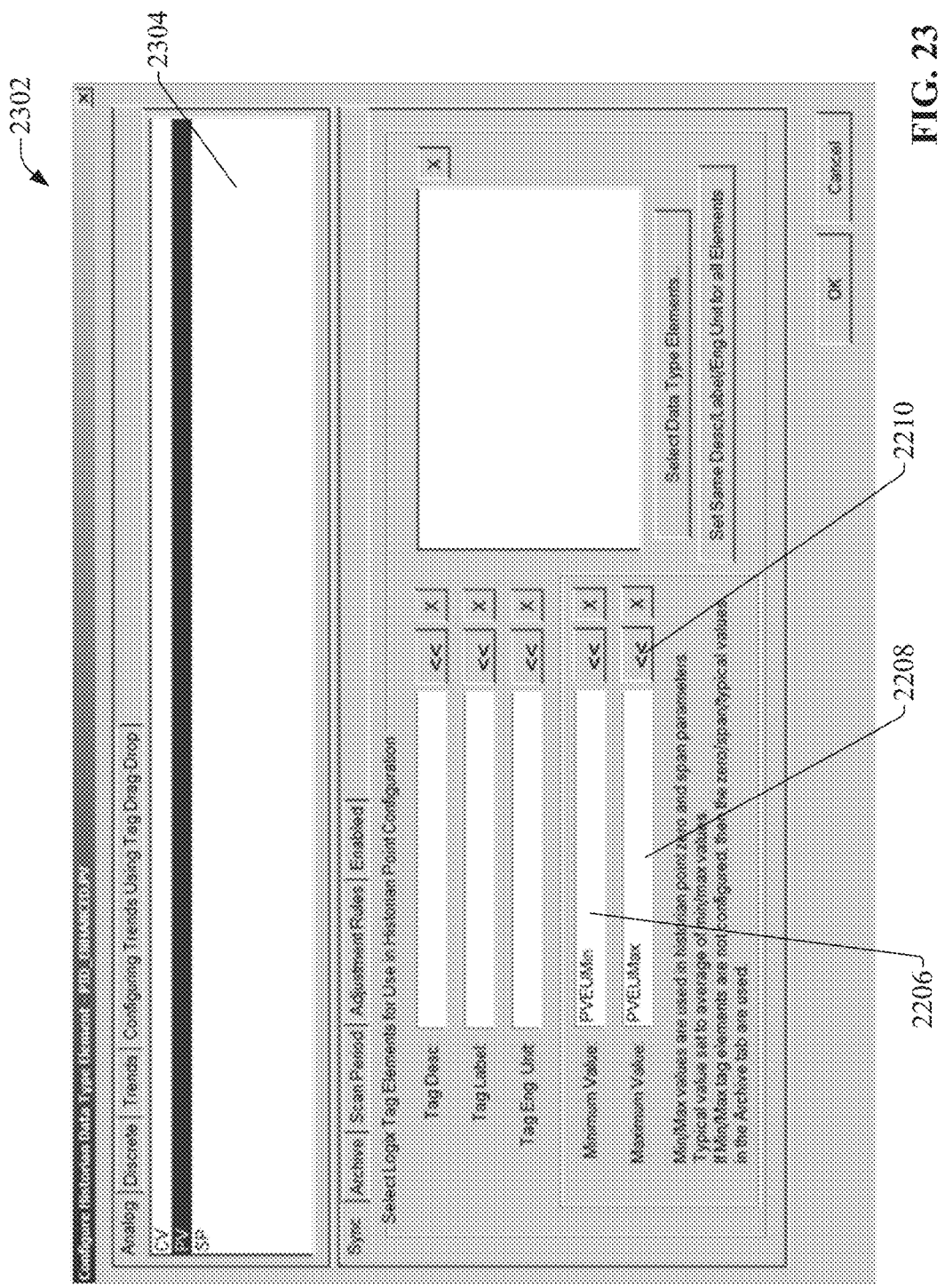
FIG. 23 is an example display interface for configuring default data point parameters for data type elements associated with a data type.
Figure 24:
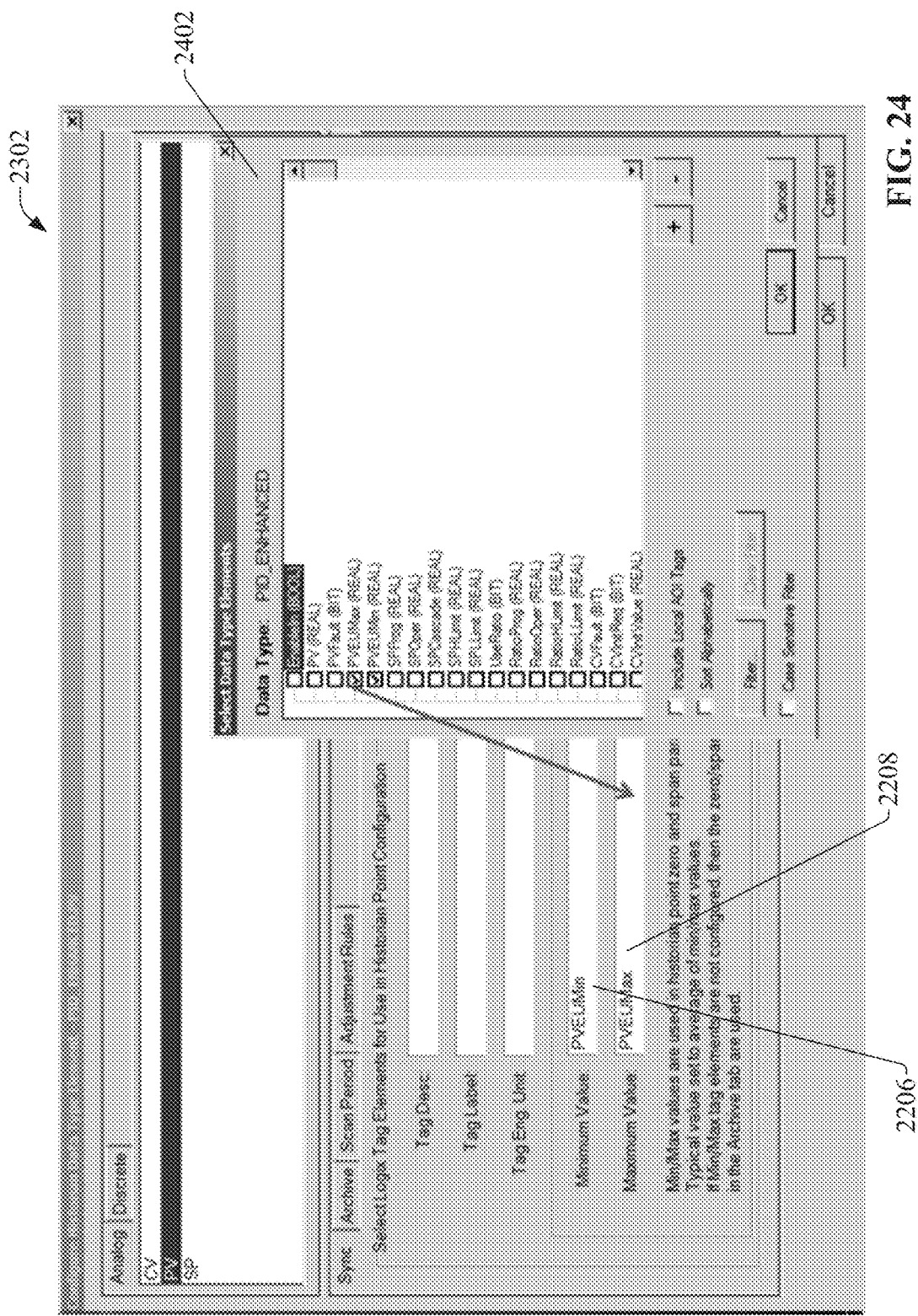
FIG. 24 is an example interface display that includes a window that allows selection of a data type element whose value is to be used as the maximum value for a data tag element.

Once a data type has been selected, default point parameters can be configured for each data type element associated with the data type. FIG. 23 is an example interface display 2302 that can be invoked to configure default data point parameters for data type elements associated with a data type. In the illustrated example, the analog data type elements (CV, PV, and SP) associated with the selected data type PID_ENHANCED are rendered in window 2304. A minimum value window 2206 and a maximum value window 2208 allow the user to enter maximum and minimum values for each data type element. These maximum and minimum values can be entered as numeric values, or can be set to use data tag values as the maximum and minimum values. For example, selection of button 2210 associated with the maximum value window 2208 can invoke selection window 2404 depicted in FIG. 24, which can allow the user to select a data type element associated with the selected data type (PID_ENHANCED) whose value is to be used as the maximum value for the data tag element being configured (PV in the illustrated example).

Figure 25:
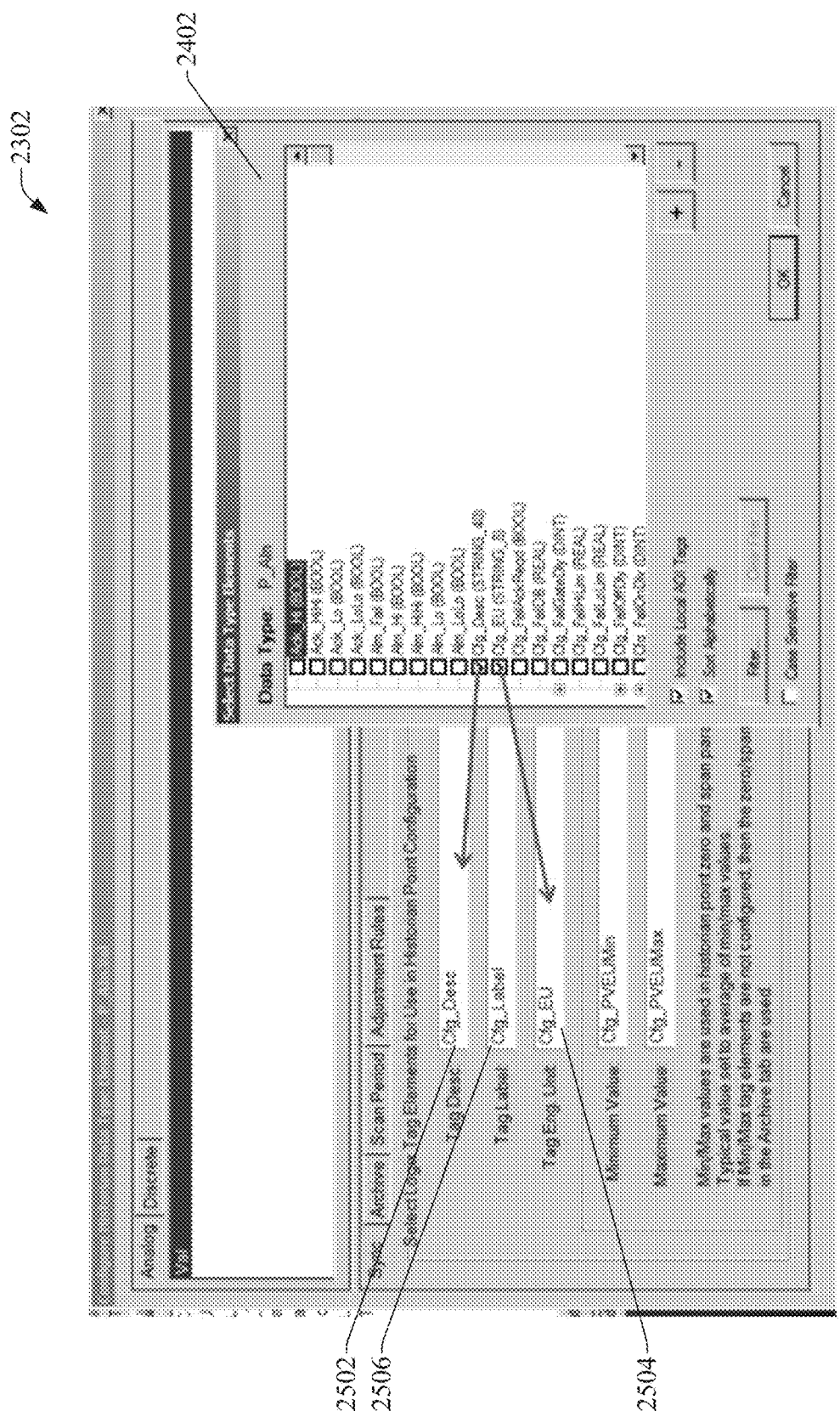
FIG. 25 is an example interface display that includes a window that allows selection of data type elements whose values are to be used as tag descriptions and engineering units for a data tag element.

Similarly, as shown in FIG. 25, a tag description entry window 2502, a tag label entry window 2506, and a tag engineering units entry window 2504 can be included on interface display 2302 for entering a tag description, label, and engineering unit for the data type element. As with the maximum and minimum values, these string values can be linked to selected data type elements (e.g., string tags) using window 2402.

Figure 26:
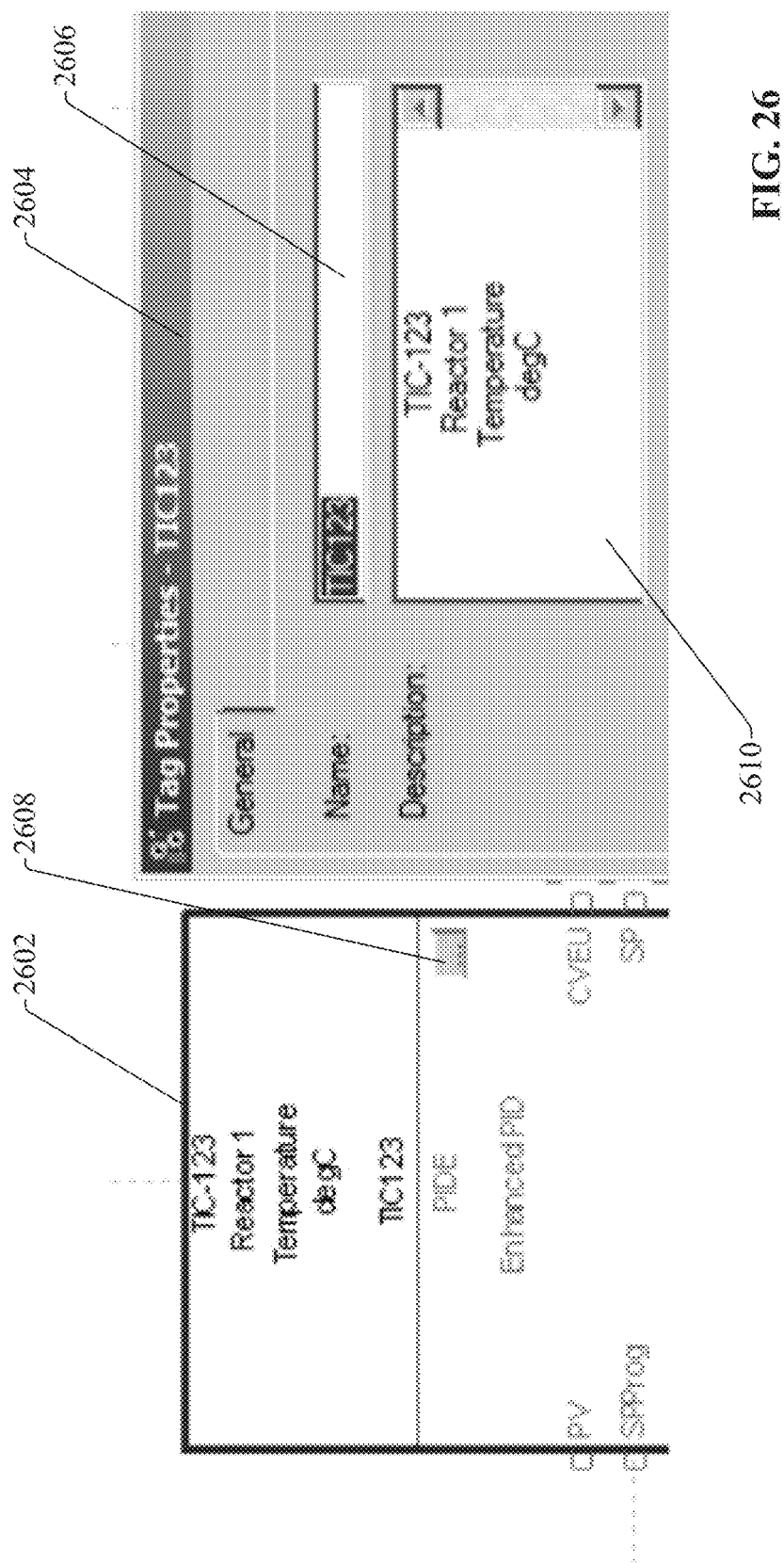
FIG. 26 is a view of a controller program development interface depicting a function block and associated properties window.

In some embodiments, device interface component 208 can also extract the description and engineering units from the description field of the corresponding data tag. FIG. 26 is a view of a controller program development interface depicting a function block 2602 and associated properties window 2604. Properties window 2604 can be invoked via interaction with function block 2602 (e.g., by selecting edit button 2608), and renders configurable property information for the data tag associated with the function block 2602. Function block 2602 is an enhanced PID function block, which has been associated with a tag named TIC123 by the program developer. This tag name is visible in the Name filed 2608 of properties window 2604. The developer has also set the description for the tag to be "TIC-123 Reactor 1 Temperature," and the engineering units are "deg C.," as shown in Description field 2610 of properties window 2604. In one or more embodiments, in accordance with user configuration input, device interface component 208 of manifest generation system 202 can extract this tag name, description, and engineering unit information for the data tag from the controller program file (e.g., controller program files 2004a or 2004b), and assign this information to appropriate fields 2502, 2560, and 2504 of interface display 2302.

Figure 27:
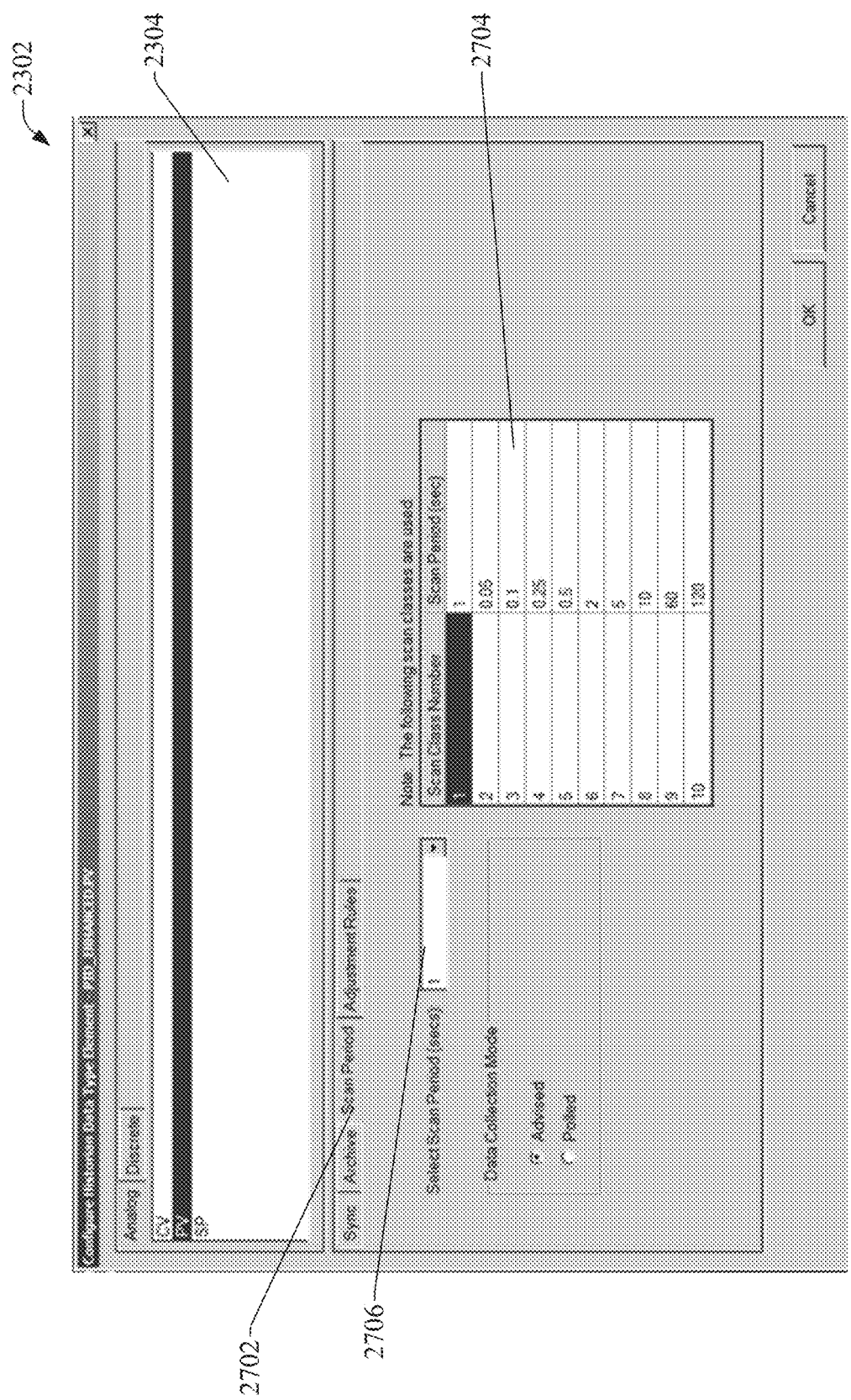
FIG. 27 is a view of a display interface that allows entry of scan period information.

The system 202 can also allow the user to set a scan period for each data tag element. FIG. 27 is a view of interface display 2302 in which the Scan Period tab 2702 has been selected. Selection of the Scan Period tab renders a scan period selection window 2704 listing preconfigured scan classes and associated scan periods. When the user selects a data tag element in window 2304, the scan period for the selected tag element can be set either by selecting one of the scan class numbers in scan period selection window 2704, or by selecting a scan period in drop-down window 2706. The selected scan period will be applied to the selected data tag element, such that during runtime data from the data tag element will be collected at the selected scan period. In some embodiments, system 202 can, in accordance with user instructions, apply the selected scan rate to the engineering unit associated with the data tag, such that all data tags associated with the engineering unit (e.g., degrees Celsius) will be associated with the selected scan period. This can allow values that are known to change slowly (e.g., temperature values) to be scanned at a globally applied low scan period, thereby conserving data collection bandwidth and processing power.

Figure 28:
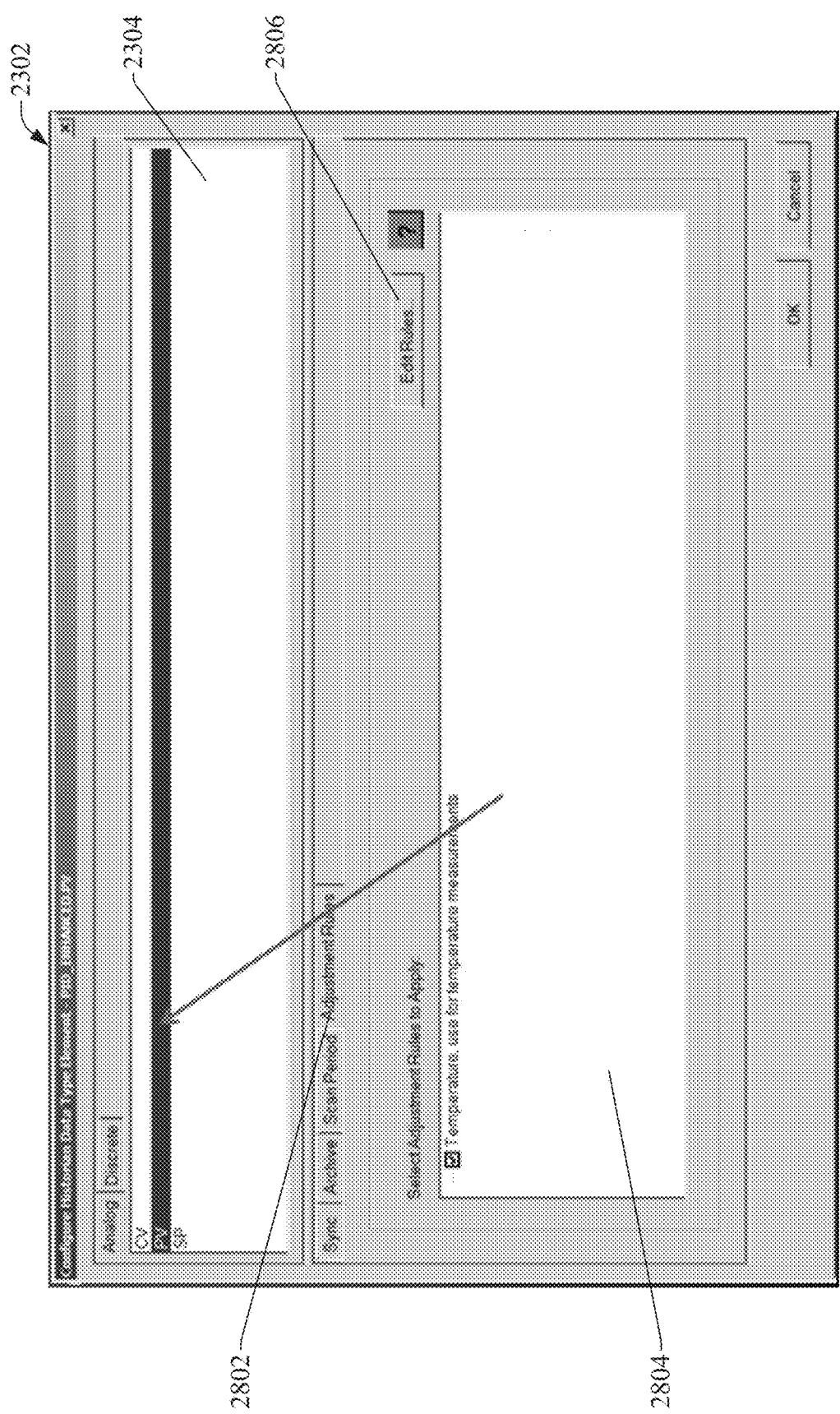
FIG. 28 is a view of an interface display that allows configuration of adjustment rules.
Figure 29:
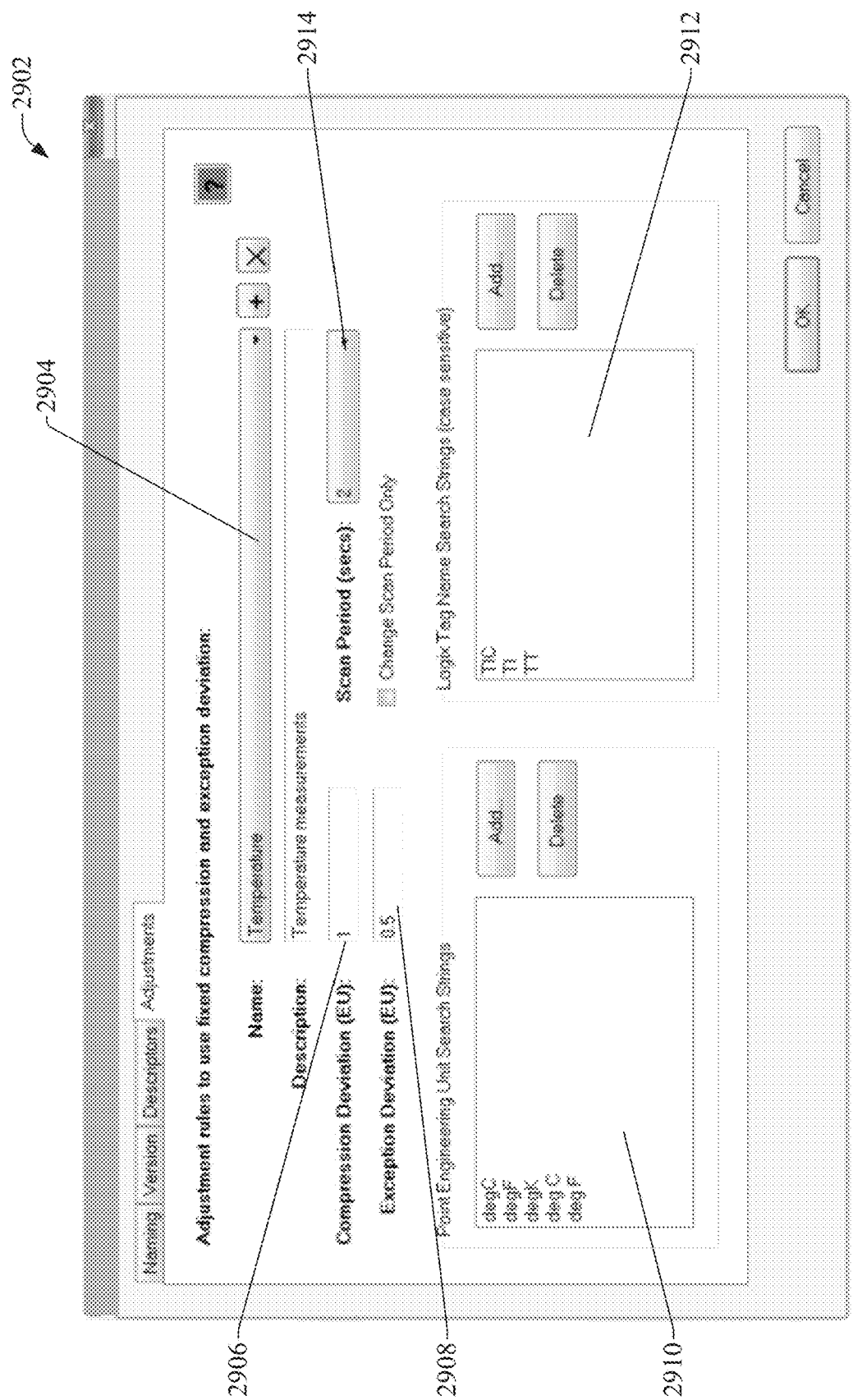
FIG. 29 is a view of an adjustment rule interface display.

For historian data points, adjustment rules can also be used to change data compression parameters. FIG. 28 is a view of interface display 2302 in which the Adjustment Rules tab 2802 has been selected. Selection of Adjustment Rules tab 2802 renders a rule selection window 2804 and an Edit Rules button 2806. Selection of Edit Rules button 2806 can invoke an adjustment rule interface display, such as interface display 2902 depicted in FIG. 29. Adjustment rule interface display 2902 includes fields and controls that allow the user to define an adjustment rule to be applied to data tag elements. A name for the adjustment rule (e.g., "Temperature") can be set using name field 2904. A scan period for the rule can be set using field 2914. Compression and exception deviation values for the rule can be set using fields 2906 and 2908. These settings can filter unnecessary data values, reducing the amount of bandwidth and storage space consumed by collection of the data point.

The rule defined by the rule name, scan period, and compression and exception deviation values can be applied by the user at the engineering unit level, and/or at the tag name level. For example, the user can add the names of engineering units to which the rule is to be applied to window 2910, and can add the names of logic tags (or tag elements) to which the rule is to be applied to window 2912. During runtime, the defined rule will be applied to all data tags associated with the one or more engineering units defined in window 2910, and to any data tags having names that include the strings entered in window 2912.

Returning now to FIG. 28, user interface component 204 can render a list of defined adjustment rules in window 2804. Selected rules can be applied to individual data tag elements by selecting the element in window 2304, and selecting the rule to be applied to the selected element in window 2804.

Some or all of the historian data parameters configured using techniques similar to those described above in connection with FIGS. 21-29 can be imported by the device interface component 208 in connection with generating system manifest file 1006 and data manifest file 1008. For example, with reference to FIG. 16, user interface component 204 may be configured to render only those data tags in interface display 1602 that have been configured for historian data collection, allowing the user to select which of these historian-configured tags are to be added to the cloud-based data collection. Moreover, the data type, maximum and minimum values, scan period, and engineering unit information that is configured for a given data tag in the controller program can be imported into the manifest generation system 202 and included in the manifest data.

The manifest generation system 202 described herein can streamline and simplify the process of configuring manifest data for cloud-based industrial data collection. The system 202 offers a top-down approach to building cloud manifest files using a template library and global propagation of parameter and data type composition rules. The system 202 also offers a bottom-up approach based on the control system implementation defined by the industrial control program.

Figure 30:
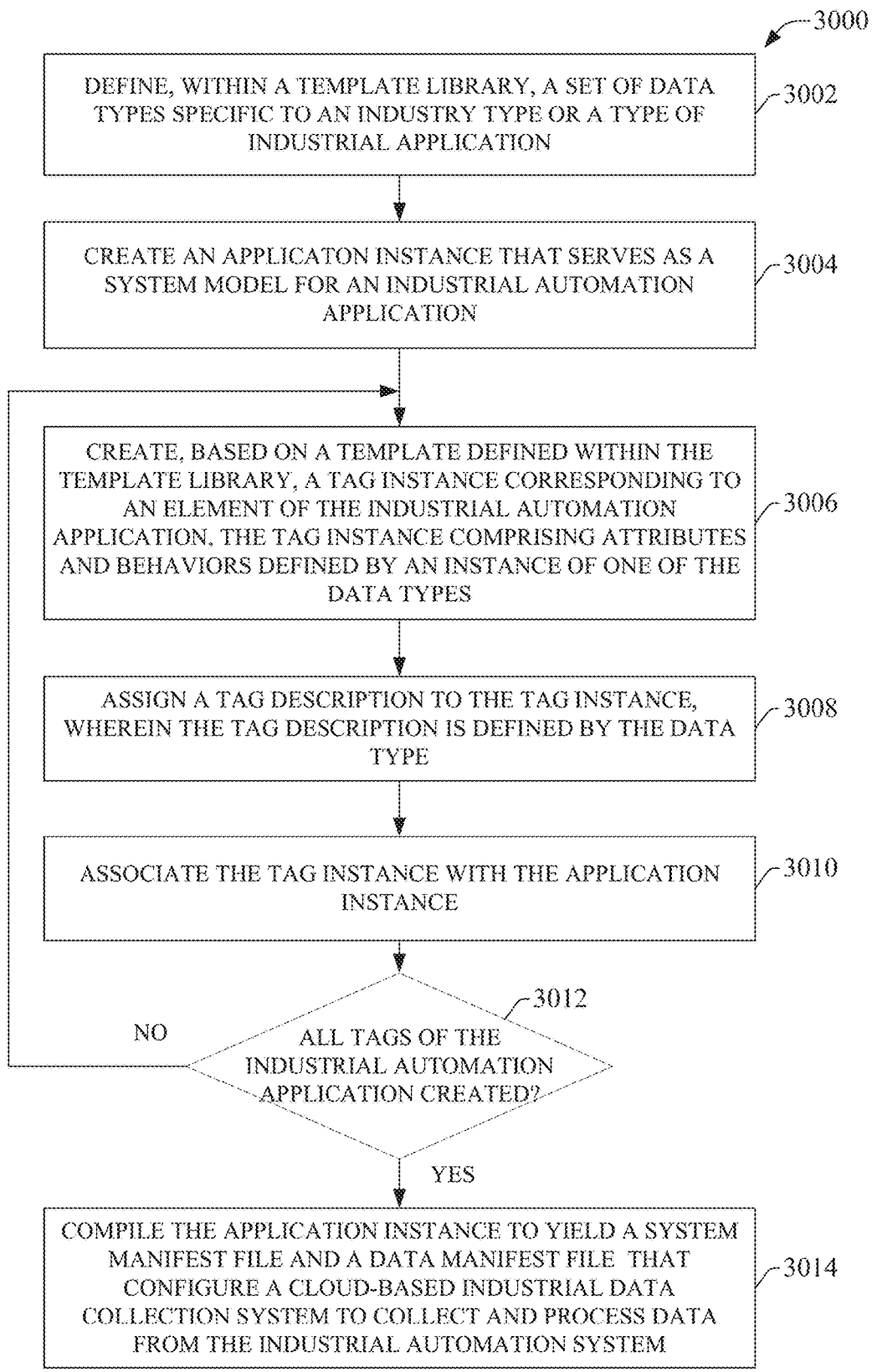
FIG. 30 is a flowchart of an example methodology for generating manifest data that configures a cloud-based data collection system to collect and process industrial data, where the manifest data is generated based on industry-specific templates.

FIGS. 30-31 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 30 illustrates an example methodology 3000 for generating manifest data that configures a cloud-based data collection system to collect and process industrial data, where the manifest data is generated based on industry-specific templates. Initially, at 3002, a set of data types specific to an industry type or a type of industrial application are defined within a template library. Each defined data type (or class of data type) can have an associated tag description, and can define attributes and behaviors of an aspect of an industrial process. This can include, for example, tag elements associated with the data type (e.g., analog and/or discrete values associated with the data type), default maximum or minimum values associated with the data type, or other such attributes.

At 3004, an application instance is created that serves as a system model for an industrial automation application. At 3006, a tag instance corresponding to an element or aspect of the industrial automation application is created, the tag instance comprising attributes and behaviors defined by an instance of one of the data types defined in the template library in step 3002. At 3008, a tag description is assigned to the tag instance created at step 3006, wherein the tag description is defined by the data type from which the tag instance was created. At 3010, the tag instance created at step 3006 is associated with the application instance created at step 3004.

At 3012, a determination is made as to whether all tags of the industrial automation application have been created. If additional tags are to be created (NO at step 3012), the methodology returns to step 3006, and steps 3006-3010 are repeated for another data tag. Once all desired tags have been created (YES at step 3012), the methodology proceeds to step 3014, where the resulting application instance is compiled to yield a system manifest file and a data manifest file that are designed to configure a cloud-based industrial data collection system to collect and process data form the industrial automation system.

Figure 31A:
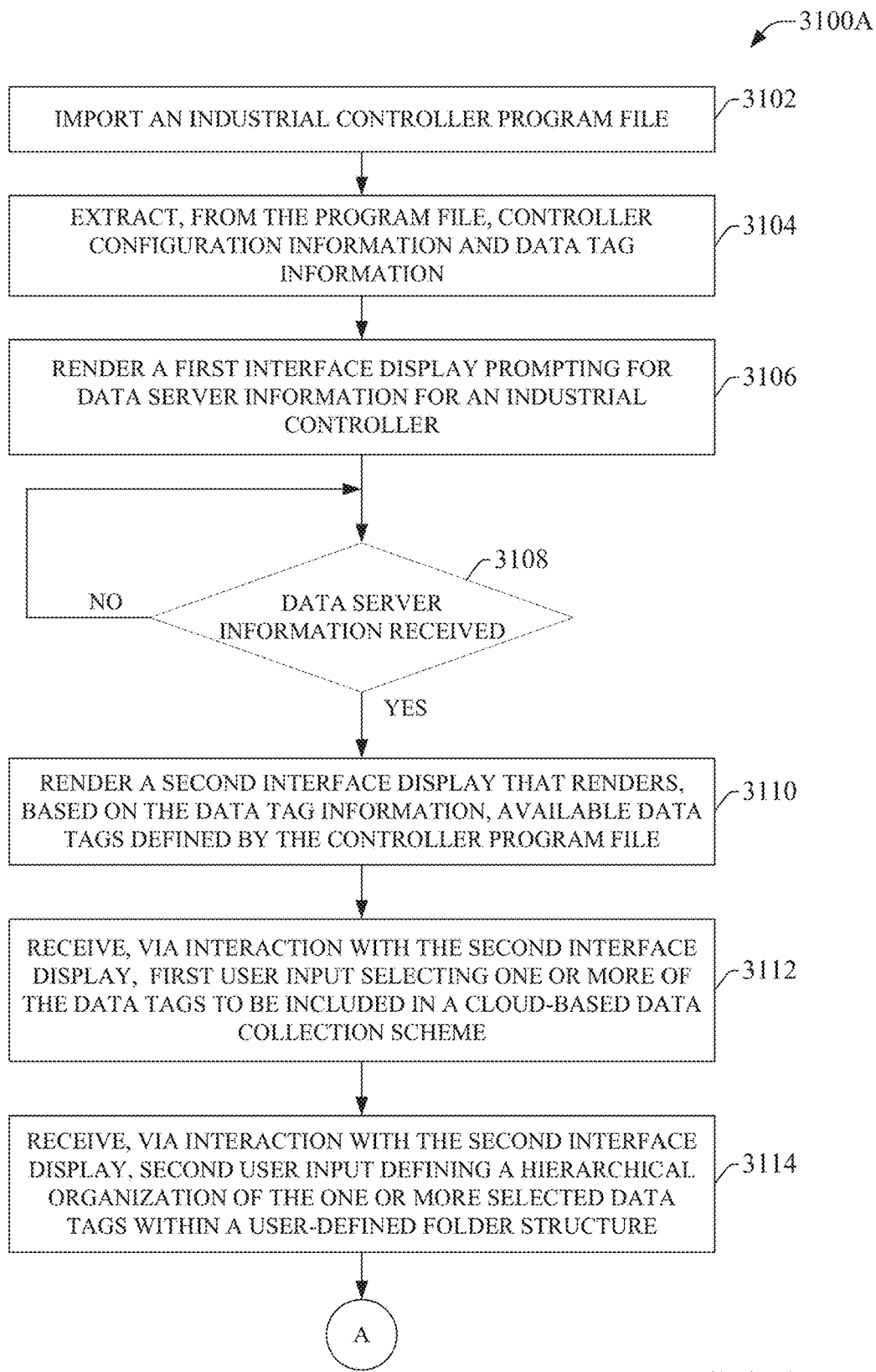
FIG. 31A is a flowchart of a first part of an example methodology for generating manifest data that configures a cloud-based data collection system to collect and process industrial data, where the manifest data is generated based on data imported from an industrial control program.

FIG. 31A illustrates a first part of an example methodology 3100A for generating manifest data that configures a cloud-based data collection system to collect and process industrial data, where the manifest data is generated based on data imported from an industrial control program. Initially, at 3102, an industrial control program file is imported (e.g., into a manifest generation system). Industrial control program file can be, for example, a PLC program file such as a ladder logic program file that includes control programming, controller configuration data, and data tag definitions. At 3104, controller configuration information and data tag information is extracted from the industrial controller program file.

At 3106, a first interface display is rendered that prompts for data server information for an industrial controller (e.g., the industrial controller that will execute the industrial controller program imported at step 3102). The data server information can identify a communication path to the controller or a data collection service (e.g., a service that executes on a cloud agent device) that collects data from the industrial controller for packaging and delivery to the cloud platform.

At 3108, a determination is made as to whether the data server information has been received via interaction with the first interface display. Once the data server information has been received (YES at step 3108), the methodology proceeds to step 3110, where a second interface display is rendered, the second interface display rendering available data tags defined by the controller program file imported at step 3102 (based on the data tag information extracted at step 3104).

At 3112, first user input is received via interaction with the second interface display. The first user input selects one or more of the available data tags to be included in a cloud-based data collection scheme. At 3114, second user input is received via interaction with the second interface display. The second user input defines a hierarchical organization of the one or more data tags selected in step 3112 within a user-defined folder structure.

Figure 31B:
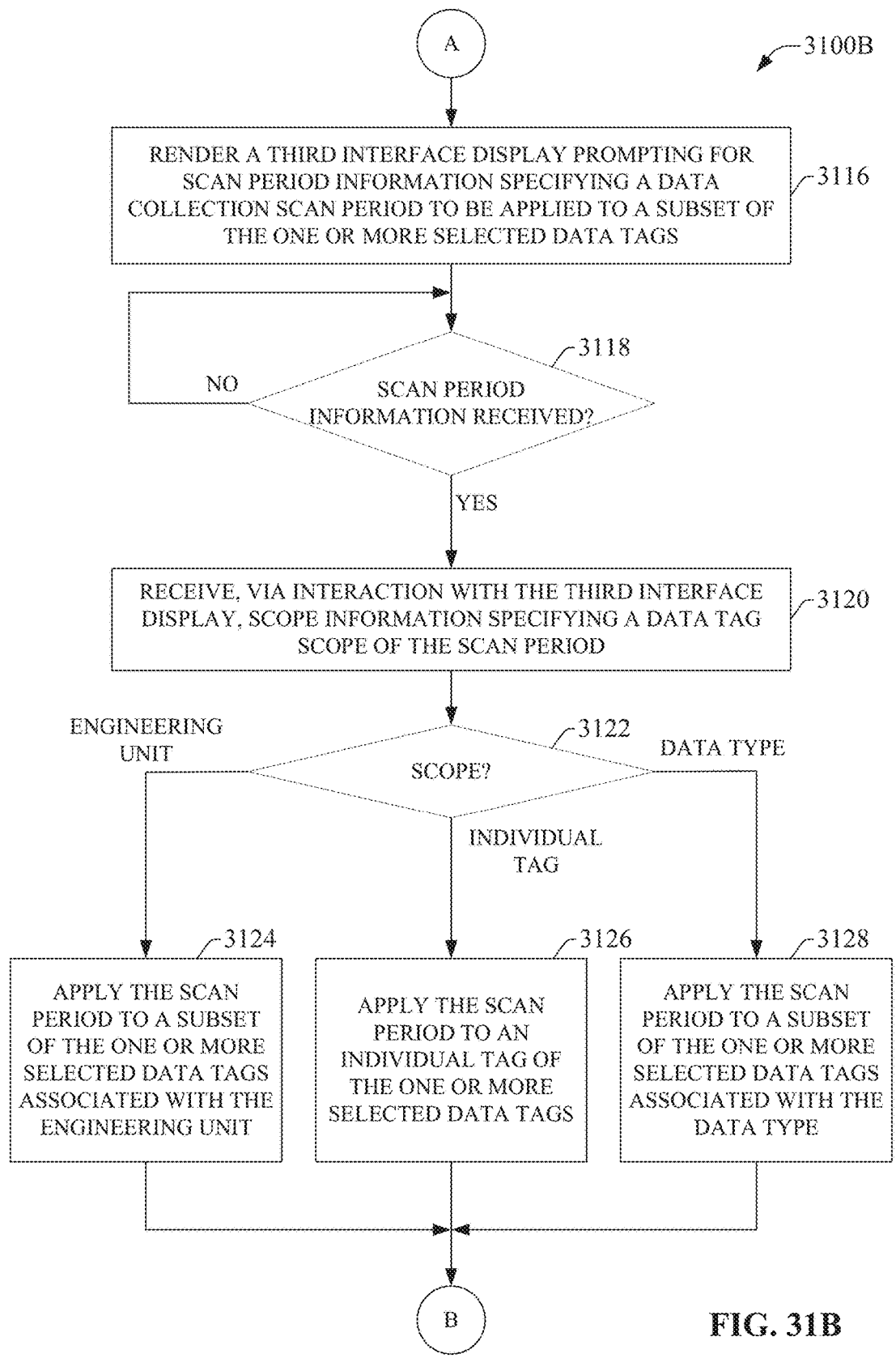
FIG. 31B is a flowchart of a second part of the example methodology for generating manifest data that configures a cloud-based data collection system to collect and process industrial data, where the manifest data is generated based on data imported from an industrial control program.

The methodology proceeds to the second part 3100B illustrated in FIG. 31B. At 3116, a third interface display is rendered prompting for scan period information. The scan period information specifies a data collection scan period to be applied to a subset of the one or more data tags selected at step 3112. At 3118, a determination is made as to whether the scan period information has been received via interaction with the third interface display. When the scan period information has been received (YES at step 3118), the methodology proceeds to step 3120, where scope information is received via interaction with the third interface display. The scope information specifies a data tag scope of the scan period defined by the scan period information received at step 3116.

At 3122, the scope indicated by the scope information received at step 3120 is identified. If the scope information indicates that the scan period is to be applied at the engineering unit level, the methodology proceeds to step 3124, where the scan period defined by the scan information is applied to a subset of the one or more selected data tags associated with the engineering unit identified by the scope information (e.g., temperature degrees). Alternatively, if the scope information indicates that the scan period is to be applied at the individual tag level, the methodology proceeds to step 3126, where the scan period defined by the scan period information is applied to an individual tag identified by the scope information. Alternatively, if the scope information indicates that the scan period is to be applied at the data type level, the methodology proceeds to step 3128, where the scan period defined by the scan period information is applied to a subset of the one or more selected data tags associated with the data type identified by the scope information.

Figure 31C:
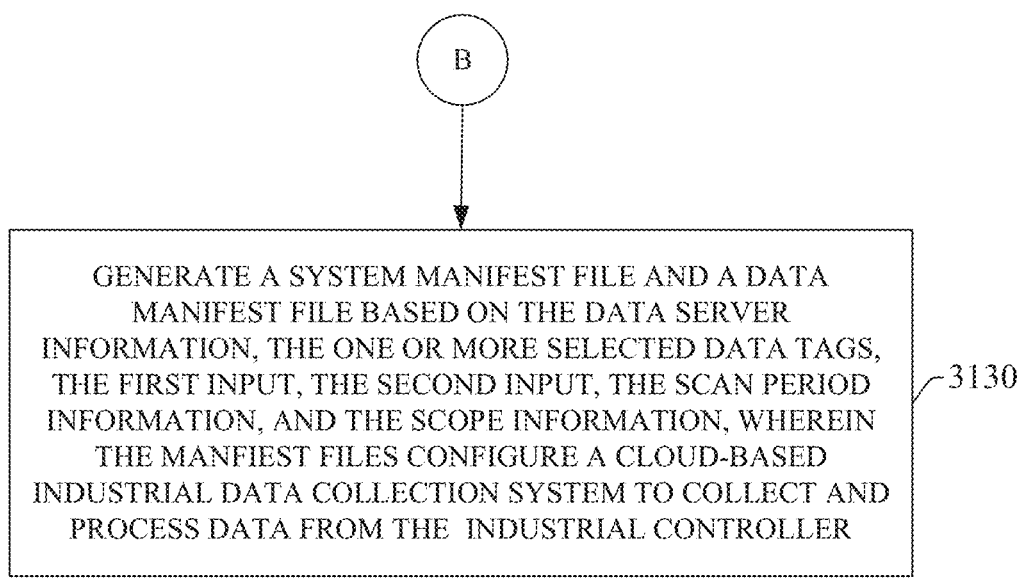
FIG. 31C is a flowchart of a third part of the example methodology for generating manifest data that configures a cloud-based data collection system to collect and process industrial data, where the manifest data is generated based on data imported from an industrial control program.

With the scope of the scan period set, the methodology proceeds to the third part 3100C illustrated in FIG. 31C. At 3130, a system manifest file and a data manifest file are generated based on the data server information received at step 3108, the one or more selected data tags, the first input, the second input, the scan period information, and the scope information. Similar to the manifest files generated at step 3014 of methodology 3000, the manifest files are designed to configure a cloud-based industrial data collection system to collect and process data from the industrial controller that will execute the controller program file imported at step 3102.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 32:
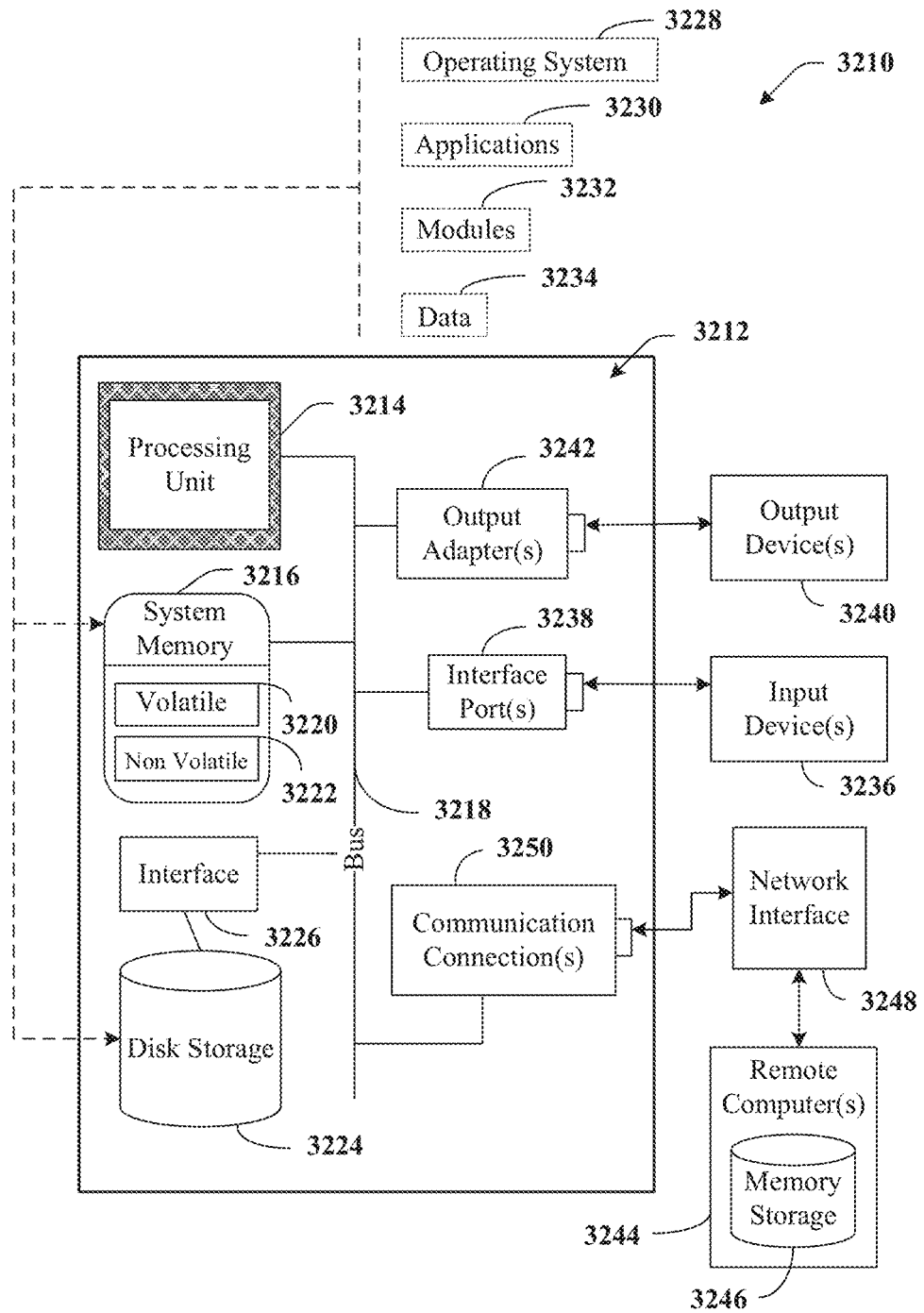
FIG. 32 is an example computing environment.
Figure 33:
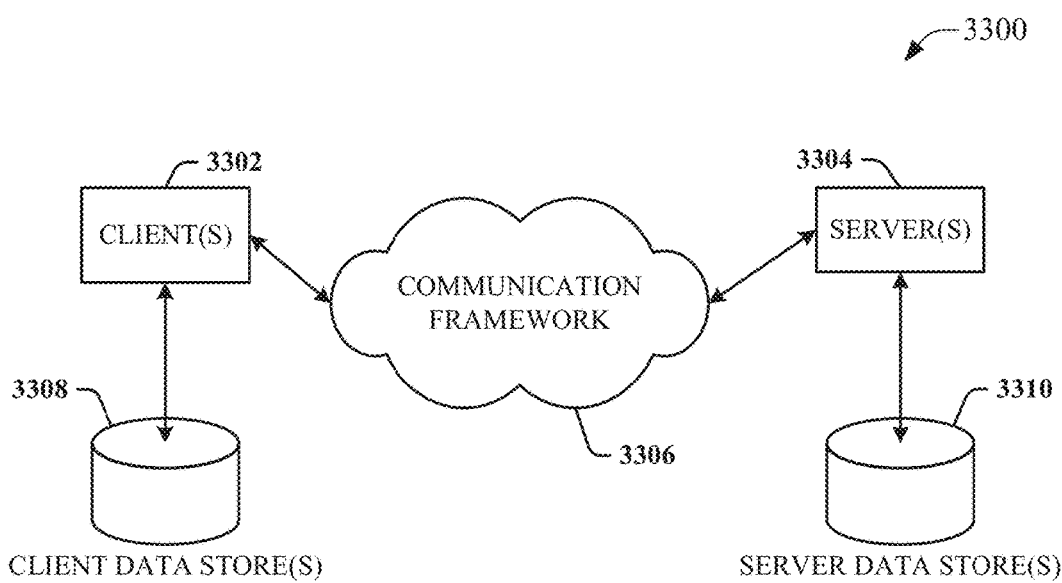
FIG. 33 is an example networking environment.

In order to provide a context for the various aspects of the disclosed subject matter, FIGS. 32 and 33 as well as the following discussion are intended to provide a brief, general description of a suitable environment in which the various aspects of the disclosed subject matter may be implemented.

With reference to FIG. 32, an example environment 3210 for implementing various aspects of the aforementioned subject matter includes a computer 3212. The computer 3212 includes a processing unit 3214, a system memory 3216, and a system bus 3218. The system bus 3218 couples system components including, but not limited to, the system memory 3216 to the processing unit 3214. The processing unit 3214 can be any of various available processors. Multi-core microprocessors and other multiprocessor architectures also can be employed as the processing unit 3214.

The system bus 3218 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3216 includes volatile memory 3220 and nonvolatile memory 3222. The basic input/output system (BIOS), containing the basic routines to transfer information between elements within the computer 3212, such as during start-up, is stored in nonvolatile memory 3222. By way of illustration, and not limitation, nonvolatile memory 3222 can include read only memory (ROM), programmable ROM (PROM), electrically programmable ROM (EPROM), electrically erasable PROM (EEPROM), or flash memory. Volatile memory 3220 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3212 also includes removable/non-removable, volatile/nonvolatile computer storage media. FIG. 32 illustrates, for example a disk storage 3224. Disk storage 3224 includes, but is not limited to, devices like a magnetic disk drive, floppy disk drive, tape drive, Jaz drive, Zip drive, LS-100 drive, flash memory card, or memory stick. In addition, disk storage 3224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3224 to the system bus 3218, a removable or non-removable interface is typically used such as interface 3226.

It is to be appreciated that FIG. 32 describes software that acts as an intermediary between users and the basic computer resources described in suitable operating environment 3210. Such software includes an operating system 3228. Operating system 3228, which can be stored on disk storage 3224, acts to control and allocate resources of the computer 3212. System applications 3230 take advantage of the management of resources by operating system 3228 through program modules 3232 and program data 3234 stored either in system memory 3216 or on disk storage 3224. It is to be appreciated that one or more embodiments of the subject disclosure can be implemented with various operating systems or combinations of operating systems.

A user enters commands or information into the computer 3212 through input device(s) 3236. Input devices 3236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3214 through the system bus 3218 via interface port(s) 3238. Interface port(s) 3238 include, for example, a serial port, a parallel port, a game port, and a universal serial bus (USB). Output device(s) 3240 use some of the same type of ports as input device(s) 3236. Thus, for example, a USB port may be used to provide input to computer 3212, and to output information from computer 3212 to an output device 3240. Output adapters 3242 are provided to illustrate that there are some output devices 3240 like monitors, speakers, and printers, among other output devices 3240, which require special adapters. The output adapters 3242 include, by way of illustration and not limitation, video and sound cards that provide a means of connection between the output device 3240 and the system bus 3218. It should be noted that other devices and/or systems of devices provide both input and output capabilities such as remote computer(s) 3244.

Computer 3212 can operate in a networked environment using logical connections to one or more remote computers, such as remote computer(s) 3244. The remote computer(s) 3244 can be a personal computer, a server, a router, a network PC, a workstation, a microprocessor based appliance, a peer device or other common network node and the like, and typically includes many or all of the elements described relative to computer 3212. For purposes of brevity, only a memory storage device 3246 is illustrated with remote computer(s) 3244. Remote computer(s) 3244 is logically connected to computer 3212 through a network interface 3248 and then physically connected via communication connection 3250. Network interface 3248 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3250 refers to the hardware/software employed to connect the network interface 3248 to the system bus 3218. While communication connection 3250 is shown for illustrative clarity inside computer 3212, it can also be external to computer 3212. The hardware/software necessary for connection to the network interface 3248 includes, for exemplary purposes only, internal and external technologies such as, modems including regular telephone grade modems, cable modems and DSL modems, ISDN adapters, and Ethernet cards.

FIG. 33 is a schematic block diagram of a sample computing environment 3300 with which the disclosed subject matter can interact. The sample computing environment 3300 includes one or more client(s) 3302. The client(s) 3302 can be hardware and/or software (e.g., threads, processes, computing devices). The sample computing environment 3300 also includes one or more server(s) 3304. The server(s) 3304 can also be hardware and/or software (e.g., threads, processes, computing devices). The servers 3304 can house threads to perform transformations by employing one or more embodiments as described herein, for example. One possible communication between a client 3302 and servers 3304 can be in the form of a data packet adapted to be transmitted between two or more computer processes. The sample computing environment 3300 includes a communication framework 3306 that can be employed to facilitate communications between the client(s) 3302 and the server(s) 3304. The client(s) 3302 are operably connected to one or more client data store(s) 3308 that can be employed to store information local to the client(s) 3302. Similarly, the server(s) 3304 are operably connected to one or more server data store(s) 3310 that can be employed to store information local to the servers 3304.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system for generating manifest files, comprising:
a memory that stores executable components;
a processor, operatively coupled to the memory, that executes the executable components, the executable components comprising:
   a device interface component configured to
      import an industrial controller program file that defines available data tags,
      identify a subset of the available data tags defined in the industrial control program file that have data types enabling cloud-based data collection, and
      extract, from the industrial controller program file, data tag information that identifies the subset of the available data tags that have the data types enabling cloud-based collection;
   a user interface component configured to generate interface displays that render the subset of the available data tags based on the data tag information and are configured to receive, via interaction with the interface displays, tag selection input data that selects data tags, from the subset of the available data tags, to be collected from one or more end point devices by a cloud-based industrial data collection system; and
   a manifest generation component configured to generate a system manifest file and a data manifest file based on the tag selection input data, wherein the system manifest file and the data manifest file configure the cloud-based industrial data collection system to collect and process data from the data tags.

2. The system of claim 1, wherein
the interface displays are further configured to receive, via interaction with the interface displays, data server input data identifying a data server that aggregates data from an industrial controller that executes the industrial controller program file, and
the manifest generation component is configured to generate the system manifest file and the data manifest file further based on the data server input data.

3. The system of claim 1, wherein
the interface displays are further configured to receive, via interaction with the interface displays, organization input data defining a hierarchical organization of the data tags, and
the manifest generation component is configured to generate the system manifest file and the data manifest file further based on the organization input data.

4. The system of claim 3, wherein the organization input data defines the hierarchical organization as a hierarchical folder structure rendered on one of the interface displays, and assigns data tags, of the data tags, to respective folders of the hierarchical folders structure.

5. The system of claim 1, wherein
the interface displays are further configured to receive, via interaction with the interface displays, scan period input data specifying a data collection scan period and scope input data specifying a scope of the scan period, wherein the scope is at least one of an engineering unit, a data type, or an individual tag, and
the manifest generation component is configured to generate the system manifest file and the data manifest file further based on the scan period input data and the scope input data.

6. The system of claim 1, wherein
the device interface component is further configured to extract, from the industrial controller program file, scan period information defined in the industrial controller program file for a data tag of the data tags, and
the manifest generation component is configured to generate the system manifest file and the data manifest file further based on the scan period information for the data tag.

7. The system of claim 1, wherein the executable components further comprise a cloud interface component configured to establish a communicative connection to the cloud-based industrial data collection system and send the system manifest file and the data manifest file to the cloud-based industrial data collection system.

8. The system of claim 1, wherein the data tags are first data tags, and the executable components further comprises a library tool component configured to
generate, in response to first input data, an application instance representing an industrial control system, generate, in response to second input data, instances of data types, wherein the instances of the data types comprise attributes defined by data type templates maintained on a template library, and generate, in response to third input data, second data tags associated with the instances of the data types and associate the second data tags with the application instance, wherein the second data tags represent respective aspects of an industrial control system, wherein the manifest generation component is further configured to generate another system manifest file and another data manifest file based on the application instance and the instances of the data types.

9. The system of claim 1, wherein the manifest generation component is further configured to generate, based on metrics definition input received via the user interface component, a metrics manifest file that configures the cloud-based industrial data collection system to perform a defined data processing action on two sets of data having respective two different data formats.

10. A method for configuring a cloud-based industrial data collection system, comprising:

importing, by a system comprising a processor, an industrial controller program file that defines available data tags, wherein a subset of the available data tags have data types that enable cloud-based data collection;

extracting, by the system, data tag information from the industrial controller program file, wherein the data tag information identifies the subset of the available data tags having the data types that enable the cloud-based data collection;

generating, by the system, interface displays that render the subset of the available data tags based on the data tag information;

receiving, by the system via interaction with the interface displays, tag selection input data that selects data tags, from the subset of the available data tags, to be collected from one or more target devices by a cloud-based industrial data collection system; and generating, by the system, a system manifest file and a data manifest file based on the tag selection input data, wherein the system manifest file and the data manifest file configure the cloud-based industrial data collection system to collect and process data from the data tags.

11. The method of claim 10, further comprising receiving, via interaction with the interface displays, data server input data identifying a data server that aggregates data from an industrial controller that executes the industrial controller program file, wherein the generating of the system manifest file and the data manifest file comprises generating the system manifest file and the data manifest file further based on the data server input data.

12. The method of claim 10, further comprising receiving, via interaction with the interface displays, organization input data defining a hierarchical organization of the data tags, wherein the generating of the system manifest file and the data manifest file comprises generating the system manifest file and the data manifest file further based on the organization input data.

13. The method of claim 12, further comprising rendering the organizational hierarchical organization as a hierarchical folder structure rendered on one of the interface displays, and assigning, based on the organization input data, the data tags of the subset of the data tags to respective folders of the hierarchical folders structure.

14. The method of claim 10, further comprising:

receiving, via interaction with the interface displays, scan period input data specifying a data collection scan period; and receiving, via interaction with the interface displays, scope input data specifying a scope of the scan period, wherein the scope is at least one of an engineering unit, a data type, or an individual tag, wherein the generating of the system manifest file and the data manifest file comprises generating the system manifest file and the data manifest file further based on the scan period input data and the scope input data.

15. The method of claim 10, further comprising:

establishing, by the system, a communicative connection to the cloud-based industrial data collection system; and sending, by the system, the system manifest file and the data manifest file to the cloud-based industrial data collection system.

16. The method of claim 10, wherein the data tags are first data tags, and the method further comprises:

generating, by the system in response to first input data, an application instance representing an industrial control system;

generating, by the system in response to second input data, instances of data types, wherein the instances of the data types comprise attributes defined by data type templates maintained on a template library; and generating, by the system in response to third input data, second data tags associated with the instances of the data types and associate the second data tags with the application instance, wherein the second data tags represent respective aspects of an industrial control system, wherein the generating the system manifest file and the data manifest file comprises generating the system manifest file and the data manifest file further based on the scan period input data and the scope input data.

17. A non-transitory computer-readable medium having stored thereon instructions that, in response to execution, cause a system comprising a processor to perform operations, the operations comprising:

importing an industrial controller program file;

generating data tag information based on analysis of the industrial controller program file, wherein the data tag information identifies available data tags defined in the industrial controller program file;

identifying a subset of the available data tags that have data types indicating eligibility for cloud-based data collection;

generating interface displays that render the subset of the data tags based on the data tag information;

receiving, via interaction with the interface displays, tag selection input data that selects data tags, from the subset of the available data tags, to be collected from one or more industrial devices by a cloud-based industrial data collection system; and generating a system manifest file and a data manifest file based on the tag selection input data, wherein the system manifest file and the data manifest file configure the cloud-based industrial data collection system to collect and process data from the data tags.

18. The non-transitory computer-readable medium of claim 17, wherein the operations further comprise receiving, via interaction with the interface displays, data server input data identifying a data server that aggregates data from an industrial controller that executes the industrial controller program file, wherein the generating the system manifest file and the data manifest file comprises generating the system manifest file and the data manifest file further based on the data server input data.

19. The system of claim 1, wherein the system manifest file specifies one or more industrial controllers from which data, including the data from the data tags, is to be collected by the cloud-based industrial data collection system, server information for each of the one or more industrial controllers, scan period information, and a reference to the data manifest file.

20. The system of claim 1, wherein the data manifest file defines data points, including the data tags, from which data is to be collected by the cloud-based industrial data collection system.

* * * * *